US010631632B2

(12) United States Patent
Epstein

(10) Patent No.: US 10,631,632 B2
(45) Date of Patent: Apr. 28, 2020

(54) EGALITARIAN CONTROL APPARATUS AND METHOD FOR SHARING INFORMATION IN A COLLABORATIVE WORKSPACE

(71) Applicant: Steelcase Inc., Grand Rapids, MI (US)

(72) Inventor: Lewis Epstein, San Mateo, CA (US)

(73) Assignee: STEELCASE INC., Grand Rapids, MI (US)

(*) Notice: Subject to any disclaimer, the term of this patent is extended or adjusted under 35 U.S.C. 154(b) by 281 days.

(21) Appl. No.: 14/053,213

(22) Filed: Oct. 14, 2013

(65) Prior Publication Data
US 2014/0040781 A1 Feb. 6, 2014

Related U.S. Application Data

(63) Continuation of application No. 13/912,442, filed on Jun. 7, 2013, now abandoned, which is a
(Continued)

(51) Int. Cl.
*H04N 7/18* (2006.01)
*H04N 5/268* (2006.01)
(Continued)

(52) U.S. Cl.
CPC .............. *A47B 21/06* (2013.01); *A47B 13/08* (2013.01); *A47B 21/00* (2013.01); *A47B 83/001* (2013.01);
(Continued)

(58) Field of Classification Search
CPC ... G06F 3/0482; G06F 3/0484; G06F 3/04842
See application file for complete search history.

(56) References Cited

U.S. PATENT DOCUMENTS

| 892,954 A | 7/1908 | Hanson |
| 1,189,799 A | 7/1916 | Erickson |

(Continued)

FOREIGN PATENT DOCUMENTS

| DE | 3100660 A1 | 7/1982 |
| DE | 8533571 U1 | 1/1986 |

(Continued)

OTHER PUBLICATIONS

Polycom, Polycom RealPresence Experience (RPX) User Guide, Feb. 2007 Edition, Version 1.0, 3 pages.
(Continued)

*Primary Examiner* — Jennifer N To
*Assistant Examiner* — Ashley M Fortino
(74) *Attorney, Agent, or Firm* — Quarles & Brady LLP

(57) ABSTRACT

A method and system of selecting information from video sources to be displayed on at least a subset of a plurality of display screen presentation spaces, the method comprising the steps of providing at least first and second independent selectable control interfaces, each interface including a separately selectable control uniquely associated with each of the display screen presentation spaces, uniquely associating first and second video sources with the first and second control interfaces, for each control interface, receiving an indication each time one of the selectable controls is selected and, upon receiving an indication, providing the video source associated with the control interface used to make the selection to the display screen presentation space associated with the selected selectable control.

20 Claims, 76 Drawing Sheets

Related U.S. Application Data continuation-in-part of application No. 13/481,436, filed on May 25, 2012, now abandoned, which is a continuation-in-part of application No. 12/474,670, filed on May 29, 2009, now Pat. No. 8,896,656, application No. 14/053,213, which is a continuation-in-part of application No. 12/250,192, filed on Oct. 13, 2008, now Pat. No. 8,074,581.

(51) Int. Cl.
| | |
|---|---|
| G06F 3/0481 | (2013.01) |
| G06F 3/14 | (2006.01) |
| A47B 21/06 | (2006.01) |
| A47B 13/08 | (2006.01) |
| H04N 7/15 | (2006.01) |
| A47B 21/00 | (2006.01) |
| H04N 5/66 | (2006.01) |
| H04N 7/14 | (2006.01) |
| G06F 1/16 | (2006.01) |
| A47B 83/00 | (2006.01) |
| G06F 3/147 | (2006.01) |
| H04N 7/10 | (2006.01) |
| H04N 5/64 | (2006.01) |

(52) U.S. Cl.
CPC .......... *G06F 1/1632* (2013.01); *G06F 1/1647* (2013.01); *G06F 3/0481* (2013.01); *G06F 3/147* (2013.01); *G06F 3/1423* (2013.01); *G06F 3/1446* (2013.01); *H04N 5/268* (2013.01); *H04N 5/64* (2013.01); *H04N 5/66* (2013.01); *H04N 7/104* (2013.01); *H04N 7/142* (2013.01); *H04N 7/147* (2013.01); *H04N 7/15* (2013.01); *H04N 7/183* (2013.01); *A47B 2021/066* (2013.01); *A47B 2083/003* (2013.01); *A47B 2083/006* (2013.01)

(56) References Cited

U.S. PATENT DOCUMENTS

| | | |
|---|---|---|
| 1,428,629 A | 9/1922 | Gunn |
| D100,987 S | 8/1936 | Colen |
| D142,121 S | 8/1945 | Ristenpart |
| 2,480,393 A | 8/1949 | Bossert et al. |
| 2,489,933 A | 11/1949 | Schwarz, Jr. |
| D158,160 S | 4/1950 | Viola |
| D158,522 S | 5/1950 | Smith et al. |
| 2,712,972 A | 7/1955 | Manson et al. |
| 3,053,598 A | 9/1962 | Cheslow |
| 3,128,344 A | 4/1964 | Goold |
| 3,177,594 A | 4/1965 | Demo |
| 3,342,147 A | 9/1967 | Shettles |
| D209,841 S | 1/1968 | Bue et al. |
| D209,911 S | 1/1968 | Cooper |
| 3,549,200 A | 12/1970 | Cooper |
| 3,636,892 A | 1/1972 | Linton |
| 3,637,268 A | 1/1972 | Walter |
| 3,741,852 A | 6/1973 | Keener |
| D245,465 S | 8/1977 | Hindle |
| 4,050,165 A | 9/1977 | Yamauchi et al. |
| 4,155,609 A | 5/1979 | Skafte et al. |
| 4,323,291 A | 4/1982 | Ball |
| 4,382,642 A | 5/1983 | Burdick |
| 4,382,643 A | 5/1983 | Heinrich |
| 4,409,906 A | 10/1983 | Alneng |
| 4,516,156 A | 5/1985 | Fabris et al. |
| 4,544,804 A | 10/1985 | Herr et al. |
| 4,562,482 A | 12/1985 | Brown |
| 4,612,863 A | 9/1986 | Vonhausen et al. |
| 4,619,427 A | 10/1986 | Leymann |
| 4,659,048 A | 4/1987 | Fahrion |
| D293,403 S | 12/1987 | Umanoff et al. |
| 4,725,106 A | 2/1988 | Shields et al. |
| 4,732,088 A | 3/1988 | Koechlin et al. |
| 4,735,467 A | 4/1988 | Wolters |
| D295,630 S | 5/1988 | Wells-Papanek et al. |
| 4,758,887 A | 7/1988 | Engel et al. |
| 4,785,472 A | 11/1988 | Shapiro |
| 4,817,903 A | 4/1989 | Braehler et al. |
| 4,836,478 A | 6/1989 | Sweere |
| 4,838,177 A | 6/1989 | Vander Park |
| 4,852,500 A | 8/1989 | Ryburg et al. |
| 4,876,657 A | 10/1989 | Saito et al. |
| 4,922,835 A | 5/1990 | Van Vliet et al. |
| 4,974,173 A | 11/1990 | Stefik et al. |
| 4,974,913 A | 12/1990 | Vogt et al. |
| 4,996,110 A | 2/1991 | Tanuma et al. |
| 5,035,392 A | 7/1991 | Gross et al. |
| 5,065,832 A | 11/1991 | Mark |
| D322,857 S | 12/1991 | Bacus |
| 5,104,087 A | 4/1992 | Wentzloff et al. |
| 5,121,698 A | 6/1992 | Kelley |
| 5,122,941 A | 6/1992 | Gross et al. |
| 5,131,849 A | 7/1992 | Perrero |
| D331,060 S | 11/1992 | Emmons et al. |
| D335,281 S | 5/1993 | Thummel |
| 5,239,373 A | 8/1993 | Tang et al. |
| 5,261,735 A | 11/1993 | Cohen et al. |
| 5,321,579 A | 6/1994 | Brown et al. |
| 5,328,145 A | 7/1994 | Charapich |
| 5,351,241 A | 9/1994 | Yehonatan |
| 5,352,033 A | 10/1994 | Gresham et al. |
| 5,382,972 A | 1/1995 | Kannes |
| 5,392,400 A | 2/1995 | Berkowitz et al. |
| D359,405 S | 6/1995 | Ball |
| 5,438,937 A | 8/1995 | Ball et al. |
| 5,442,788 A | 8/1995 | Bier |
| 5,465,370 A | 11/1995 | Ito et al. |
| D367,857 S | 3/1996 | Emmerik |
| 5,500,671 A | 3/1996 | Andersson et al. |
| D368,721 S | 4/1996 | Howell et al. |
| 5,503,891 A | 4/1996 | Marshall et al. |
| 5,522,324 A | 6/1996 | van Gelder et al. |
| 5,549,267 A | 8/1996 | Armbruster et al. |
| 5,557,725 A | 9/1996 | Ansberry et al. |
| D375,909 S | 11/1996 | Dziersk et al. |
| D376,790 S | 12/1996 | Goulet et al. |
| 5,595,126 A | 1/1997 | Yeh |
| 5,634,018 A | 5/1997 | Tanikoshi et al. |
| 5,638,758 A | 6/1997 | Carr |
| D381,662 S | 7/1997 | Weissberg et al. |
| D382,307 S | 8/1997 | Sharpe, III et al. |
| 5,655,822 A | 8/1997 | Roberts et al. |
| 5,687,499 A | 11/1997 | Brnjac |
| 5,701,981 A | 12/1997 | Marshall et al. |
| D388,639 S | 1/1998 | Dormon et al. |
| 5,712,995 A | 1/1998 | Cohn |
| D390,381 S | 2/1998 | Dormon et al. |
| D392,361 S | 3/1998 | Cooper |
| 5,724,778 A | 3/1998 | Cornell et al. |
| D393,382 S | 4/1998 | Rutter et al. |
| 5,735,220 A | 4/1998 | Wang |
| 5,738,316 A | 4/1998 | Sweere et al. |
| 5,765,315 A | 6/1998 | Nagamitsu et al. |
| 5,767,897 A | 6/1998 | Howell |
| 5,774,460 A | 6/1998 | Schiffel et al. |
| 5,797,666 A | 8/1998 | Park |
| D399,501 S | 10/1998 | Arora et al. |
| 5,831,211 A | 11/1998 | Gartung et al. |
| 5,877,766 A | 3/1999 | Bates et al. |
| 5,918,841 A | 7/1999 | Sweere et al. |
| D413,212 S | 8/1999 | Dame et al. |
| 5,943,966 A | 8/1999 | Machado et al. |
| 5,967,058 A | 10/1999 | Ambrose et al. |
| 5,988,076 A | 11/1999 | Vander Park |
| 5,999,208 A | 12/1999 | McNerney et al. |
| D418,837 S | 1/2000 | Ishii |
| 6,012,398 A | 1/2000 | Boyce |
| 6,057,835 A | 5/2000 | Sato et al. |
| 6,060,993 A | 5/2000 | Cohen |
| 6,072,522 A | 6/2000 | Ippolito et al. |

(56) References Cited

U.S. PATENT DOCUMENTS

| | | |
|---|---|---|
| 6,076,903 A | 6/2000 | Vander Park |
| D427,993 S | 7/2000 | Seal |
| 6,091,408 A | 7/2000 | Treibitz et al. |
| D435,361 S | 12/2000 | Goza |
| 6,158,358 A | 12/2000 | Prendergast |
| 6,160,573 A | 12/2000 | Allen et al. |
| 6,161,487 A | 12/2000 | Chang |
| D435,835 S | 1/2001 | Steck |
| 6,168,127 B1 | 1/2001 | Saylor et al. |
| 6,170,200 B1 | 1/2001 | Cornell et al. |
| 6,170,926 B1 | 1/2001 | Roberts et al. |
| 6,182,580 B1 | 2/2001 | Barrett et al. |
| 6,182,581 B1 | 2/2001 | Boyce |
| 6,189,268 B1 | 2/2001 | Carr et al. |
| 6,199,101 B1 | 3/2001 | Pfaff |
| 6,201,859 B1 | 3/2001 | Memhard et al. |
| 6,203,053 B1 | 3/2001 | Sohrt et al. |
| 6,216,606 B1 | 4/2001 | Kathardekar et al. |
| 6,249,281 B1 | 6/2001 | Chen et al. |
| 6,254,206 B1 | 7/2001 | Petrick et al. |
| 6,266,691 B1 | 7/2001 | Watanabe et al. |
| 6,267,064 B1 | 7/2001 | Ostertag et al. |
| D448,018 S | 9/2001 | Arjomand et al. |
| 6,283,043 B1 | 9/2001 | Stern et al. |
| 6,286,794 B1 | 9/2001 | Harbin |
| 6,288,753 B1 | 9/2001 | DeNicola et al. |
| 6,298,794 B1 | 10/2001 | Brown et al. |
| D452,692 S | 1/2002 | Fukuda |
| 6,359,711 B1 | 3/2002 | Cole et al. |
| D456,155 S | 4/2002 | DeVriendt |
| 6,363,866 B1 | 4/2002 | Schwartz |
| 6,374,547 B1 | 4/2002 | Baloga et al. |
| 6,382,109 B1 | 5/2002 | Novikoff |
| 6,394,402 B2 | 5/2002 | Coonan et al. |
| 6,415,723 B1 | 7/2002 | Kopish et al. |
| D461,822 S | 8/2002 | Okuley |
| 6,427,389 B1 | 8/2002 | Branc et al. |
| 6,435,106 B2 | 8/2002 | Funk et al. |
| D463,439 S | 9/2002 | Olivo |
| 6,443,073 B1 | 9/2002 | Tsang et al. |
| 6,443,415 B1 | 9/2002 | Sundblad |
| 6,453,826 B1 | 9/2002 | Fookes et al. |
| 6,463,460 B1 | 10/2002 | Simonoff |
| 6,497,184 B1 | 12/2002 | Whitesitt |
| 6,554,433 B1 | 4/2003 | Holler |
| 6,574,674 B1 | 6/2003 | May et al. |
| 6,588,346 B1 | 7/2003 | Bockheim et al. |
| 6,598,542 B2 | 7/2003 | Goldberg et al. |
| 6,609,691 B2 | 8/2003 | Oddsen, Jr. |
| 6,614,451 B1 | 9/2003 | Hudson et al. |
| 6,629,505 B1 | 10/2003 | Cronk et al. |
| 6,662,210 B1 | 12/2003 | Carleton et al. |
| 6,662,734 B2 | 12/2003 | Chang |
| D484,886 S | 1/2004 | Matsuoka |
| 6,681,529 B1 | 1/2004 | Baloga et al. |
| 6,695,270 B1 | 2/2004 | Smed |
| D487,469 S | 3/2004 | Glaser et al. |
| 6,714,172 B2 | 3/2004 | Matsuzaki et al. |
| 6,725,784 B2 | 4/2004 | Crinion |
| 6,728,753 B1 | 4/2004 | Parasnis et al. |
| D492,311 S | 6/2004 | Suzuki |
| 6,751,914 B2 | 6/2004 | Zeh et al. |
| D493,177 S | 7/2004 | Retuta et al. |
| 6,774,460 B1 * | 8/2004 | Herbert ............... H01L 29/864 257/186 |
| 6,780,047 B1 | 8/2004 | Laity et al. |
| 6,791,575 B2 | 9/2004 | Abboud |
| 6,816,129 B1 | 11/2004 | Zimmerman |
| 6,831,676 B2 | 12/2004 | Monroe |
| D500,766 S | 1/2005 | Hanisch et al. |
| 6,848,741 B2 | 2/2005 | Ford et al. |
| 6,849,794 B1 | 2/2005 | Lau et al. |
| D505,135 S | 5/2005 | Sapp et al. |
| 6,892,650 B2 | 5/2005 | Baloga et al. |
| D507,002 S | 7/2005 | Retuta et al. |
| 6,931,795 B1 | 8/2005 | Baloga et al. |
| D509,221 S | 9/2005 | Suber et al. |
| D512,064 S | 11/2005 | Li |
| 6,990,909 B2 | 1/2006 | Gosling et al. |
| 7,016,935 B2 | 3/2006 | Lee et al. |
| 7,032,523 B2 | 4/2006 | Forslund, III et al. |
| 7,058,891 B2 | 6/2006 | O'Neal et al. |
| D524,291 S | 7/2006 | Tsang |
| D526,973 S | 8/2006 | Gates et al. |
| 7,092,002 B2 | 8/2006 | Ferren et al. |
| D528,545 S | 9/2006 | Crews |
| 7,113,201 B1 | 9/2006 | Taylor et al. |
| 7,119,829 B2 | 10/2006 | Leonard et al. |
| 7,121,670 B2 | 10/2006 | Salvatori et al. |
| 7,125,088 B2 | 10/2006 | Haberman |
| 7,131,068 B2 | 10/2006 | O'Neal et al. |
| D531,998 S | 11/2006 | El Sayed et al. |
| 7,134,079 B2 | 11/2006 | Brown et al. |
| 7,148,906 B2 | 12/2006 | Sakashita et al. |
| 7,197,535 B2 | 3/2007 | Salesky et al. |
| 7,207,278 B2 | 4/2007 | Latino et al. |
| D542,280 S | 5/2007 | Taylor |
| 7,233,318 B1 | 6/2007 | Farag et al. |
| 7,240,287 B2 | 7/2007 | Qureshi et al. |
| 7,278,360 B2 | 10/2007 | Griepentrog |
| D558,767 S | 1/2008 | Solland |
| 7,317,446 B1 | 1/2008 | Murphy |
| 7,373,605 B2 | 5/2008 | Schaper |
| 7,428,000 B2 | 9/2008 | Cutler et al. |
| 7,434,166 B2 | 10/2008 | Acharya et al. |
| D580,413 S | 11/2008 | Tsao |
| 7,454,708 B2 | 11/2008 | O'Neal et al. |
| D581,927 S | 12/2008 | Sumii |
| 7,493,565 B2 | 2/2009 | Parupudi et al. |
| D589,046 S | 3/2009 | Pascucci |
| D589,497 S | 3/2009 | Andre et al. |
| 7,500,795 B2 | 3/2009 | Sandhu |
| D590,391 S | 4/2009 | Sumii |
| D596,622 S | 7/2009 | Lee |
| 7,558,823 B2 | 7/2009 | Beers et al. |
| D598,008 S | 8/2009 | Shimizu |
| D598,018 S | 8/2009 | Sumii |
| D599,323 S | 9/2009 | Petersen |
| D600,694 S | 9/2009 | Sumii |
| D601,564 S | 10/2009 | Maeno |
| D602,915 S | 10/2009 | Song et al. |
| D602,916 S | 10/2009 | Won et al. |
| D603,457 S | 11/2009 | Julskjer et al. |
| D606,519 S | 12/2009 | Painter |
| D606,979 S | 12/2009 | Henry |
| 7,679,638 B2 | 3/2010 | Eshkoli et al. |
| D617,847 S | 6/2010 | Royer, II et al. |
| 7,734,802 B1 | 6/2010 | Gay et al. |
| 7,761,505 B2 | 7/2010 | Krzyzanowski et al. |
| D624,518 S | 9/2010 | Li |
| 7,797,645 B2 | 9/2010 | Stevens et al. |
| D625,295 S | 10/2010 | Nogueira et al. |
| 7,830,409 B2 | 11/2010 | Hwang et al. |
| 7,876,287 B2 | 1/2011 | McLarty et al. |
| D632,265 S | 2/2011 | Choi et al. |
| 7,899,915 B2 | 3/2011 | Reisman |
| 7,922,267 B2 | 4/2011 | Gevaert |
| 7,926,430 B2 | 4/2011 | Bakker et al. |
| D639,784 S | 6/2011 | Murayama et al. |
| D644,242 S | 8/2011 | Matas |
| D644,243 S | 8/2011 | Matas |
| 7,995,732 B2 | 8/2011 | Koch et al. |
| D651,215 S | 12/2011 | Anzures et al. |
| 8,074,581 B2 | 12/2011 | Epstein et al. |
| 8,086,704 B2 | 12/2011 | Honma |
| D653,262 S | 1/2012 | O'Donnell et al. |
| 8,117,547 B2 | 2/2012 | Parupudi et al. |
| 8,138,942 B2 | 3/2012 | Otsuka et al. |
| 8,212,779 B2 | 7/2012 | Chiang |
| D666,175 S | 8/2012 | Yamada |
| D666,176 S | 8/2012 | Yamada |
| 8,395,713 B2 | 3/2013 | Kondo et al. |
| 8,407,347 B2 | 3/2013 | Zhang et al. |
| D685,790 S | 7/2013 | Tang |

(56) References Cited

U.S. PATENT DOCUMENTS

| | | |
|---|---|---|
| 8,508,573 B2 | 8/2013 | Grimshaw |
| 8,547,414 B2 | 10/2013 | Sheeley |
| 8,554,897 B2 | 10/2013 | Kim et al. |
| 8,620,389 B2 | 12/2013 | Schrager |
| D697,475 S | 1/2014 | Regole |
| D700,904 S | 3/2014 | Miller et al. |
| 8,799,495 B2 | 8/2014 | Wohlert et al. |
| 8,842,152 B2 | 9/2014 | Couse |
| 8,878,891 B2 | 11/2014 | Kenoyer et al. |
| 8,896,656 B2 | 11/2014 | Epstein et al. |
| D726,161 S | 4/2015 | Howard et al. |
| 9,019,868 B2 | 4/2015 | Gorti et al. |
| D729,773 S | 5/2015 | Salojarvi et al. |
| 9,041,865 B2 | 5/2015 | McClymonds et al. |
| 9,083,769 B2 | 7/2015 | Beel et al. |
| 9,094,526 B2 | 7/2015 | Krutsch et al. |
| D736,166 S | 8/2015 | Kuh et al. |
| D747,229 S | 1/2016 | Perez |
| D748,078 S | 1/2016 | Nardin et al. |
| 9,247,204 B1 | 1/2016 | Yin et al. |
| 9,270,784 B2 | 2/2016 | Ridges et al. |
| 9,294,724 B2 | 3/2016 | Grimshaw |
| 9,317,181 B2 | 4/2016 | Sizelove et al. |
| 9,351,077 B1 | 5/2016 | Ford |
| 9,426,422 B2 | 8/2016 | Gandhi |
| 9,492,008 B2 | 11/2016 | Epstein et al. |
| 9,510,672 B2 | 12/2016 | Epstein et al. |
| 9,516,269 B2 | 12/2016 | Zhou et al. |
| 9,549,023 B2 | 1/2017 | Ridges et al. |
| 9,571,866 B2 | 2/2017 | Todd |
| 9,596,433 B2 | 3/2017 | Decker |
| 9,621,603 B2 | 4/2017 | Vadla Ravnas |
| 9,641,576 B2 | 5/2017 | LaFata et al. |
| 9,699,408 B1 | 7/2017 | Epstein et al. |
| 9,710,214 B2 | 7/2017 | Lin et al. |
| 9,722,986 B2 | 8/2017 | Brands et al. |
| 9,723,263 B2 | 8/2017 | Lee |
| 9,736,427 B1 | 8/2017 | Grimshaw |
| 9,871,978 B1 | 1/2018 | Epstein et al. |
| 9,883,740 B2 | 2/2018 | Epstein et al. |
| 2001/0005201 A1 | 6/2001 | Digiorgio et al. |
| 2002/0011197 A1 | 1/2002 | Akyuz |
| 2002/0037668 A1 | 3/2002 | Tseng et al. |
| 2002/0083137 A1 | 6/2002 | Rogers et al. |
| 2002/0132216 A1* | 9/2002 | Dohrmann ............... G09B 5/00 434/362 |
| 2002/0149566 A1 | 10/2002 | Sarkissian |
| 2002/0186236 A1 | 12/2002 | Brown et al. |
| 2002/0194792 A1 | 12/2002 | Feldpausch et al. |
| 2002/0196378 A1 | 12/2002 | Slobodin et al. |
| 2003/0011467 A1 | 1/2003 | Suomela |
| 2003/0098819 A1* | 5/2003 | Sukthankar ............ G09G 3/002 345/1.1 |
| 2004/0150752 A1 | 8/2004 | Iwase |
| 2004/0201628 A1 | 10/2004 | Johanson et al. |
| 2004/0227692 A1 | 11/2004 | Yoon |
| 2004/0236825 A1 | 11/2004 | Doi et al. |
| 2004/0252185 A1* | 12/2004 | Vernon ................. G06Q 10/10 348/14.08 |
| 2005/0036509 A1 | 2/2005 | Acharya et al. |
| 2005/0091571 A1 | 4/2005 | Leichtling |
| 2005/0126446 A1 | 6/2005 | Nobles et al. |
| 2005/0132299 A1 | 6/2005 | Jones et al. |
| 2006/0000955 A1 | 1/2006 | Cvek |
| 2006/0003825 A1 | 1/2006 | Iwasaki et al. |
| 2006/0026162 A1 | 2/2006 | Salmonsen et al. |
| 2006/0044148 A1 | 3/2006 | Daniels et al. |
| 2006/0244817 A1 | 11/2006 | Harville et al. |
| 2006/0267726 A1 | 11/2006 | Arai et al. |
| 2007/0040900 A1 | 2/2007 | Castles |
| 2007/0054735 A1 | 3/2007 | Palermo |
| 2007/0080818 A1 | 4/2007 | Yun et al. |
| 2007/0106950 A1 | 5/2007 | Hutchinson et al. |
| 2007/0123354 A1 | 5/2007 | Okada |
| 2007/0165193 A1 | 7/2007 | Kubo et al. |
| 2007/0242129 A1 | 10/2007 | Ferren et al. |
| 2007/0266266 A1* | 11/2007 | Dubinsky ............. G06F 1/3203 713/300 |
| 2008/0052426 A1 | 2/2008 | Montag |
| 2008/0074343 A1 | 3/2008 | Sasser et al. |
| 2008/0172695 A1 | 7/2008 | Migos et al. |
| 2008/0194942 A1 | 8/2008 | Cumpson et al. |
| 2008/0244641 A1 | 10/2008 | Ho et al. |
| 2008/0266380 A1 | 10/2008 | Gorzynski et al. |
| 2008/0307324 A1 | 12/2008 | Westen et al. |
| 2009/0037821 A1 | 2/2009 | O'Neal et al. |
| 2009/0043846 A1 | 2/2009 | Inoue |
| 2009/0044116 A1 | 2/2009 | Kitabayashi |
| 2009/0044127 A1 | 2/2009 | Bates et al. |
| 2009/0055760 A1 | 2/2009 | Whatcott et al. |
| 2009/0121905 A1 | 5/2009 | Griffin, Jr. et al. |
| 2009/0184924 A1 | 7/2009 | Uchida |
| 2010/0073454 A1 | 3/2010 | Lovhaugen et al. |
| 2010/0302130 A1 | 12/2010 | Kikuchi et al. |
| 2010/0312366 A1 | 12/2010 | Madonna et al. |
| 2010/0312832 A1 | 12/2010 | Allen et al. |
| 2011/0025819 A1 | 2/2011 | Gorzynski et al. |
| 2012/0081277 A1 | 4/2012 | de Paz |
| 2012/0209935 A1 | 8/2012 | Harter et al. |
| 2012/0324047 A1 | 12/2012 | Diner et al. |
| 2013/0081089 A1 | 3/2013 | Kim et al. |
| 2014/0040781 A1 | 2/2014 | Epstein |
| 2014/0267002 A1 | 9/2014 | Luna |
| 2014/0267554 A1 | 9/2014 | Yu et al. |
| 2015/0022342 A1 | 1/2015 | Will et al. |
| 2015/0087236 A1 | 3/2015 | Eun et al. |
| 2015/0144034 A1 | 5/2015 | Epstein et al. |
| 2015/0296061 A1 | 10/2015 | Geiger et al. |
| 2016/0028993 A1 | 1/2016 | Epstein et al. |

FOREIGN PATENT DOCUMENTS

| | | |
|---|---|---|
| DE | 19652108 A1 | 6/1998 |
| DE | 29910262 U1 | 8/1999 |
| EP | 0223091 A2 | 5/1987 |
| EP | 0230236 A1 | 7/1987 |
| EP | 0264589 A2 | 4/1988 |
| EP | 0992921 A2 | 4/2000 |
| EP | 0801342 B1 | 1/2003 |
| GB | 2365662 A | 2/2002 |
| JP | 11332674 A | 12/1999 |
| JP | 2000236329 A | 8/2000 |
| JP | 2006122645 A | 5/2006 |
| WO | 0017737 A1 | 3/2000 |
| WO | 0131397 A1 | 5/2001 |
| WO | 0189156 A2 | 11/2001 |
| WO | 0212992 A2 | 2/2002 |
| WO | 2010105335 A1 | 9/2010 |

OTHER PUBLICATIONS

Elecom, DTS-TS8 (Japanese), 2 pages.
Coeno-Storyboard: An Augmented Surface for Storyboard Presentations, c 2005, Medientechnik und—design, 14 pages.
Brunswick, The Frameworx Line: Center Design and Functionality that Works for Everyone, http://www.brunswickbowling.com/frameworx_line, Jul. 2, 2007, 4 pages.
Polycom, Administrator's Guide for the VSX Series, Feb. 2007 Edition, Version 8.5.3, 3 pages.
European Patent Office, Extended European Search Report, Application No. 08252300.2, dated Oct. 4, 2011.
European Patent Office, Communication, Application No. 08252300.2, dated May 7, 2014.
ISA—The Instrumentation, Systems and Automation Society, Microsoft Opens Productivity Research Center, Sep. 26, 2002, 1 page, http://www.isa.org/InTechTemplate.cfm?Section=InTech&template=/ContentManagement/ContentDisplay.cfm&ContentID=18830.
Stone, Office Space: Designing Your Next Office—A Workplace That Will Know Who You Are, Where You Are and What You're Doing, Newsweek, Apr. 19, 2003, 2 pages, http://msnbc.msn.com/id/3068812/.

(56) References Cited

OTHER PUBLICATIONS

Microsoft Corporation, Enhanced Microsoft Exhibit Offers Sneak Peek at Office of the Future, Mar. 22, 2004, 6 pages, http://www.microsoft.com/presspass/features/2004/mar04/03-22CIW.asp
Coursey, Microsoft's Vision of Tomorrow Sparks Wonder, Fear, eWEEK.com, Jul. 12, 2004, 3 pages, http://www.eweek.com/print_article/0,1761,a=131281,00.asp.

* cited by examiner

Concept_ use scenario

Jim's team begins with a technical review at their MP space, using the media scape capabilities to share & update product specs and illustrations from their laptops.

When it's time to connect with the Samantha, and the Tokyo team, Jim's team doesn't need to move to a videoconference room. Instead, Jim brings up the MP room's videoconferencing capabilities.

First he connects with Samantha, to fill her in on the team's technical review. The lighting in the MP space adjusts in intensity and color temperature, to make sure the video feed is well-lit, and to remind participants that a video connection is live.

Jim brings Samantha up on one of the two side screens, and pulls the display close to the table, to be closer to the team. Leslie's view is from the camera above that screen, to improve the level of eye contact across the remote connection.

When Jim and Samantha are ready to collaborate with, Tokyo, Jim brings up Tokyo's MP space on the center screen.

The two teams can hold a traditional video conference on the larger center screen. Jim can read Sara's facial cues and body language, to better assess the intangible elements of agreement. Sara can read Jim's cues when confirming technical challenges the proposal takes on.

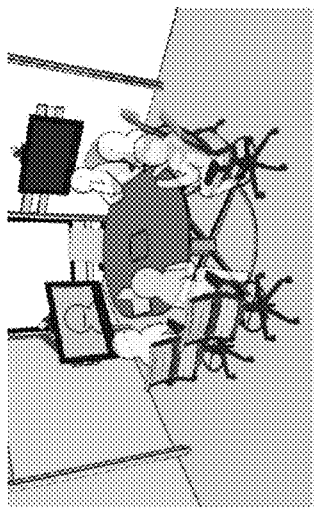
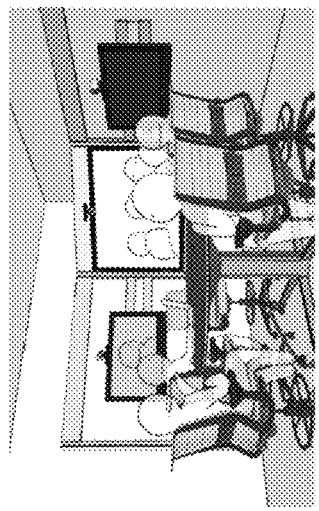

Fig. 43

Concept_ use scenario

It is time to focus on the proposed package, being written in Tokyo. Jim slides the videoconference view over to a side screen. Sara does the same thing, and both teams bring up the document from Tokyo's location, on the center screen.

When Tokyo slides their view of Buffalo onto a side screen, Jim's view of Tokyo automatically slides as well. This way, each team can see when their counterparts are looking at the document, and when they've turned their hands to talk directly to each other.

Each room also has a wide-angle context cam, which shows an overview of the entire space. Sara can see the Buffalo space on this view. It's a large room, and seeing that it is filling up with members of the technical staff lets her know this proposal is getting the attention it needs from Jim's team.

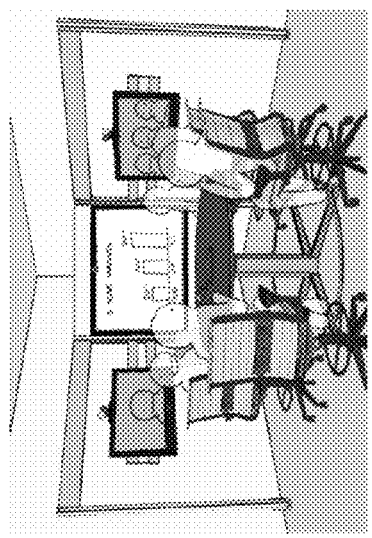

Fig. 44

Concept_use scenario

*The two teams collaborate through media:scape sharing, Evo, WebEx, etc. Movable side screens allow Sara to huddle with a couple of Jim's team, while the main group continues to focus on the document creation.*

*A detail cam at the media:scape table also allows a member of Jim's team to show some new product features to the Tokyo team. Tokyo had requested these features, and seeing them lets them review the changes in real-time with the engineers. Also, Jim can see over video that his Sara is satisfied with the results. It's saved him from making a second prototype just to send overseas.*

*Finally, both teams are satisfied with their progress. Jim's team and Samantha both sign off. In Tokyo, Sara's team continues at their media:scape, to finish making updates to the proposed package and including screenshots of the new features Jim's team has developed.*

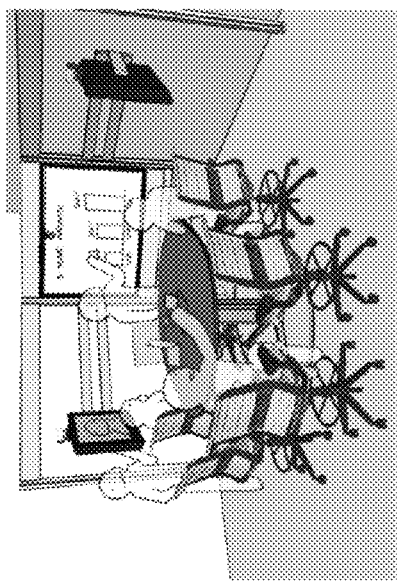

Collaboration over video, as envisioned for Living On Video

Fig. 45

Concept_elements

The MP concept brings workspace design, video communication, and informational tools together in a configurable and user-adaptable space.

The physical layout of the MP workspace is configured to bring local and remote participants together by integrating collaboration and information sharing technologies – enabled by two primary elements: a suite of large video displays, which can be used for videoconferencing or information sharing and arrayed around a mediascape table where participants assemble.

Collaboration is extended to remote participants through a unique set of videoconferencing cameras, with a views management system that heightens the collaborative experience between remote and local team members. This connection is orchestrated by an on-screen interface designed, like mediascape, to allow the technology tools to support collaboration, rather than control it.

The MP brings these powerful tools together in an innovative setting that supports natural collaborative behaviors by making interpersonal connections, sharing content, and giving everyone a seat at the table.

MP reference design prototype

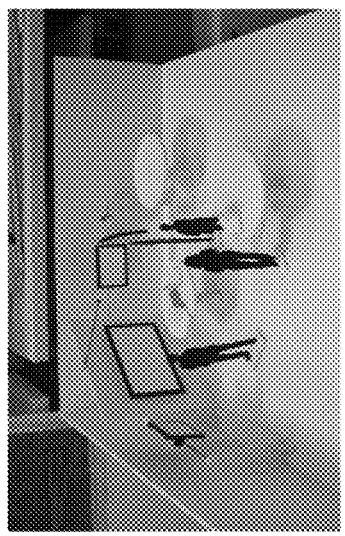

MP reference design works prototype

Fig. 46

Spatial Configuration_ triptych

The MP space includes three large format, high definition displays. These are scaled for appropriate use as information displays or videoconferencing. The vertical height of each display should be appropriate to the seating height in the room, to ensure the displayed information and remote participants are at the same visual level as the participants in the room.

The three display screens are arranged as a large central screen, with smaller displays to either side. In the reference configuration prototyped, the screens are "built into a corner" with the triptych of screens forming a 90 degree angle, and the central screen bridging the corner at a 45 degree angle from either wall.

The triangular corner space behind the main screen may be a natural staging area for the technology hardware required in this space.

Each display is paired with one or more videoconference cameras and an optional speaker.

Fig. 50

Spatial Configuration_ triptych

Both side displays are movable, allowing flexibility of positioning, for different modes of use and different group sizes. In the MP prototype, three sets of movements were demonstrated:

horizontal rail along the wall plane enabled lateral movement towards and away from the central display.

dual pivoting monitor arm on the rail which allowed translation away from the wall in an arc, and pivoting at the end of that arc.

rotating about the center of the display to enable landscape and portrait modes of the display.

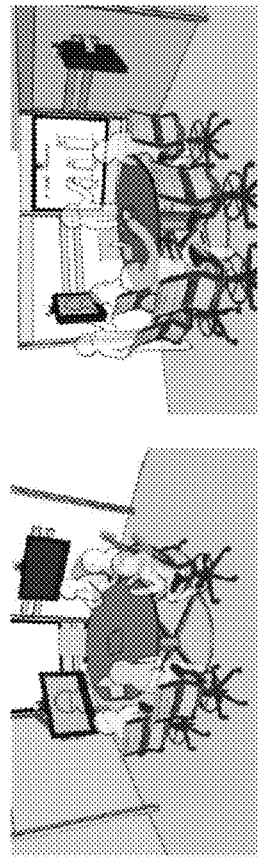

Alternate side display positions in a MP setting, from MP Charrettes.

Fig. 51

Spatial Configuration_ media:scape

A media:scape table is the main worksurface in the MP space, and is an integral part of the overall spatial and technological experience. In this reference design, the media:scape table is at stool-height, which maximizes the dynamic movement and participation within the space. Desk-height and lounge-height applications are also envisioned to support other postures and different levels of dynamic interaction and formality within the space.

The table is located at the center of the triptych with appropriate spacing between the table and the three displays to allow easy movement for all participants.

Fig. 53

Spatial Configuration_boom

An overhead Boom is anchored to the triptych support structure and extends over the work space to a point above the center of the mediascape table. The boom is intended to host supplemental lighting, a downward-facing document camera, microphones, and/or speakers

A boom anchored to the center display, and bending over the mediascape table.

Fig. 54

Technology Configuration_ displays

The MP space includes three large format, high definition displays. The displays are scaled for appropriate use as information displays or videoconferencing, since they will be used interchangeably for both purposes -- to show remote collaborators over videoconference, or to show and share digital content using mediascape.

The three display screens are arranged as a large center screen, with smaller displays to either side.

The center screen is the primary display. The prototypical center screen is a 55" – 65" high definition LCD monitor, appropriate for videoconferencing, different sized spaces and number of participants.

The side displays were prototyped with 37" high definition LCD monitors and intended to support a 32" – 42" diagonal range.

Each display is outfitted with one or more videoconference cameras and an optional speaker.

Each display / camera set's inputs and outputs are managed thru a video switcher.

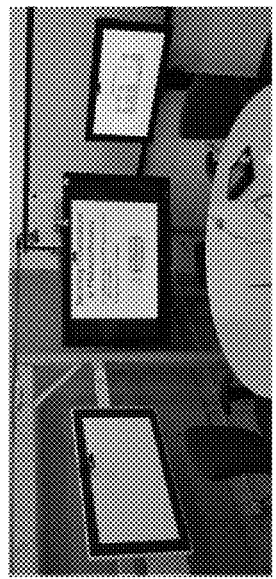

Fig. 56

Technology Configuration_ cameras

The Multiple Camera Array (MCA) is an interlinked array of cameras and displays which creates a multitude of virtual / remote vantage points, allowing a much richer, dynamic interaction between collaborators on any side of the camera.

The concept of the MCA builds on IDEO and Steelcase research insights that providing a dynamic array of vantage points into a space increases the engagement of participants working remotely in that space.

Multiple vantage points provide a broader, richer, more natural sense of the remote space, and similarly allows a sense of movement within that space. This sense of active movement can provide a richer connection to other participants physically in the space.

Quarter examples for screens of the same view

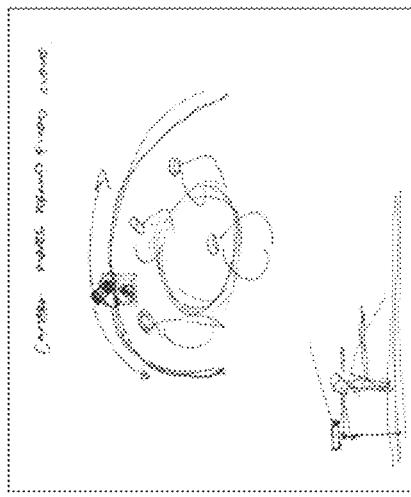

Early concept for mobile camera / viewpoints from HP Sparrows

Fig. 57

Technology Configuration_ cameras

In the MP concept, the MCA consists of video cameras (or sets of coaxial video cameras) that are linked to, and coaxial with, each of the three display screens.

The cameras and displays are linked so that when a remote participant is shown on any particular screen, their view of the space comes from the camera mounted to that display. Therefore, when local participants in the room look to that image, they are always seen on the far side to be looking at that participant.

Since the MP space can host up to three separate sets of linked cameras and displays, conversations between these different sets of participants will create natural movements of attention, like turning towards speakers, between speakers, etc.

Fig. 58

Technology Configuration_ cameras

An additional vantage point provided by the MCA will be one or more wide-angle Context Cameras.

Context cameras are designed to provide a wide-angle overview of the physical space to remote participants. This provides an analog to the context-setting behaviors that are naturally available to local participants through the ability to look and hear around the room, 3D depth and aural cues, etc.

Having a Context view available allows remote participants to check on and participate in a wider range of social activities such as seeing who is arriving, anticipating the collaboration to begin, adjourning, and even picking up environmental cues such as the time of day and weather.

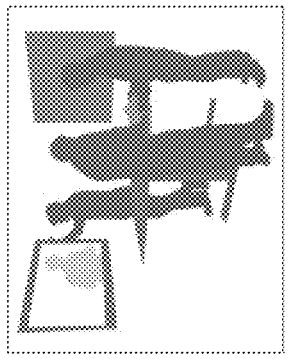

*Video details from Context might be provided by a context camera as a movable display.*

*Context Camera (right) located with standard camera*

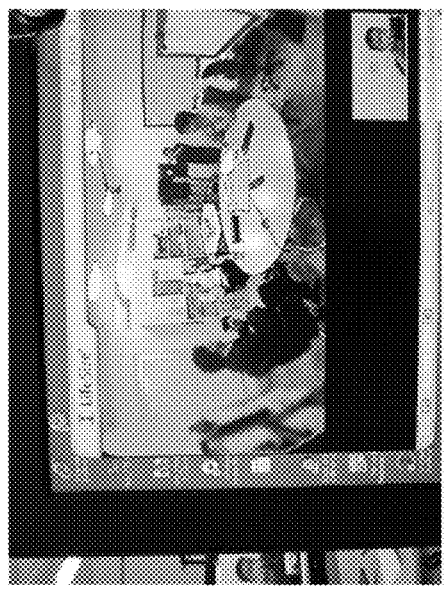

*Wide angle camera captures all four walls and the doorway*

Fig. 59

Technology Configuration_ cameras

Another vantage point in the MCA will be a close-up/document camera, to allow detailed video communication of documents, objects, and other physical artifacts at any one location. This may be permanently mounted as a downward facing camera on the overhead boom, or it may be a hand-held camera connected to the media:scape table's media well optional input.

Similarly, a camera can be positioned to cover a whiteboard or tackable display wall, to capture written notes, pin-ups, post-its, etc.

Fig. 60

Technology Configuration_ lighting

Programmable lighting can be integrated into the space for use primarily as supplemental lighting when videoconferencing is active. The best lighting to produce a well lit image for remote participants is often more intense than what is needed for local participants.

Lighting levels and color temperatures can be linked to the MCA control system, so that lighting intensity is reduced for local meetings, and is increased when cameras are needed for remote participants. This programmability also opens the door to being able to tune the color temperature to create tones or moods with the lighting, or to mirror or match lighting conditions between locations.

Additionally, the variability in lighting can serve as a signal to adjacent spaces that videoconferencing is occurring now.

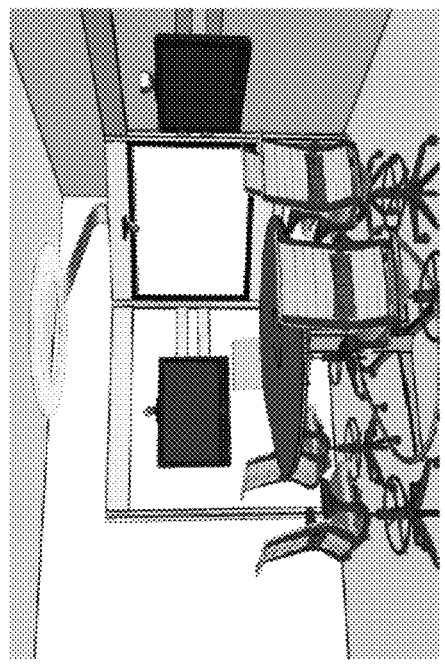

Room-mounted lighting concept from MP Cherote

Fig. 62

Experience_ UI Strategy

Steelcase has had success with the simplified user interaction model designed for the mediascape collaboration setting. This simple interaction model is appropriately sized for the closed system that mediascape was designed to be: no more than a team's worth of laptop-based input, to be displayed among no more than 4 screens, all within the same shared space.

The MP presents an information space of much greater complexity: both laptops and videoconference data, shared among local displays as well as fed to potentially many remote collaboration sites, each sharing out the same number of channels. Locations may also be very asymmetrical in their information flow; fully equipped MP settings also need to communicate with single participants on laptops or other simple single-camera video calling settings.

The most important functions of the user interface are to effectively manage and queue the available channels of input, and to intuitive allow these inputs to be displayed, including seamlessly dynamic switching of data between displays, and between queue and display. A successful UI will be able to retain & display the appropriate information about each channel in play, which might include unique participant identification.

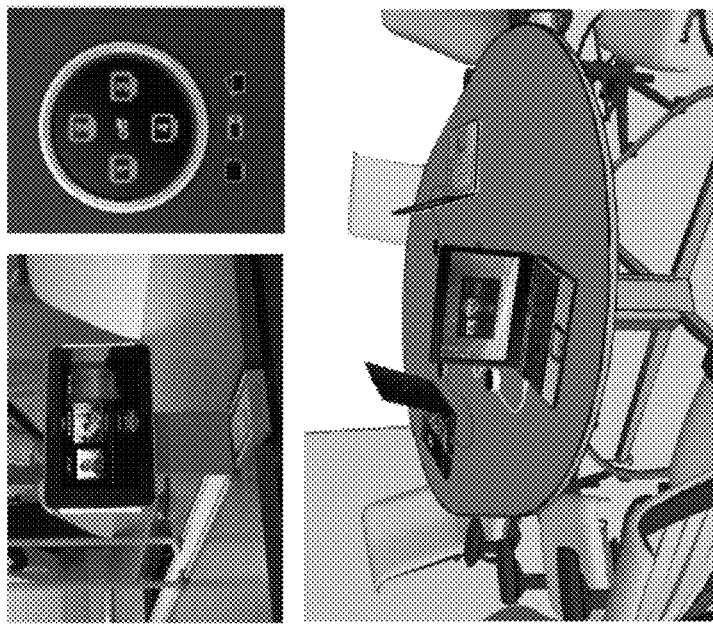

Fig. 63

Experience_ GUI Prototype

This visual prototype represents some initial thinking around the requirements and capabilities needed in the UI for the MP Space and MCA.

The visual language of the GUI is based on the Virtual Puck, which is being developed as a direct (but expanded) on-screen analog to the physical media:scape PUCK.

The MP GUI includes an area showing active displays, mirroring the configuration of the LCD screens arrayed in the physical space.

Below is an area acting as a queue, which shows available input channels (from media:scape, or from remote participants' cameras).

The queue area may be further divided to give additional information about the source of each available input channel, since remote MP locations may produce multiple channels of data (e.g. videoconference, laptop content from media:scape) that would be available to other participants.

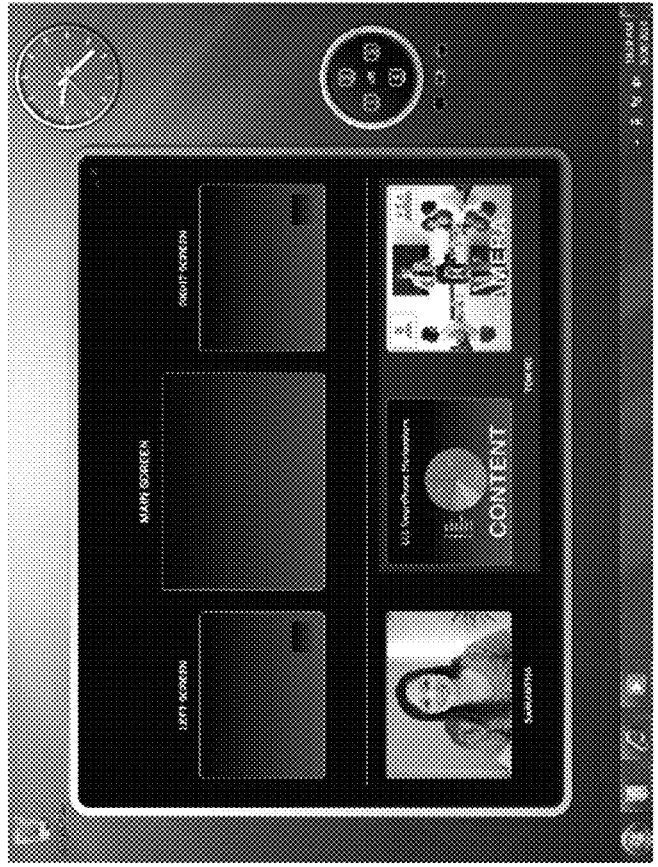

Fig. 64

Experience_ GUI Prototype
Main features of the GUI prototype are:
 Placing content from the queue involves selecting an available input...
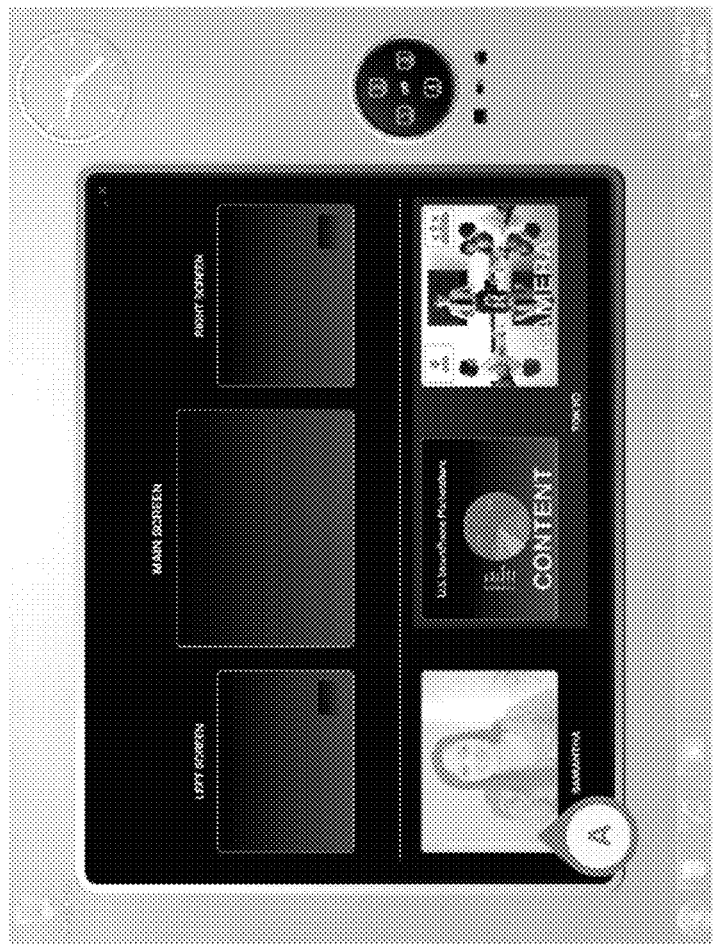
Fig. 66

EGALITARIAN CONTROL APPARATUS AND METHOD FOR SHARING INFORMATION IN A COLLABORATIVE WORKSPACE

CROSS-REFERENCE TO RELATED APPLICATIONS

This application is a continuation of U.S. patent application Ser. No. 13/912,442 which was filed on Jun. 7, 2013 and which is titled "Personal Control Apparatus And Method For Sharing Information In A Collaborative Workspace" which is a continuation in part of U.S. patent application Ser. No. 12/474,670 which is titled "Personal Control Apparatus and Method For Sharing Information In A Collaborative Workspace" which was filed on May 29, 2009 and which was also a continuation in part of U.S. patent application Ser. No. 13/481,436 which is titled "Collaboration Method And Apparatus" which was filed on May 25, 2012, each of which is incorporated herein in its entirety.

STATEMENT REGARDING FEDERALLY SPONSORED RESEARCH OR DEVELOPMENT

Not applicable.

BACKGROUND OF THE INVENTION

The present invention relates to the presentation of audio-visual information via one or more large format common displays in a collaborative workspace and more specifically to a fast and intuitive controller allowing a meeting participant with a laptop computer to quickly and easily control the presentation of laptop information on common displays.

Small group conference tables usable as collaborative workspaces have been designed with one or more large video displays such as a LCD flat-panel monitor or a wall suitable for having images projected thereon, connected to or adjacent the conference table. The basic intent behind such workspace designs is to provide information at or near a table edge for attendees to refer to during discussions and presentations. In many cases, the video display is connected to and driven by a dedicated computer.

Oftentimes, more than one attendee needs to be able to control the information presented on the video display at different times during a conference. One way to allow several attendees to present information on a video display screen is to have each presenter sequentially connect their laptop computer directly to the display or projector with a dedicated audio/video cable. Though straightforward and simple, having to repeatedly disconnect and connect the cable from one laptop computer to another takes time and is disruptive.

Another way of enabling several attendees to share audio-visual information from their own laptop computers via a common large video display screen is to provide separate audio/video cables for each presenter and connect each of the laptops to an audiovisual switching device that enables the attendees to take control of the common display screen via selection of a button associated with each of the audio/video cables.

While such arrangement provide a relatively quick transition between presenters, such arrangements typically require a separate controller or control program and a number of less-than-intuitive steps that must be followed to transition from one presenter to another. Further, known such arrangements do not provide a quick and intuitive indication as to which presenter is sharing their information via the video display screen. As a result, meeting presenters and participants may experience confusion and delay between transitions. Such user experiences may result in a loss of productivity and in general, can be significant impediments to the successful collaboration between conference participants and willingness of participants to use the system.

Thus, while solutions for managing and controlling the flow of information from interconnected computing devices have been developed, known solutions do not provide simple and intuitive steps for selecting which information is shared via the video display and for indicating which of several video/audio resources currently control presented information.

BRIEF SUMMARY OF THE INVENTION

It has been recognized that a simple control interface may be provided where the interface provides feedback to configuration users indicating which of several different conference attendees is presenting information via one or more common display screens or presentation spaces. To this end, a separate control interface is provided for each of a plurality of attendees where each interface includes control buttons or the like and indicators that can indicate visually distinguished states. For instance, when a laptop or other video/audio source is linked to one of the control interfaces, the interface may visually indicate that the laptop is in a state wherein the laptop may be used to present information via one or more common displays but that the laptop is not currently presenting. When a user selects one of the buttons on the interface to present information on the common display, the indicator may change appearance to visually indicate to attendees that the laptop linked to the interface is presenting.

It has also been recognized that where a configuration includes more than one common display, it would be useful to provide an indication to each configuration user as to common display options which can be selected and which common displays are currently being driven via a user's laptop or other source. To this end, in at least some cases each control interface is configured to include a separate selectable buttons for each common display where, when a button is selected so that a source associated with the interface is to drive an associated display, the appearance of the button or an indicator associated therewith is modified to indicate to the user which of the common displays is currently being driven. In particularly advantageous embodiments the indicators include illumination devices wherein different illumination colors indicate different states or conditions.

Some embodiments include a method for use with a first presentation system including at least first and second display screens and a wireless access device, the method comprising the steps of providing a processor programmed to perform the steps of, receiving a wireless association request signal from a first portable user device identifying the first portable user device, identifying the first presentation system and requesting that the first portable user device be associated with the first presentation system, in response to the identifying signal, associating the first portable user device with the first presentation system, wirelessly providing first presentation system specifying information to the first portable user device that is usable to create an on screen interface for selecting any subset of the at least first and second display screens of the first presentation system for sharing information from the first portable user device via the first presentation system, receiving a wireless selection signal from the first portable user device indicating a subset of the at least first and second display screens of the first presentation system, in response to the selection signal, associating the first portable user device with the selected subset of the at least first and second display screens of the first presentation system, wirelessly receiving data from the first portable user device and using the received data from the first portable user device to present information via the selected subset of the at least first and second display screens of the first presentation system.

In at least some cases the processor is further programmed to perform the step of, presenting a first presentation system pass code via at least one of the first presentation system display screens, the step of receiving a wireless association request signal from a first portable user device identifying the first presentation system including receiving the pass code from the first portable device. In some embodiments the processor is programmed to only periodically provide the pass code via the at least one of the first presentation system display screens.

In at least some cases the processor is programmed to identify when an unassociated portable device enters a space proximate the first presentation system and wherein the processor provides the pass code via the at least one of the first presentation system display screens when an unassociated portable device initially enters the space proximate. In some embodiments the processor is programmed to monitor for a pass code request signal from portable devices and when a pass code request signal is received, the processor provides the pass code for a finite period via the at least a first display screen of the first presentation system.

In at least some cases the presentation system includes at least third and fourth display screens in addition to the first and second display screens and wherein the presentation system specifying information specifies an interface that is sable to select any subset of the first through fourth display screens of the first presentation system. In at least some cases the step of wirelessly receiving data from the first portable user device includes receiving streaming data from the first portable device. In some embodiments the step of receiving streaming data includes receiving data specifying the instantaneous appearance of at least a subset of the information presented via a display screen on the first portable device.

In some embodiments the processor is further programmed to perform the steps of associating at least a second portable user device with the first presentation system at the same time that the first portable user device is associated with the first presentation system and, after receiving a wireless selection signal from the first portable user device indicating a subset of the at least first and second display screens of the first presentation system, receiving a wireless selection signal from the second portable user device indicating a subset of the at least first and second display screens of the first presentation system, in response to the selection signal from the second portable user device, associating the second portable user device with the subset of the at least first and second display screens of the first presentation system selected via the selection signal from the second portable user device, wirelessly receiving data from the second portable user device, using the received data from the second portable user device to present information via the selected subset of the at least first and second display screens of the first presentation system selected via the selection signal from the second portable user device, and, continuing to use the received data from the first portable user device to present information via the display screens selected via the selection signal from the first portable user device that are not included in the screens selected via the selection signal from the second portable user device.

In at least some cases the processor is further programmed to perform the step of, upon receiving selection signals from other portable user devices after the selection signal from the first portable user device that include all of the presentation system display screens selected via the selection signal from the first portable user device, transmitting a deselect signal to the first portable user device indicating that the first portable user device should stop transmitting data to the first presentation system. In some embodiments the step of receiving a wireless selection signal includes receiving a selection signal that indicates at least two display screens of the first presentation system. In at least some cases the processor is associated with a plurality of different presentation systems and wherein the processor performs the method steps for each of the presentation systems.

Other embodiments include a method for use with a first presentation system including at least first and second display screens and a wireless access device, the method comprising the steps of providing a wireless portable user device including a processor and a display screen, the processor programmed to perform the steps of, presenting an interface via the display screen including a pass code field for entering a presentation system pass code, receiving a pass code entered into the pass code field, creating an association request signal indicating the identity of the portable user device and including the pass code as well as requesting that the portable user device be associated with the first presentation system, wirelessly transmitting the association request signal to the first presentation system, receiving presentation system specifying information usable to create an on screen selection interface for selecting any subset of the at least first and second display screens of the first presentation system for sharing information from the portable user device via the first presentation system, using the received presentation system specifying information to create an on screen selection interface for selecting any subset of the at least first and second display screens of the first presentation system on the portable user device display screen, receiving a selection signal via the on screen selection interface indicating a subset of the at least first and second display screens of the first presentation system, transmitting the selection signal to the first presentation system, wirelessly transmitting data from the portable user device to the first presentation system that is usable to present information via the selected subset of the at least first and second display screens of the first presentation system.

In at least some cases the presentation system includes at least third and fourth display screens in addition to the first and second display screens and wherein the presentation system specifying information specifies an interface that is able to select any subset of the first through fourth display screens of the first presentation system. In some embodiments the step of creating a selection interface includes presenting the selection interface persistently via the portable device display screen irrespective of other content provided on the portable device display screen. In some embodiments the interface includes a window overlaid on application content on the portable user device display screen. In some embodiments the step of transmitting data to the first presentation system includes transmitting data specifying the instantaneous appearance of at least a subset of the information presented via a display screen on the portable device.

In at least some cases the step of transmitting data to the first presentation system includes transmitting data specifying the instantaneous appearance of the portable user device display screen without the selection interface. In at least some cases the step of transmitting data to the first presentation system includes transmitting streaming data specifying the instantaneous appearance of the portable user device display screen. In at least some cases, after the processor starts transmitting data to the first presentation system that is usable to present information via the first presentation system display screens, the processor persistently transmits data to the first presentation system until a deselect signal is received by the processor at which point the processor ceases transmitting data to the first presentation system. In some embodiments the deselect signal is wirelessly received from the first presentation system upon at least one other portable user device selecting the subset of display screens previously selected via the portable user device.

Yet other embodiments include a method for use with a first presentation system including at least first and second display screens and a wireless access device, the method comprising the steps of providing a processor programmed to perform the steps of, presenting a first presentation system pass code via at least one of the first presentation system display screens, receiving a wireless association request signal from a first portable user device identifying the first portable user device, including the first presentation system pass code, and requesting that the first portable user device be associated with the first presentation system, in response to the identifying signal, associating the first portable user device with the first presentation system, wirelessly providing first presentation system specifying information to the first portable user device that is usable to create an on screen interface for selecting any subset of the at least first and second display screens of the first presentation system for sharing information from the first portable user device via the first presentation system, receiving a wireless selection signal from the first portable user device indicating a subset of the at least first and second display screens of the first presentation system, in response to the selection signal, associating the first portable user device with the selected subset of the at least first and second display screens of the first presentation system, wirelessly receiving data from the first portable user device specifying the instantaneous appearance of at least a subset of the information presented via a display screen on the first portable device and using the received data from the first portable user device to present the received data via the selected subset of the at least first and second display screens of the first presentation system.

Still other embodiments include a system for sharing information from a portable device, the system comprising a plurality of first presentation system display screens including at least first and second display screens, a wireless access device, a processor, the processor programmed to perform the steps of, presenting a first presentation system pass code via at least one of the first presentation system display screens, receiving a wireless association request signal from a first portable user device identifying the first portable user device, including the first presentation system pass code, and requesting that the first portable user device be associated with the first presentation system, in response to the identifying signal, associating the first portable user device with the first presentation system, wirelessly providing first presentation system specifying information to the first portable user device that is usable to create an on screen interface for selecting any subset of the at least first and second display screens of the first presentation system for sharing information from the first portable user device via the first presentation system, receiving a wireless selection signal from the first portable user device indicating a subset of the at least first and second display screens of the first presentation system, in response to the selection signal, associating the first portable user device with the selected subset of the at least first and second display screens of the first presentation system, wirelessly receiving data from the first portable user device specifying the instantaneous appearance of at least a subset of the information presented via a display screen on the first portable device and using the received data from the first portable user device to present the received data via the selected subset of the at least first and second display screens of the first presentation system.

Other embodiments include a portable user apparatus for use with a first presentation system including at least first and second display screens and a wireless access device, the apparatus comprising a housing, a portable user device display supported by the housing, a wireless transmitter supported by the housing, a portable user device processor linked to the display and the transmitter, the processor programmed to perform the steps of, presenting an interface via the display screen including a pass code field for entering a presentation system pass code, receiving a pass code entered into the pass code field, creating an association request signal indicating the identity of the portable user device and including the pass code as well as requesting that the portable user device be associated with the first presentation system, wirelessly transmitting the association request signal to the first presentation system, receiving presentation system specifying information usable to create an on screen selection interface for selecting any subset of the at least first and second display screens of the first presentation system for sharing information from the portable user device via the first presentation system, using the received presentation system specifying information to create an on screen selection interface for selecting any subset of the at least first and second display screens of the first presentation system on the portable user device display screen, receiving a selection signal via the on screen selection interface indicating a subset of the at least first and second display screens of the first presentation system, transmitting the selection signal to the first presentation system, wirelessly transmitting data from the portable user device to the first presentation system that is usable to present information via the selected subset of the at least first and second display screens of the first presentation system.

Some embodiments include a method of selecting information from video sources to be displayed on at least a subset of a plurality of display screen presentation spaces in a collaborative workspace having a switching device, the method comprising the steps of providing at least first and second independent selectable control interfaces, each interface including a separately selectable control uniquely associated with each of the display screen presentation spaces, uniquely associating first and second video sources with the first and second control interfaces, respectively, for each control interface, receiving an indication each time one of the selectable controls is selected and upon receiving an indication that one of the selectable controls has been selected via one of the control interfaces, providing the video source associated with the control interface used to make the selection to the display screen presentation space associated with the selected selectable control so that the video source generates images on the display screen presentation space.

In some cases wherein step of providing control interfaces includes providing the first and second control interfaces on display screens of first and second computing devices, respectively, and wherein the first and second video sources generate images on the display screens of the first and second control interfaces, respectively. In some embodiments, upon receiving an indication that one of the selectable controls has been selected via one of the control interfaces, the images generated on the selected display screen presentation space mirror the images generated by the video source on the display screen of the control interface used to make the selection. In some cases the first and second control interfaces are provided along edges of the display screens of the first and second computing devices, respectively, so that the images generated by the video sources are substantially unobstructed by the control interfaces.

In some cases the plurality of display screen presentation spaces are arranged relative to each other and, wherein, the selectable controls are arranged relative to each other in a fashion which mimics the arrangement of the plurality of display screen presentation spaces. In some embodiments the plurality of display screen presentation spaces include four separate presentation spaces and wherein each of the control interfaces includes four selectable controls, a separate selectable control for each of the four separate display screen presentation spaces. In some embodiments each of the display screen presentation spaces is provided by a separate display screen. In some cases the separate display screens are arranged relative to each other, each of the separate control interfaces is provided on a display screen of a separate computing device and, wherein, the selectable controls are arranged relative to each other on each of the computing device display screens in a pattern that mirrors the arrangement of the plurality of display screens.

In some cases, while the first video source is provided to one of the display screen presentation spaces, receiving an indication that the control on the first control interface associated with the one of the display screen presentation spaces has been selected and, upon receiving the indication that the control on the first control interface associated with the one of the display screen presentation spaces has been selected while the first video source is provided to the one of the display screen presentation spaces, disconnecting the first video source from the one of the display screen presentation spaces. In some cases a separate indicator is associated with each of the selectable controls, the method further including the step of modifying the appearance of an indicator upon selection of a selectable control associated with the indicator. In some cases each of the indicators is capable of indicating each of three different states, the method further including the steps of causing an indicator to indicate a first state when no video source is associated with a corresponding control interface, a second state while a video source is associated with a corresponding control interface and while the associated selectable control remains unselected and a third state while a video source is associated with a corresponding control interface and while the video source is provided to the display screen presentation space associated with the selectable control that is associated with the indicator.

In some cases the first and second control interfaces are provided on display screens of first and second portable computing devices, respectively, the step of providing first and second control interfaces including, for each of the first and second portable computing devices, moving the computing device into the workspace, associating the computing device with the workspace, identifying the number of display screen presentation spaces associated with the workspace and generating a control interface with a separate selectable control for each of the identified number of display screen presentation spaces. In some cases, each time an additional portable computing device is moved into the workspace, the method includes the step of providing a control interface for the display screen presentation spaces associated with the workspace on a display screen of the additional portable computing device.

Other embodiments include a method of selecting information from video sources to be displayed on at least a subset of a plurality of display screen presentation spaces in a collaborative workspace, the method for use with a plurality of portable computing devices, each computing device having a computing device display screen, each computing device providing a separate video source that presents images on the display screen of the computing device, the method comprising the steps of on each display screen of the plurality of portable computing devices, providing a control interface in addition to images from the video source provided by the computing device, each control interface including a separately selectable control uniquely associated with each of the display screen presentation spaces, for each control interface, receiving an indication each time one of the selectable controls is selected and upon receiving an indication that one of the selectable controls has been selected, providing the video source provided by the portable computing device used to make the selection to the display screen presentation space associated with the selected selectable control so that the video source generates images on the display screen presentation space. In some cases the control interfaces are provided along edges of the computing device display screens so that the images generated by the video sources on the computing device display screens are substantially unobstructed by the control interfaces. In some cases the plurality of display screen presentation spaces are arranged relative to each other and, wherein, the selectable controls on each control interface are arranged relative to each other in a fashion which mimics the arrangement of the plurality of display screen presentation spaces.

In some cases each of the portable computing devices is associated with a different device user and wherein each of the controls indicates the identity of a user associated with the portable computing device currently driving a display screen presentation space associated with the control. In some cases each of the portable computing devices is associated with a different device user and wherein each of the display presentation spaces, in addition to presenting images from an associated video source, indicates the identity of a user associated with the portable computing device currently driving the display screen presentation space.

In some cases the plurality of display screen presentation spaces includes at least first and second presentation space subsets that are spaced apart within the workspace, each control interface including first and second sets of selectable controls spaced apart on the display screen of an associated portable computing device to mimic the arrangement of the display screen presentation spaces within the workspace.

Still other embodiments include a system for selecting information from video sources to be displayed on at least a subset of a plurality of display screen presentation spaces in a collaborative workspace, the system for use with a plurality of portable computing devices, each computing device having a computing device display screen, each computing device providing a separate video source that presents images on the display screen of the computing device, the method comprising the steps of providing a processor programmed to perform the steps of on each display screen of the plurality of portable computing devices, providing a control interface in addition to images from the video source provided by the computing device, each control interface including a separately selectable control uniquely associated with each of the display screen presentation spaces for each control interface, receiving an indication each time one of the selectable controls is selected and upon receiving an indication that one of the selectable controls has been selected, providing the video source provided by the portable computing device used to make the selection to the display screen presentation space associated with the selected selectable control so that the video source generates images on the display screen presentation space.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE SEVERAL VIEWS OF THE DRAWINGS

FIG. 43 is a perspective view of a conferencing space including components that are consistent with at least some aspects of the present invention;

FIG. 44 is a perspective view of a conferencing space including components that are consistent with at least some aspects of the present invention;

FIG. 45 is a perspective view of a conferencing space including components that are consistent with at least some aspects of the present invention;

FIG. 46 is a perspective view of a conferencing space including components that are consistent with at least some aspects of the present invention;

FIG. 50 is information related to the image shown in FIG. 49;

FIG. 51 is a perspective view of a conferencing space including components that are consistent with at least some aspects of the present invention;

FIG. 53 is information related to the image shown in FIG. 52;

FIG. 54 is a perspective view of a conferencing space including components that are consistent with at least some aspects of the present invention;

FIG. 56 is a perspective view of a conferencing space including components that are consistent with at least some aspects of the present invention;

FIG. 57 is a perspective view of a conferencing space including components that are consistent with at least some aspects of the present invention;

FIG. 58 is information related to the image shown in FIG. 57;

FIG. 59 includes several images showing embodiments that are consistent with at least some aspects of the present invention;

FIG. 60 includes information related to the images in FIG. 59;

FIG. 62 is a perspective view of a conferencing space including components that are consistent with at least some aspects of the present invention;

FIG. 63 is a perspective view of a conferencing space including components that are consistent with at least some aspects of the present invention;

FIG. 64 is a schematic diagram illustrating an exemplary interface that is consistent with at least some aspects of the present invention;

FIG. 66 is a schematic diagram illustrating an exemplary interface that is consistent with at least some aspects of the present invention;

DETAILED DESCRIPTION OF THE INVENTION

Figure 1:
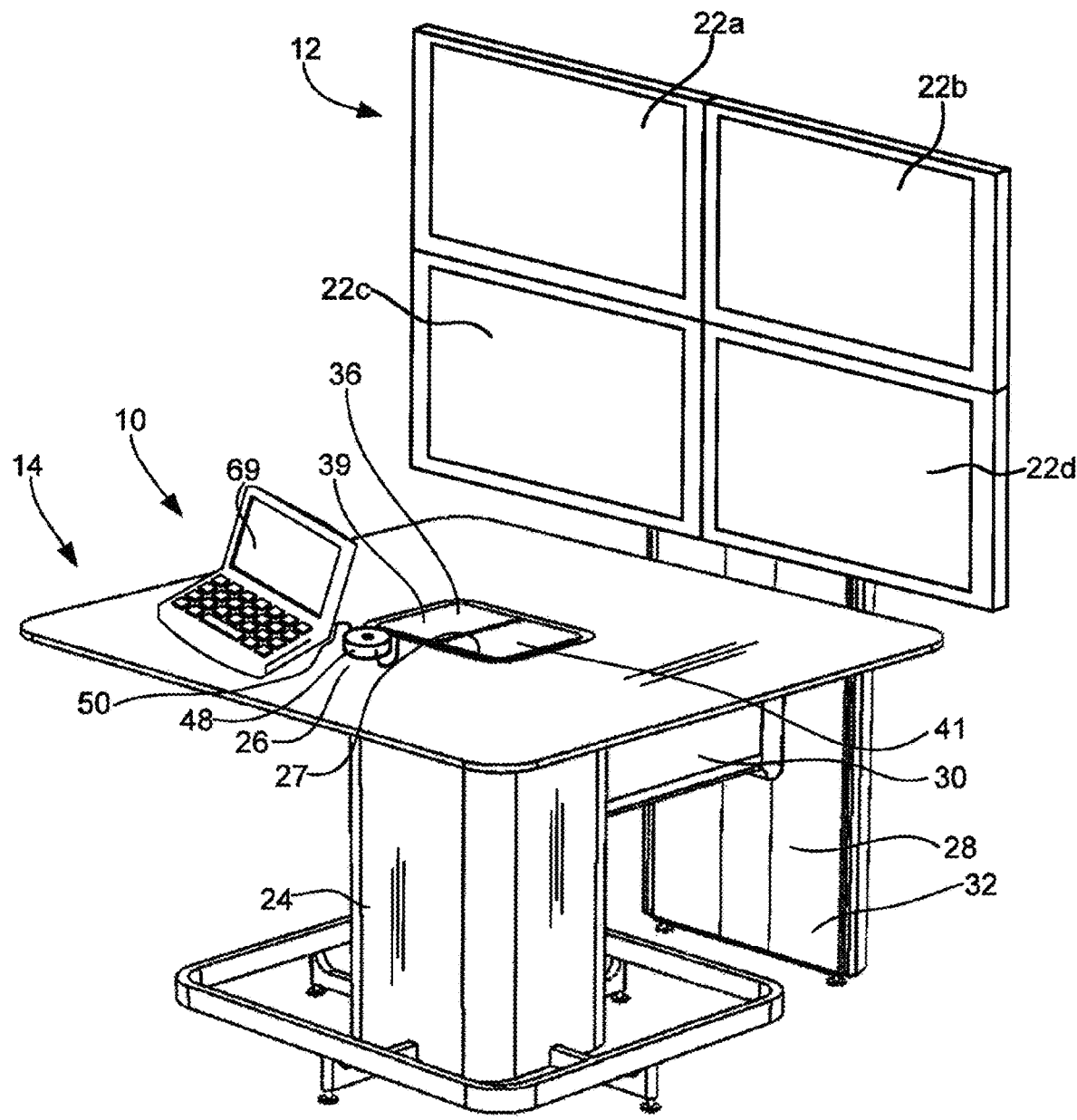
FIG. 1 is a perspective view of a collaborative conference table configuration having four display screens in accordance with at least some aspects of the present invention.

Referring now to the figures wherein like reference numerals correspond to similar elements throughout the several views and more specifically, referring to FIGS. 1 through 4, one embodiment of a collaborative workspace configuration 10 that is consistent with at least some aspects of the present invention is illustrated. Workspace configuration 10 includes a display system 12 and a conference table assembly 14. Various mechanical aspects of configuration 10 are described in co-pending U.S. patent application Ser. No. 12/250,192 that was filed on Oct. 13, 2008 and is titled "Conference Display Configuration" and which is incorporated herein by reference. Hereafter, general mechanical features of the configuration 10 are described that are useful in understanding operation of the current invention. The prior application referenced above should be referred to for more detail regarding the mechanical aspects of configuration 10.

Display system 12 includes a totem or stand support structure 28 and four relatively large flat panel displays 22a, 22b, 22c and 22d. Totem 28 is vertically oriented and includes a front facing surface 32 to which displays 22a through 22d are mounted. Displays 22a through 22d are arranged so that viewing or presentation surfaces face in the same direction and generally away from totem 28. Displays 22a through 22d are arranged in a two row and two column arrangement. Although not illustrated, totem 28 includes a housing that forms a cavity in which power and data cables can be received to provide power/data to display 22a through 22d.

Conference table assembly 14 includes a support structure 24, a table top member 26 and a bridge assembly 30. Support structure 24 generally forms a vertical leg to support top member 26 in a horizontal orientation. Structure 24 also forms an internal cavity for receiving various power, data and communication components as well as other mechanical components such as cable take up subassemblies described in the co-pending patent application referenced above.

Bridge assembly 30 secures totem 28 to support structure 24 to stabilize totem in a vertical orientation. In addition, although not illustrated, bridge assembly 30 forms an internal channel or cavity for passing power and/or data cables between structure 24 and totem 28.

Top member 26 is generally a rigid square flat member that forms a top work surface and a central rectilinear opening. A dual door assembly 36 is mounted within the central opening that includes two door members 39, 41 that have top surfaces that are flush with the top surface of member 26 when the doors are closed. Each door in hinged to open to allow access to table components there below. Together the doors are dimensioned so that when closed as best seen in FIG. 4, each door 39 and 41 forms a gap (see 43 and 45) with the opening around a peripheral edge for passing cables.

Figure 4:
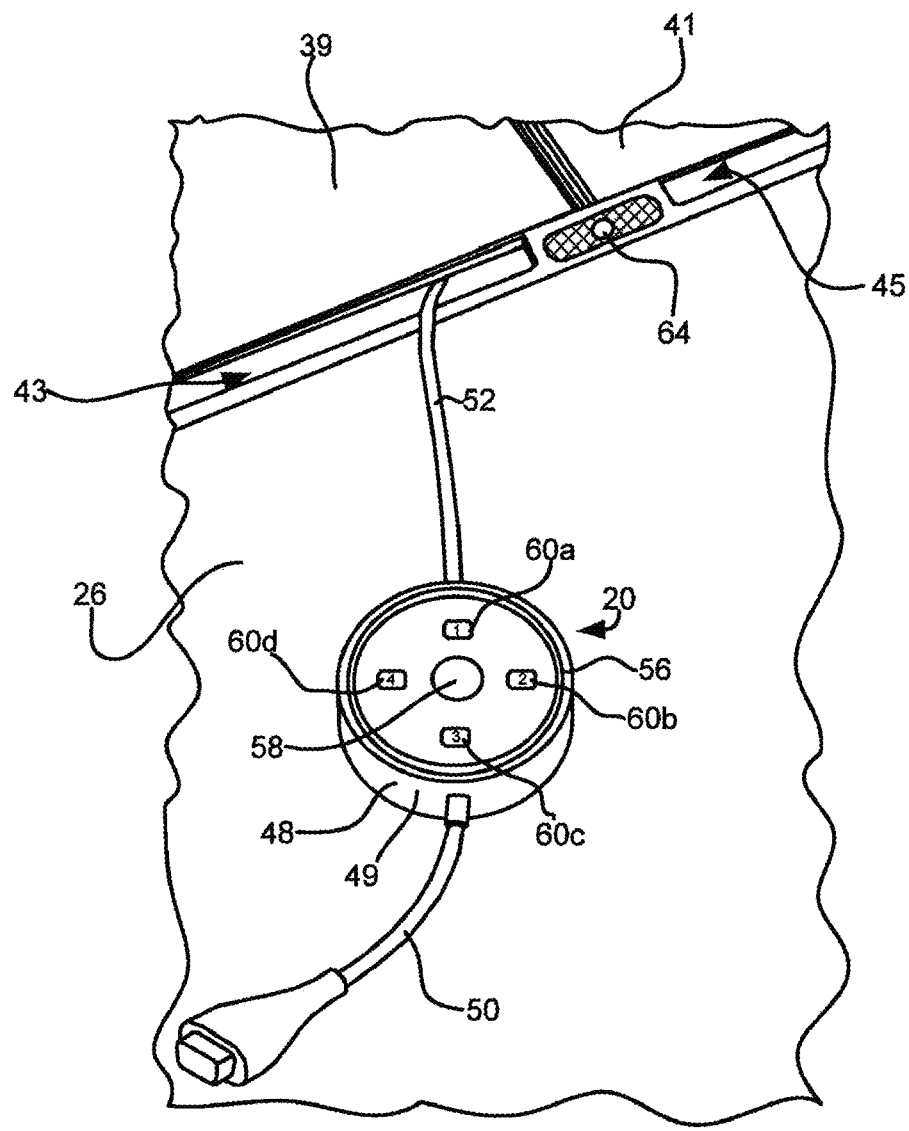
FIG. 4 is an enlarged perspective view showing one of the puck control assemblies that comprises a portion of the configurations shown in FIG. 1.

Referring still to FIG. 4, adjacent the doors 39 and 41 at the edge of the central opening an illuminated button 64 is provided. Although not illustrated, button 64 is linked to a power source. Button 64 is a dual state push button and, in at lease some embodiments, is illuminated all the time. In some embodiments, button 64 may include a universal power indicator symbol indicating to users that the table is powered. By illuminating button 64 even when the table configuration 10 is not being used, the button invites users to start up a conferencing session and is an indicator that the configuration 10 is operable and ready to use. When not in use button 64 will have a first illuminated color (e.g., white) and when button 64 is selected, the button will be illuminated in a second color (e.g., green) confirming for the user that the button has been selected.

Figure 2:
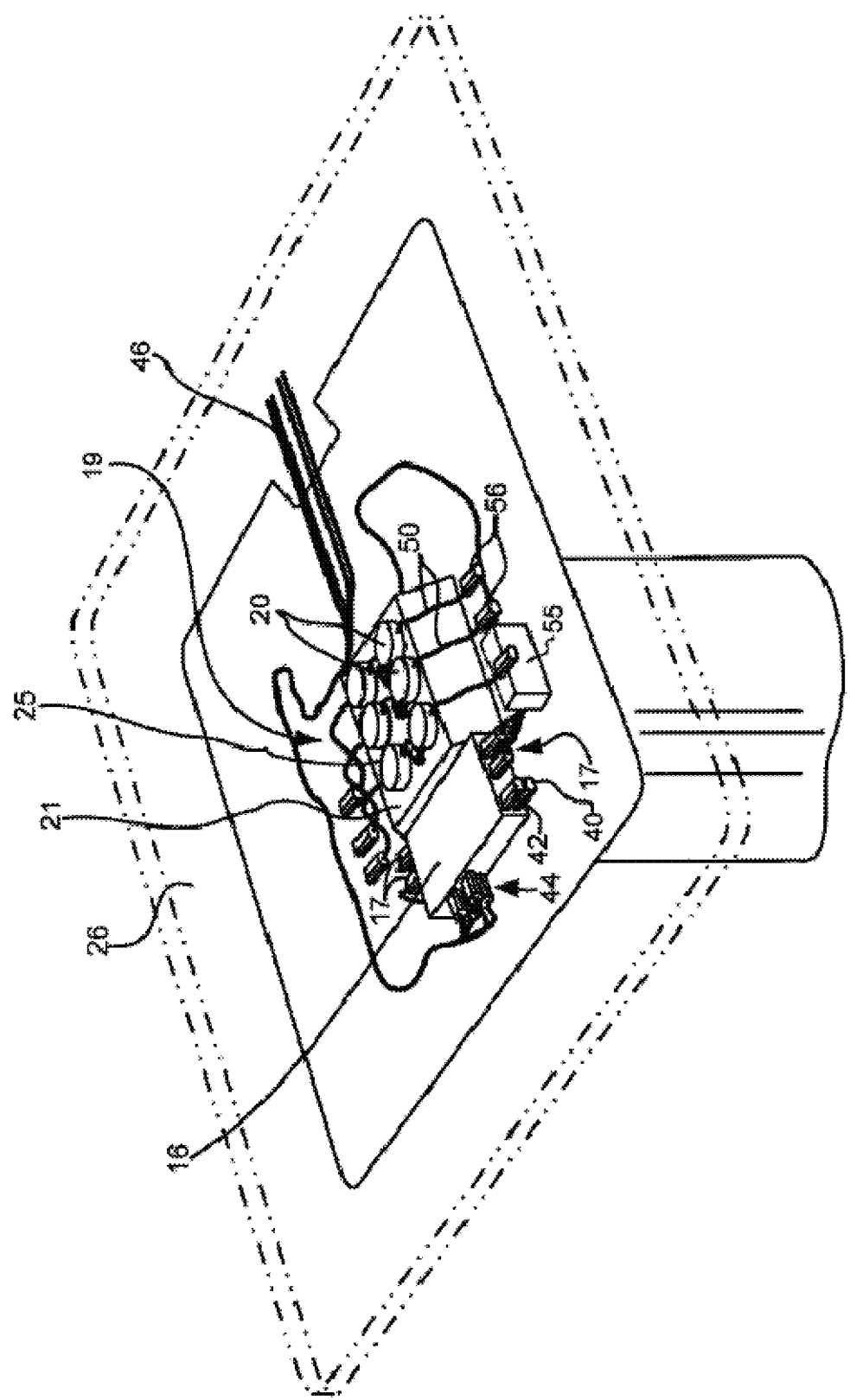
FIG. 2 is a view of a portion of the configuration shown in FIG. 1, albeit where a switcher and other components and cables that are typically hidden under the top surface of FIG. 1 are shown in perspective views.
Figure 3:
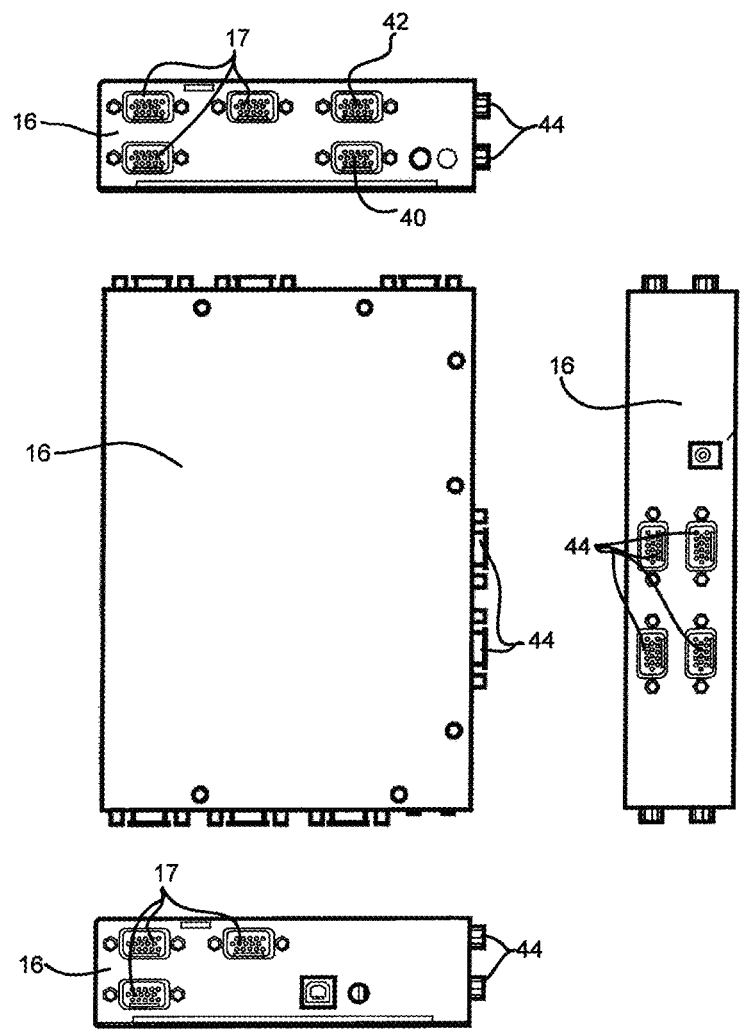
FIG. 3 includes a top plan view, end views and a side view of the switcher shown in FIG. 2.

Referring specifically to FIG. 2, components mounted within structure 24 below top member 26 include a switching device 16, a user interface assembly 19 and a power source 55. Referring also to FIG. 3, where switching device 16 is shown in four different views, switching device 16, as the label implies, can be used to switch different input video/audio sources at different input ports to change which input is feeding video/audio output ports. To this end, exemplary switching device 16 includes six input ports collectively identified by numeral 17 (three on either end of device 16), a video conference input port 42, and a PC input port 40. Device 16 includes four video/audio output ports collectively labeled 44. In operation, switching device 16 can be controlled to output video/audio from any one of the input ports 17, 40 or 42 to any one or more of output ports 44. In addition, switching device 16 is controllable so that input from two, three or four of the different inputs 17, 40 or 42 can be output simultaneously to different ones of the output ports 44.

Referring again to FIG. 2, interface assembly 19 includes a deck member 21 and six selectable control interfaces referred to as "puck" assemblies, two of which are labeled 20. Deck member 21 forms a top surface 25 for receiving and supporting the puck assemblies 20 when the puck assemblies are in stored positions below covers 39 and 41 (see again FIG. 1). Each puck assembly 20 is similarly constructed and operated in a similar fashion and therefore, in the interest of simplifying this explanation, only one puck assembly 20 will be described here in detail.

Referring also to FIG. 4, exemplary puck assembly 20 includes a puck 48 and first and second video/audio cables 50 and 52, respectively. Cable 50 is used to link puck 48 to a computer/laptop audio/video output port or other video source while cable 52 links puck 48 through a circuitous path to one of the six input ports 17 shown in FIGS. 2 and 3. In at least some embodiments, each cable 52 can be taken up by a take up assembly (not shown) below deck member 21 as an associated puck 48 is moved from a use position on top of top member 26 (see FIG. 4) to a storage position as shown in FIG. 2. For more detail regarding one possible take up assembly, see U.S. patent application Ser. No. 12/250,192 referenced above. As seen in FIG. 4, when a puck 48 is pulled into a use position on top of member 26, cable 52 can pass through gap 43 when door 39 is closed.

Figure 5:
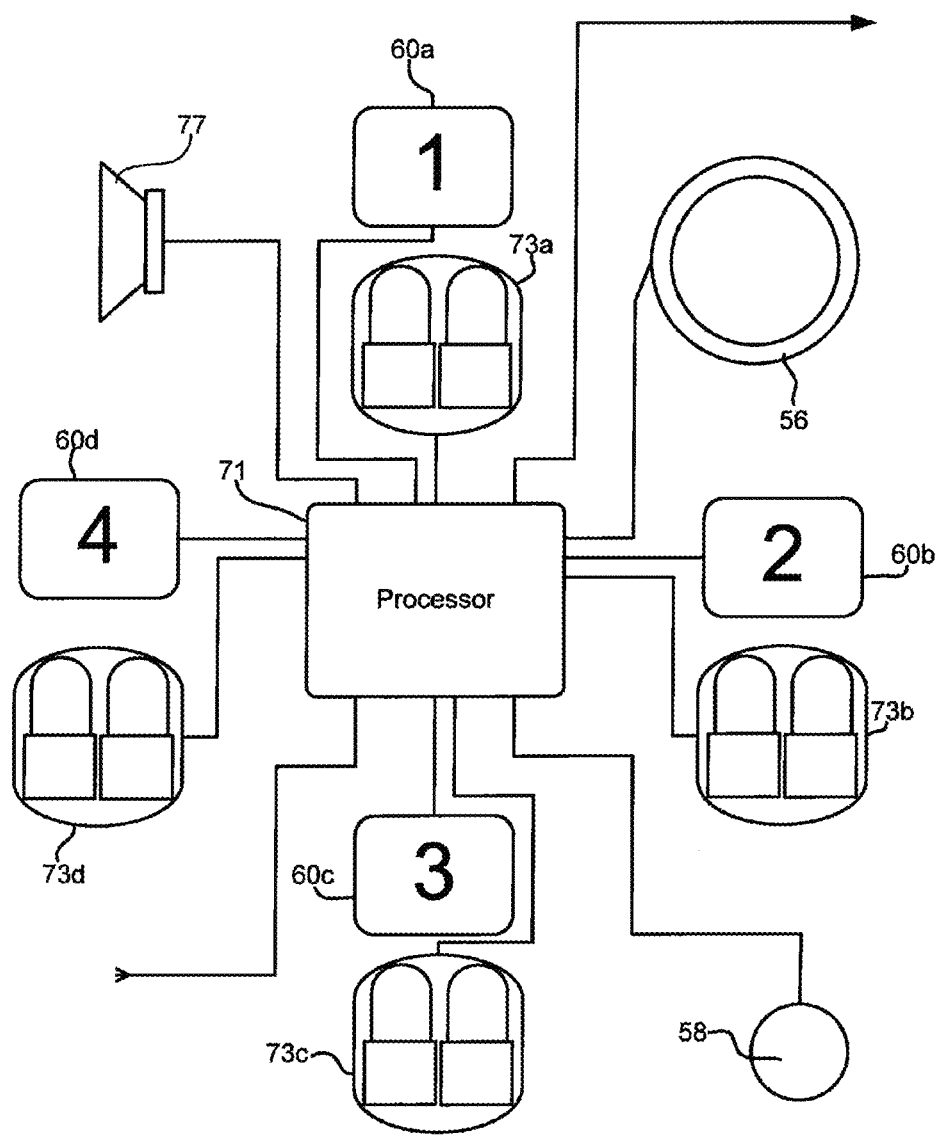
FIG. 5 is a schematic illustrating components of an exemplary control interface/puck.

Referring still to FIG. 4 and also to FIG. 5, exemplary puck 48 includes a disc or puck shaped housing 49 that supports a plurality of components including a processor 71, an on/off button 58, first through fourth selectable controls or control buttons 60a-60d, four illumination devices 73a through 73d and an illumination ring 56. Processor 71 may be a programmable microprocessor or may be configured via digital components. Processor 71 is linked to each of cables 50 and 52 and can sense when cabled 50 is linked to a video/audio source. Processor 50 is also linked to each of buttons 56 and 60a-60d to sense when any of those buttons are selected. Processor 50 is further linked to each of illumination devices 73a through 73d and ring 56 for providing power to and cutting power from each of those devices.

In at least some embodiments each of illumination devices 73a-73d and ring 56 can be controlled to generate light in two different colors such as white and green or can be dark so that at least two or three different states can be indicated in visually distinguished ways.

As seen in FIG. 4, each button 60a-60d has a different number 1, 2, 3 or 4 indicated thereon. Here, each number 1, 2, 3 or 4 corresponds to a different one of the display screens 22a through 22d in FIG. 1. For instance, button 60a labeled "1" may correspond to screen 22a, button 60b labeled "2" may correspond to screen 22b, and so on.

Referring again to FIGS. 4 and 5, processor 71 is programmed or configured to determine when a video source is linked to cable 50 as well as when any of buttons 58 or 60a-60d is selected and to indicate a current state of the puck and associated video source via the illumination devices 73a-73d and ring 56 for the benefit of both the puck user and others gathered around configuration 10. In addition, processor 71 provides an indication of the display configuration 12 to the puck user. In this regard, in a system including four displays (e.g., the number of common displays is M) as in FIG. 1, all four screen selection buttons 60a-60d (where N is the number of selection buttons) may be illuminated prior to selection to indicate four options that can be selected by the puck user. Where another configuration includes less than four displays, only a subset of buttons 60a-60d would be illuminated prior to selection. For instance, in FIG. 2, where the configuration only includes two displays and hence there are only two display options, only buttons 60a and 60b would be illuminated prior to selection to indicate only two options to select from. Here, switching device 16 may be configured to sense the number of output ports 44 to which display screens 22a-22d or other output devices (e.g., projectors) are linked and provide a feedback signal via cable 52 to processor 71 to indicate the number of buttons 60a-60d to illuminate.

In at least some embodiments the top surface of puck 48 may be formed of a black plastic where, when a button 60a-60d is not illuminated, the number 1, 2, 3 or 4 appears dark and blends in with the top puck surface so that the number 1, 2, 3 or 4 is essentially unnoticeable.

By providing a puck 48 that includes four screen selection buttons 60a-60d, a single puck type may be manufactured that can be used with any conferencing configuration including one, two, three or four common displays which reduces design and manufacturing costs appreciably.

Referring again to FIG. 4, ring 56 is a ring shaped member disposed generally along a circumferential edge of the top surface of the puck 48. because puck 48 has a generally low profile, light from ring 56 is relatively easily viewable from all directions above top member 26. Thus, from any vantage point above top member 26 conference participants can see the visual state of ring 56.

While controls 60a-60d are described here as buttons, it should be appreciated that controls 60a-60d may take any of several different forms. For instance, controls 60a-60d may be provided via a touch sensitive interface surface including a separately selectable location or area associated with each button 60a through 60d.

In at least some embodiments ring 56 is not illuminated until a video/audio source (e.g., a laptop) is linked to cable 50. Once a source is linked to cable 50, if the linked source is supplying video/audio to one or more of displays 22a-22d (see FIG. 1), ring 56 is illuminated in one color (e.g., white) and if the linked source is not currently driving any of displays 22a-22d, ring 56 is illuminated in a second color (e.g., green). Thus, ring 56 is useful as an indicator to conference participants around table top 26 that identifies the person or persons that are currently displaying information on one or more of the common displays 22a-22d.

Referring again to FIGS. 1 and 4, after a laptop or other video/audio source is linked to cable 50 to provide video via cable 50 to display 22a, button 60a is selected, to provide video to display 22b, button 60b is selected, and so on. Prior to each of buttons 60a-60d being selected, in at least some embodiments, the buttons 60a-60d are not illuminated. In other embodiments, prior to selection, each button 60a-60d may be illuminated, like ring 56, in one color and after selections, each selected button may change to a second illuminated color to distinguish selected from unselected buttons 60a-60d.

Referring again to FIGS. 4 and 5, central button 58 is provided as an on/off button which may be selected by a puck user to effectively cut off the user's linked laptop or other source from driving displays 22a-22d. Thus, where a laptop is linked to cable 50 but a user does not want to inadvertently present laptop information via the common displays, the user can simply press button 58 to render puck 48 ineffective at passing on video/audio to the displays. Here, when button 58 is selected to "turn off" the puck 48, ring 56 and buttons 60a-60d, in at lease some cases, are no longer illuminated.

Figure 6:
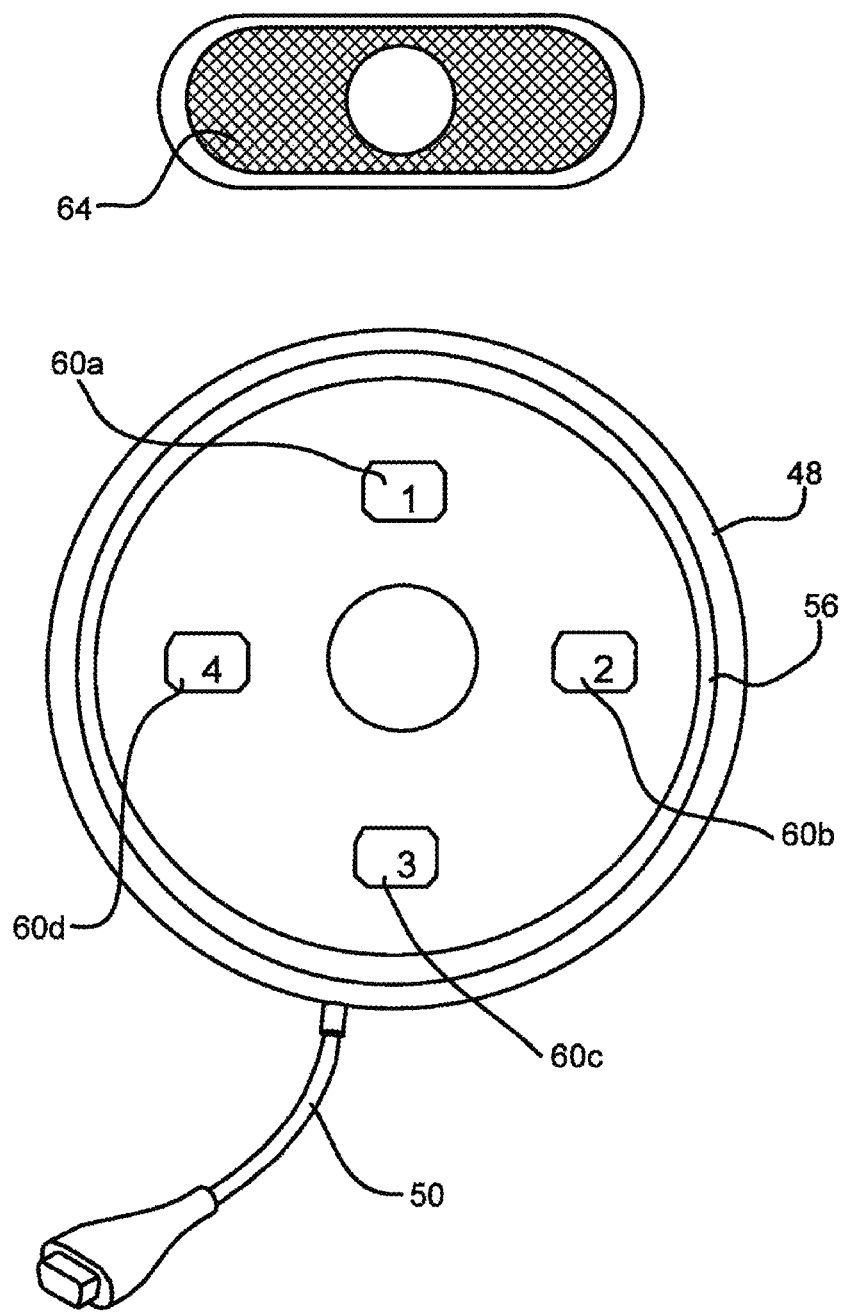
FIG. 6 is a schematic illustrating the puck control assembly of FIG. 4 and a power on button in the first state after the power on button has been selected to cause the system to begin operation.

Referring now to FIGS. 1 and 4, prior to any laptop or other source being linked to configuration 10 to drive displays 22a-22d, indicator button 64 may be illuminated with a white color to indicate to persons in the vicinity that configuration 10 is powered and ready for use. Hereinafter, a white light will be indicated in the figures via a double hatch (see 64 in FIG. 4) and a green light will be indicated via a single hatch (see 64 in FIG. 6). When a person wants to use configuration 10, the person presses button 64 which causes button 64 to change from white to green as shown in FIG. 6 to signal to the person that the system is powering up.

Figure 7:
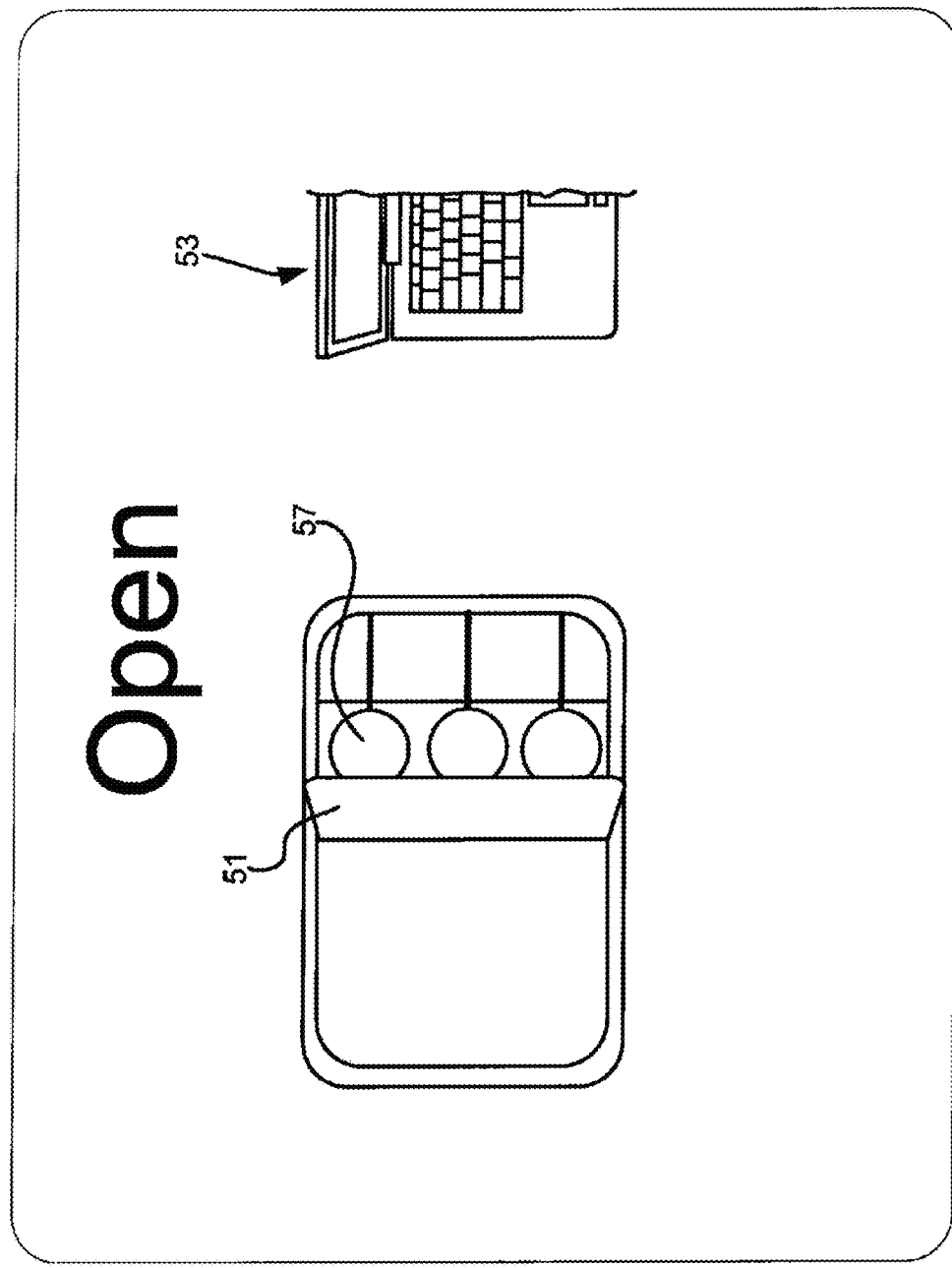
FIG. 7 is a schematic illustrating an exemplary screen shot corresponding to a portion of an instructional video that may be presented via one or more of the displays shown in FIG. 1 after the power on button is selected.
Figure 8:
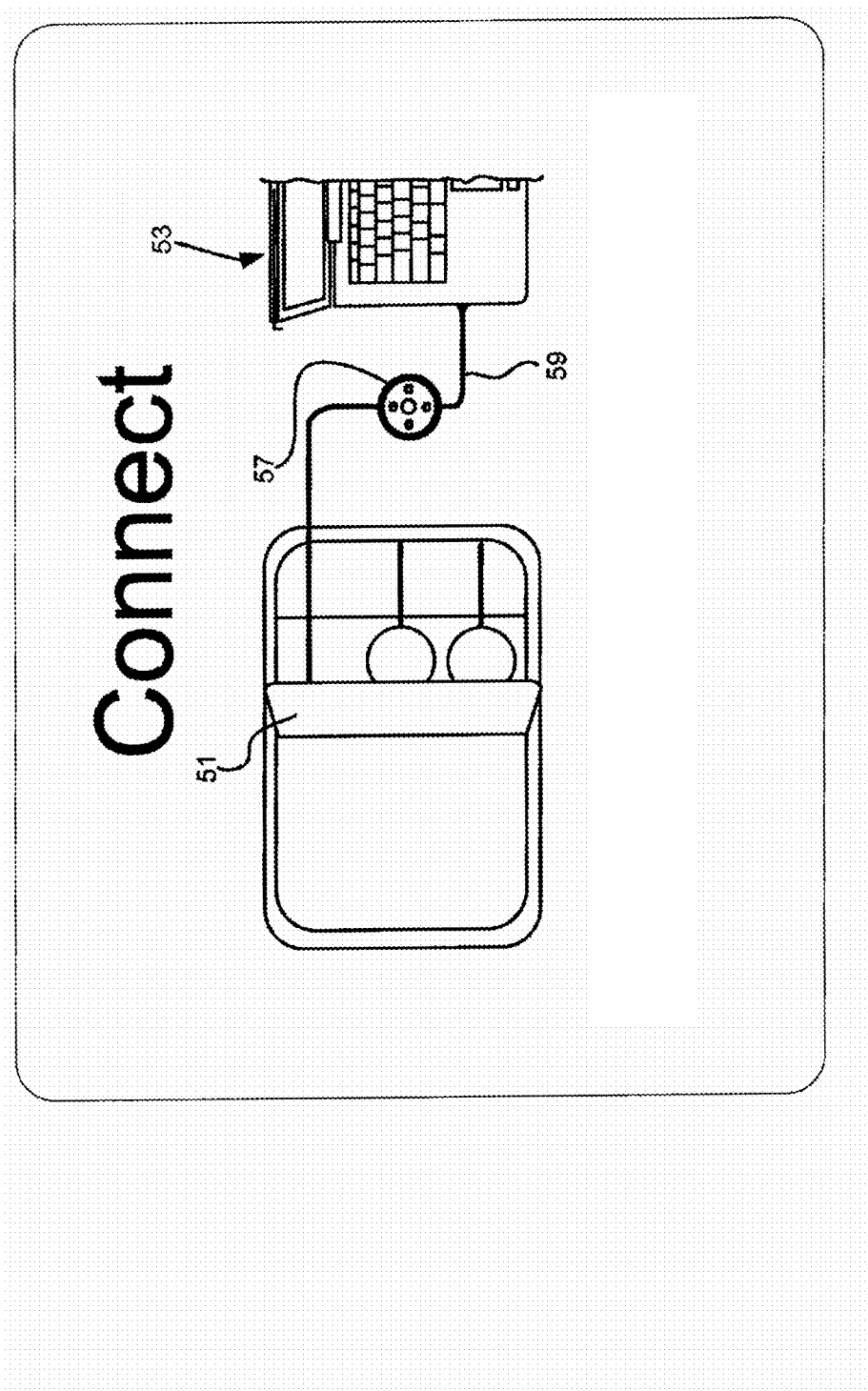
FIG. 8 is similar to FIG. 7, albeit illustrating a different portion of the instructional video.
Figure 9:
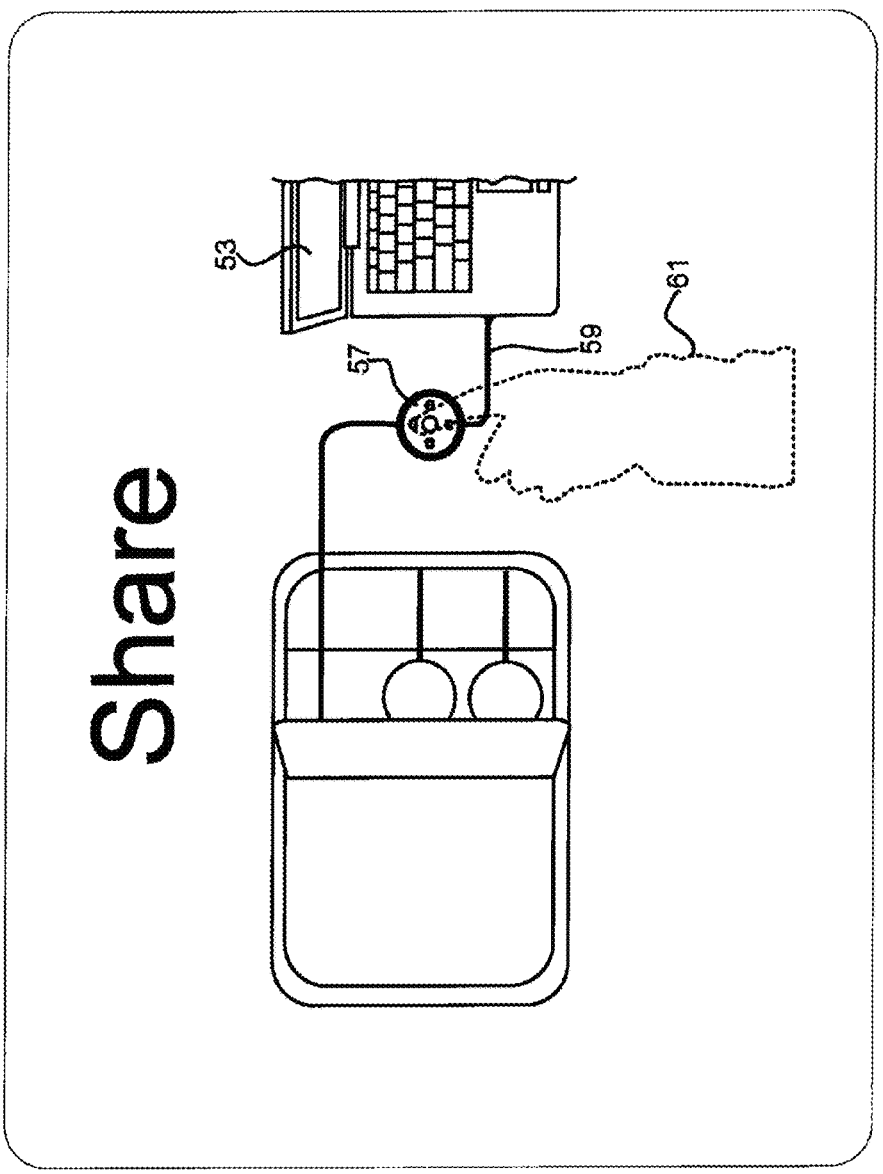
FIG. 9 is similar to FIG. 7, albeit illustrating yet a different portion of the instructional video.

In addition, when button 64 is pressed, in at least some embodiments, a short video clip is presented via one or more of displays 22a-22d providing simple instructions to the person who pressed button 64 regarding how to use configuration 10. Referring to FIGS. 7-9, exemplary screen shots showing images consistent with a simple instruction video are illustrated. In FIG. 7, a graphic of the utility bay door 39 opening 51 adjacent a laptop image 53 (i.e., a source image) is shown to indicate that one of the doors 37 or 41 (see FIG. 1) should be opened. In FIG. 8 a puck 57 is shown moving out of the cavity under the door 51 and onto the work surface where the cable 59 associated with the puck is linked to the laptop 53. In FIG. 9 a phantom user's hand image 61 is shown moving toward and over the puck image 57 to select one of the buttons provided thereby. Here, the instructional video clip is intentionally extremely simplified and includes only three steps "open", "connect" and "share." In at least some embodiments the instructions are only provided once and the duration is extremely short (e.g., approximately 15 seconds) which gives a user a sense that configuration 10 is particularly easy to use.

Figure 10:
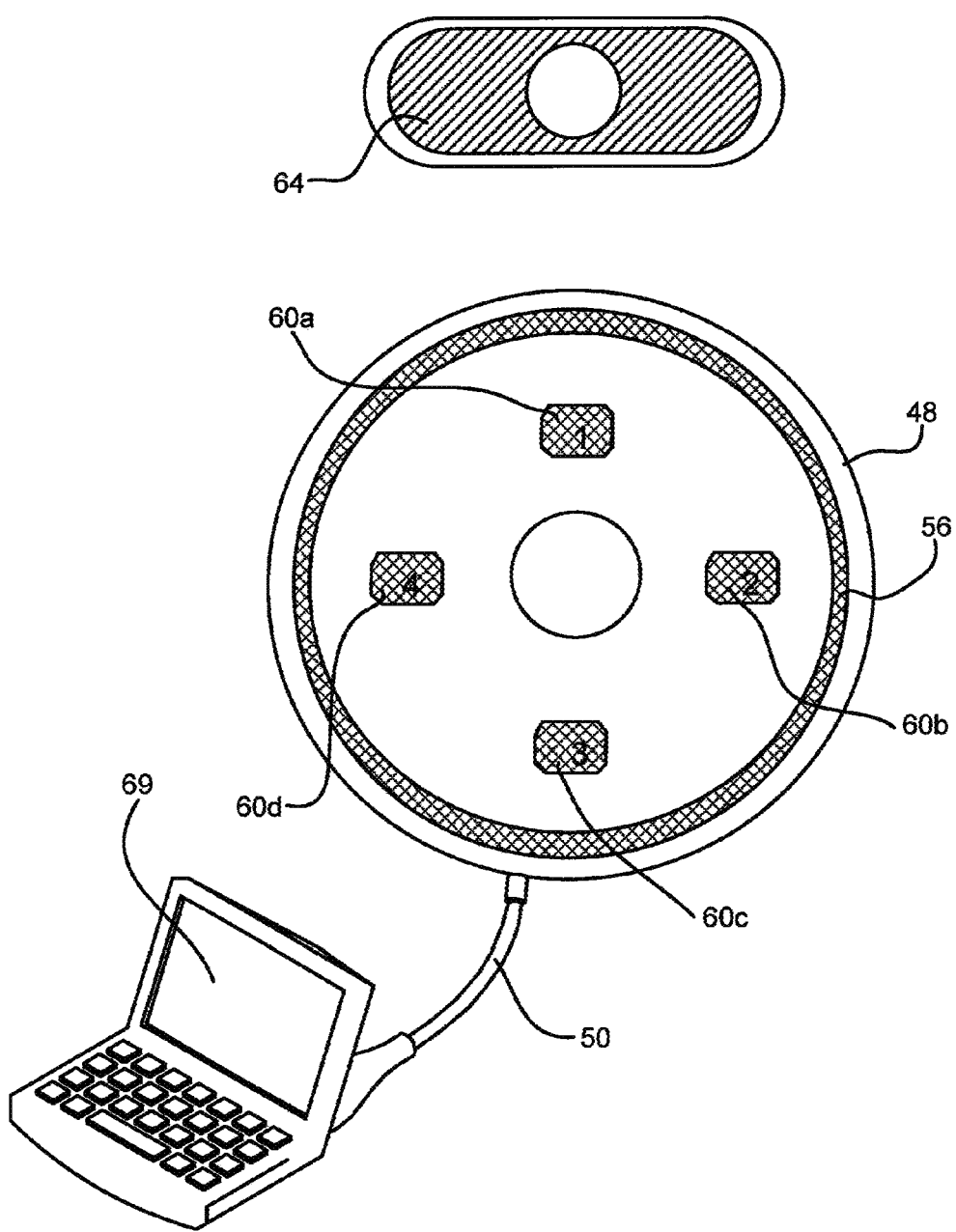
FIG. 10 is similar to FIG. 6, albeit illustrating the state of the puck when a laptop is initially connected thereto.

Following the instructions, as shown in FIG. 10, a user pulls one of the pucks 48 from the cavity below a door 39 or 41 and links a laptop 69 to the puck 48 via cable 50 (see also FIG. 1). Once a laptop 69 is linked to cable 50, ring 59 as well as selectable buttons 60a-60d are illuminated white (see double crosshatch in FIG. 9) to indicate to the laptop user that the user is linked and can opt to present information from the user's laptop screen via any one or combination of displays 22a-22d corresponding to illuminated buttons 60a-60d, respectively. Here, the white light ring 56 also indicates that currently the user of puck 48 is not presenting via any of displays 22a-22d.

Figure 11:
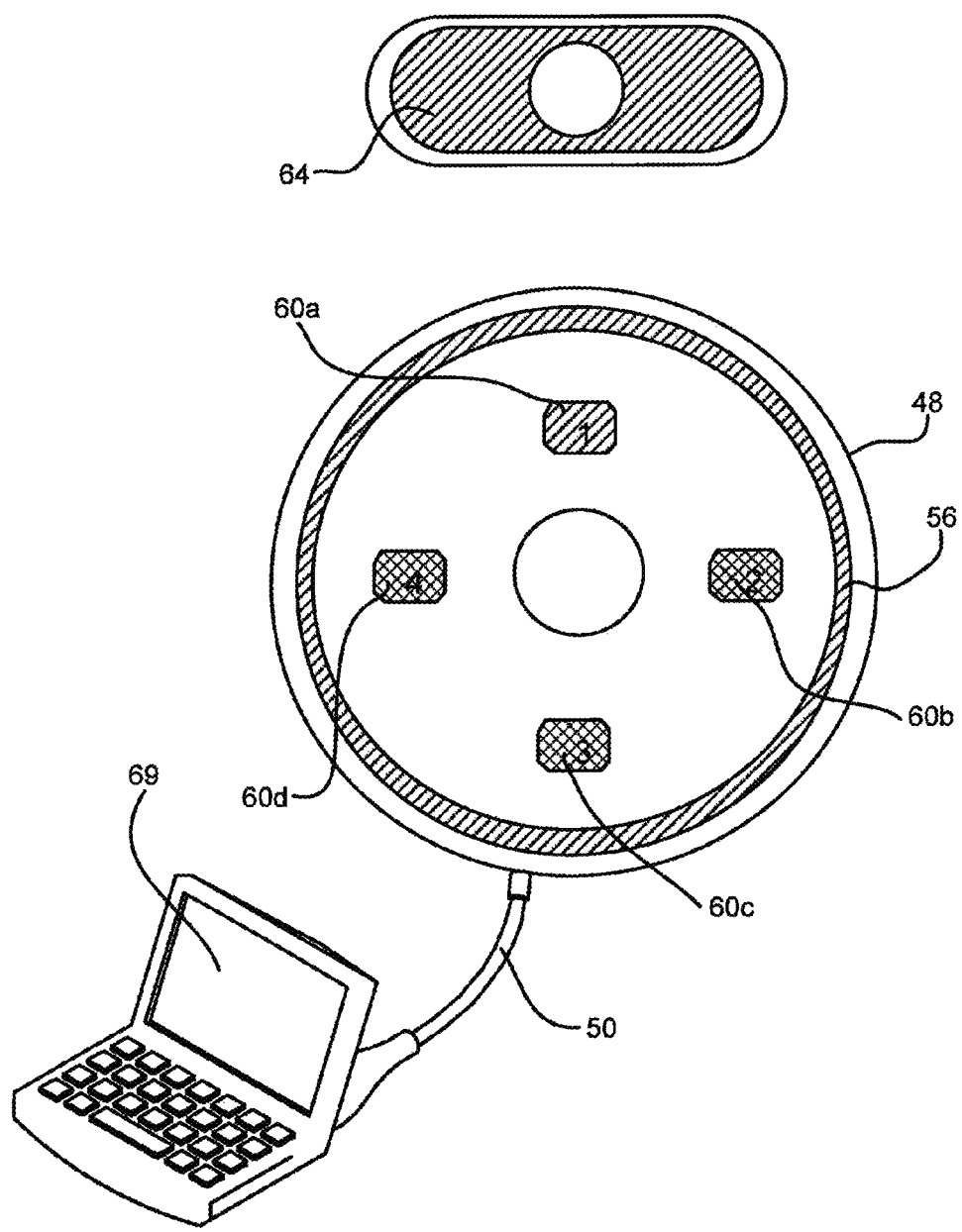
FIG. 11 is similar to FIG. 10, albeit illustrating the state of the puck after a selection button corresponding to one of the display screens of FIG. 1 has been selected.

Referring to FIG. 11, when a puck user wants to present information from her laptop 69 display via display screen 22a, the user presses button 60a to indicate intention to drive display 22a. Once button 60a is selected, four things happen. First, information currently displayed via display 22a is replaced by the information from the user's laptop 69 display. Second, if a different laptop was previously presenting information via display 22a when button 60a is selected, the other user's puck illumination may change. For instance, if the other user was only displaying via display 22a when displaced, the other user's puck's ring 56 will change from green back to white illumination indicating the user is no longer driving any of displays 22a-22d. As another instance, where another user was driving each of displays 22a and 22c when button 60a is selected, the other user's puck ring will remain green after displacement from screen 22a to indicate that the other user is still driving display 22c despite being displaced from display 22a. In addition, in this case, the other user's puck button 60a will be illuminated white after displacement from screen 22*a* while button 60*c* will remain green indicating that the other user is still driving display 22*c*.

Third, to indicate that the user of puck 48 in FIG. 10 is now driving at least one of displays 22*a*-22*d*, ring 56 on puck 48 changes from white to green (see single cross hatch ring in FIG. 10). Fourth, to let the puck user know which displays 22*a*-22*d* she is currently driving, button 60*a* illumination changes from white to green. Here, other buttons 60*b*-60*d* that were not selected remain white (i.e., they are shown as double cross hatched).

Figure 12:
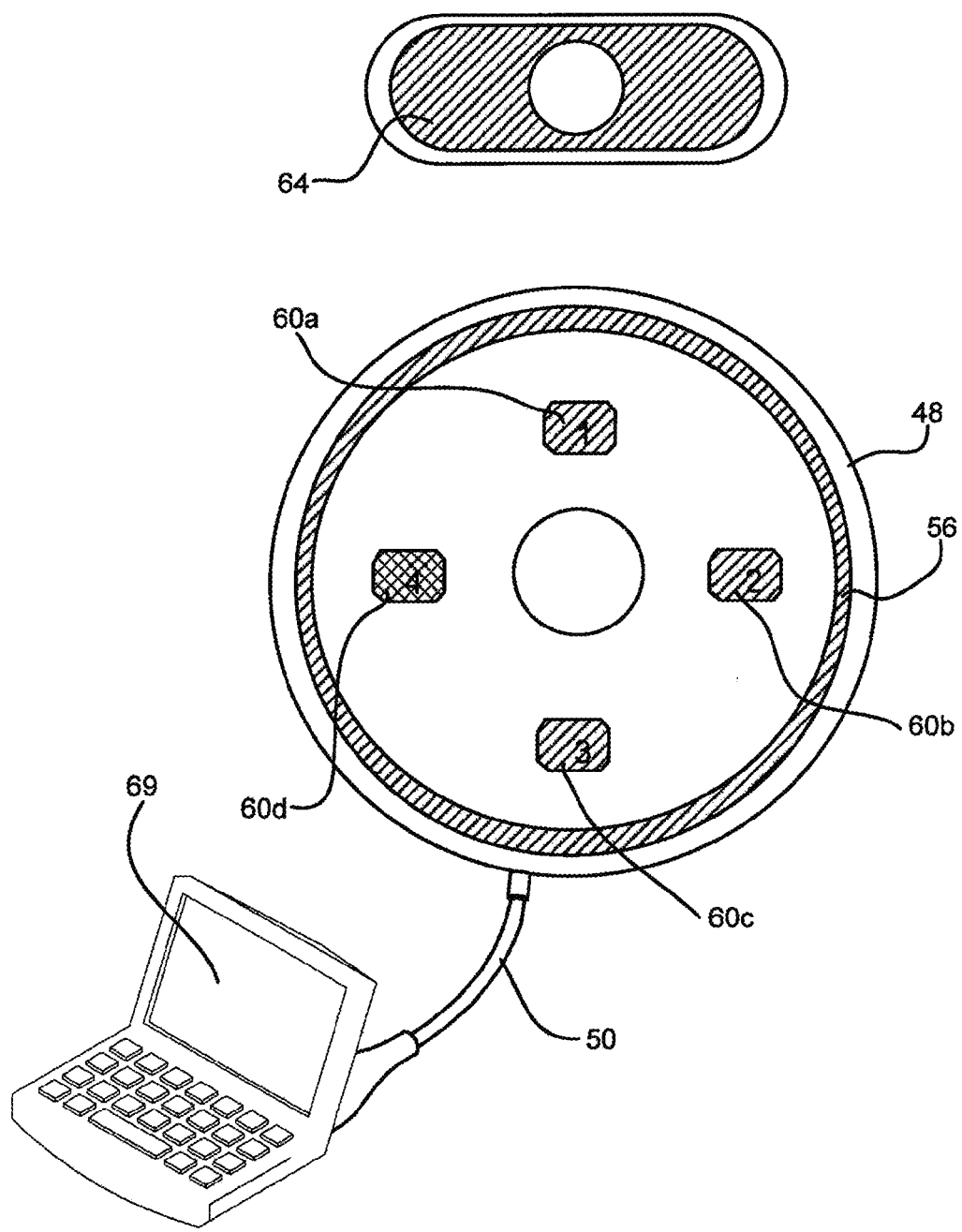
FIG. 12 is similar to FIG. 11, albeit illustrating the puck condition after three buttons corresponding to three of the display screens shown in FIG. 1 have been selected.

If the user next wants to display her laptop information via displays 22*a*-22*c*, referring to FIG. 12, the user selects button 60*b* and 60*c* which cause information from the user's laptop screen to replace any existing information on displays 22*b* and 22*c*, causes other puck illumination to change accordingly and causes buttons 60*b* and 60*c* to change from white to green illumination. At this point, as shown in FIG. 12, each of buttons 60*a*-60*c* and ring 56 are illuminated green while button 60*d* remains white.

To relinquish control of a display 22*a*-22*d* currently controlled, in at least some embodiments, the button 22*a*-22*d* corresponding to a display 22*a*-22*d* can be selected a second time. In the iterative, to relinquish control of displays 22*a*-22*d*, on/off button 58 may be selected. Once display control is relinquished, puck 48 illumination is updated accordingly.

After a configuration session is over and all sources have been disconnected from cables 50, the system will eventually time out (e.g., approximately 15 minutes) and will power down so that button 64 returns to its white illuminated state (see again FIG. 4).

Figure 13:
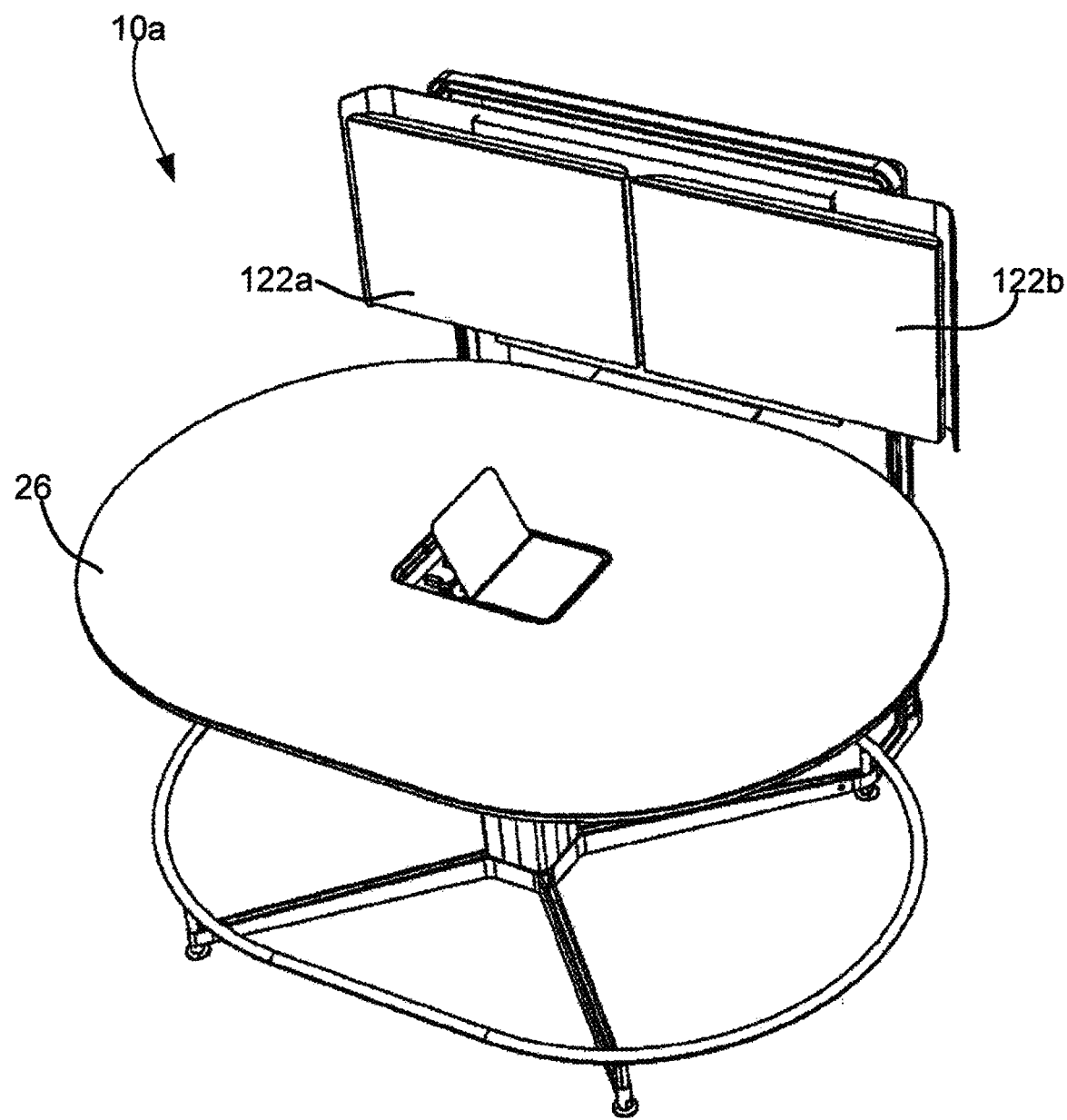
FIG. 13 is similar to FIG. 1, albeit illustrating another configuration embodiment as consistent with at least some aspects of the present invention.
Figure 14:
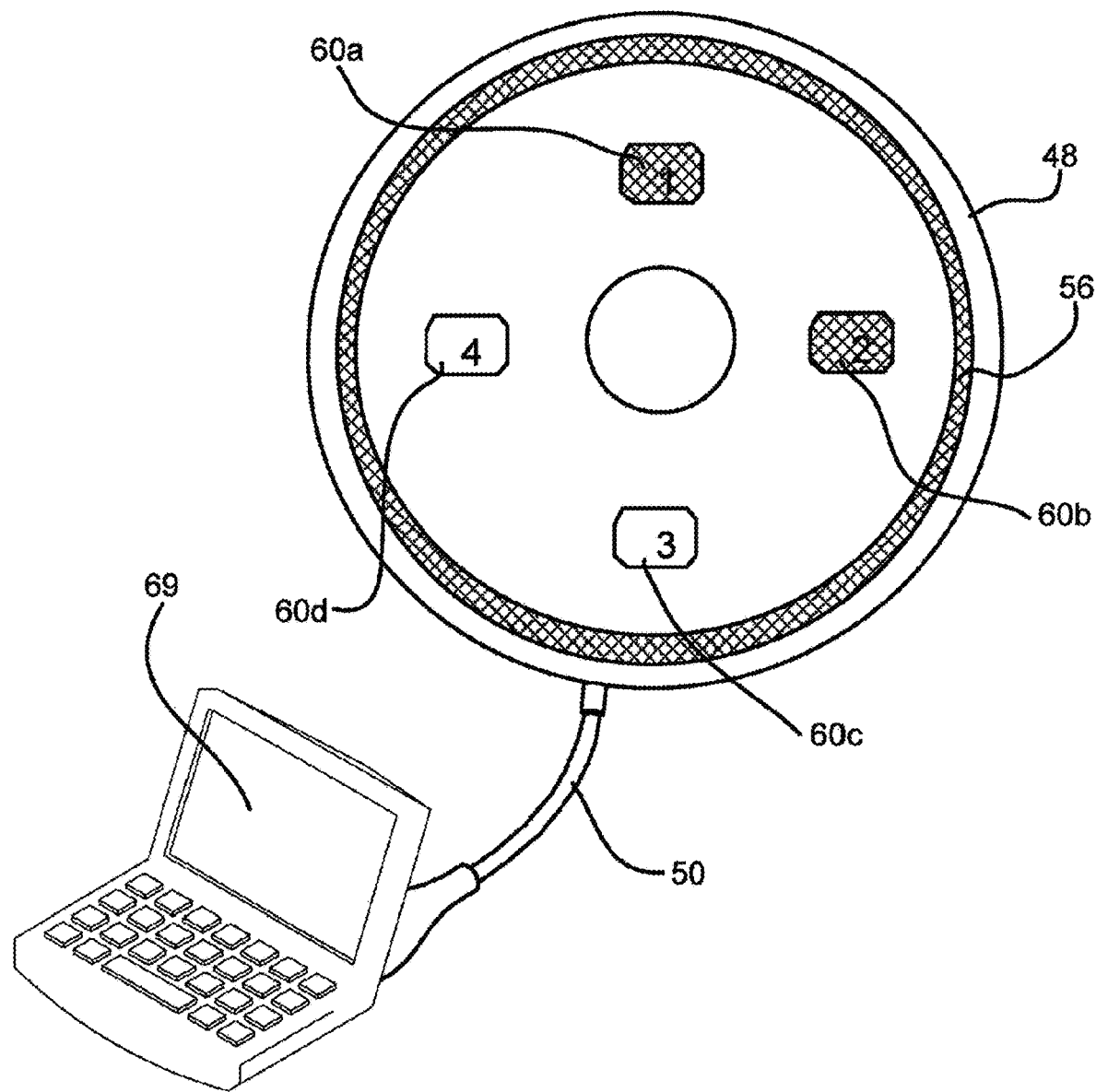
FIG. 14 is similar to FIG. 10, albeit illustrating the puck condition for the system of FIG. 12 where the system only includes two displays.

Referring now to FIG. 13, a second configuration 10*a* that is consistent with at least some aspects of the present invention is illustrated. Configuration 10*a* is different than configuration 10 in two general ways. First, configuration 10 has an oval table shape top member 260 as opposed to rectangular. Second, configuration 10 includes only two displays 122*a* and 122*d* instead of four. Here, referring also to FIG. 14, in at least some embodiments, it is contemplated that when a laptop 69 is linked to a puck 48 initially so ring 56 is illuminated white, only buttons 60*a* and 60*b* would illuminate white thereby indicating to a user that there are only two display choices 122*a* and 122*b* instead of four. Other operation of configuration 10*a* is similar to that described above.

Figure 15:
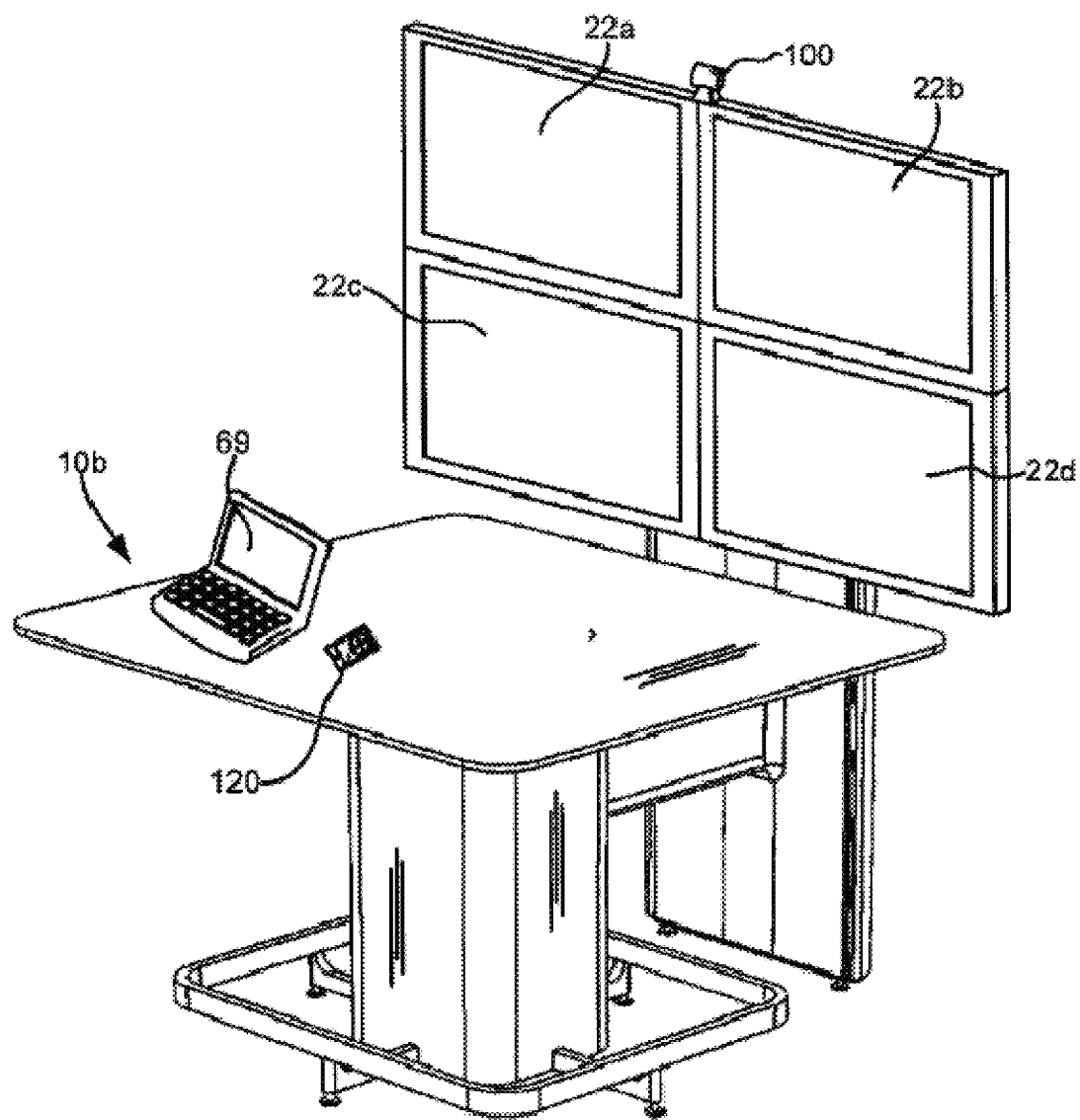
FIG. 15 is similar to FIG. 1, albeit illustrating a system that includes a wireless access device so that laptops and other video/audio sources can link provide data to the displays wirelessly.
Figure 16:
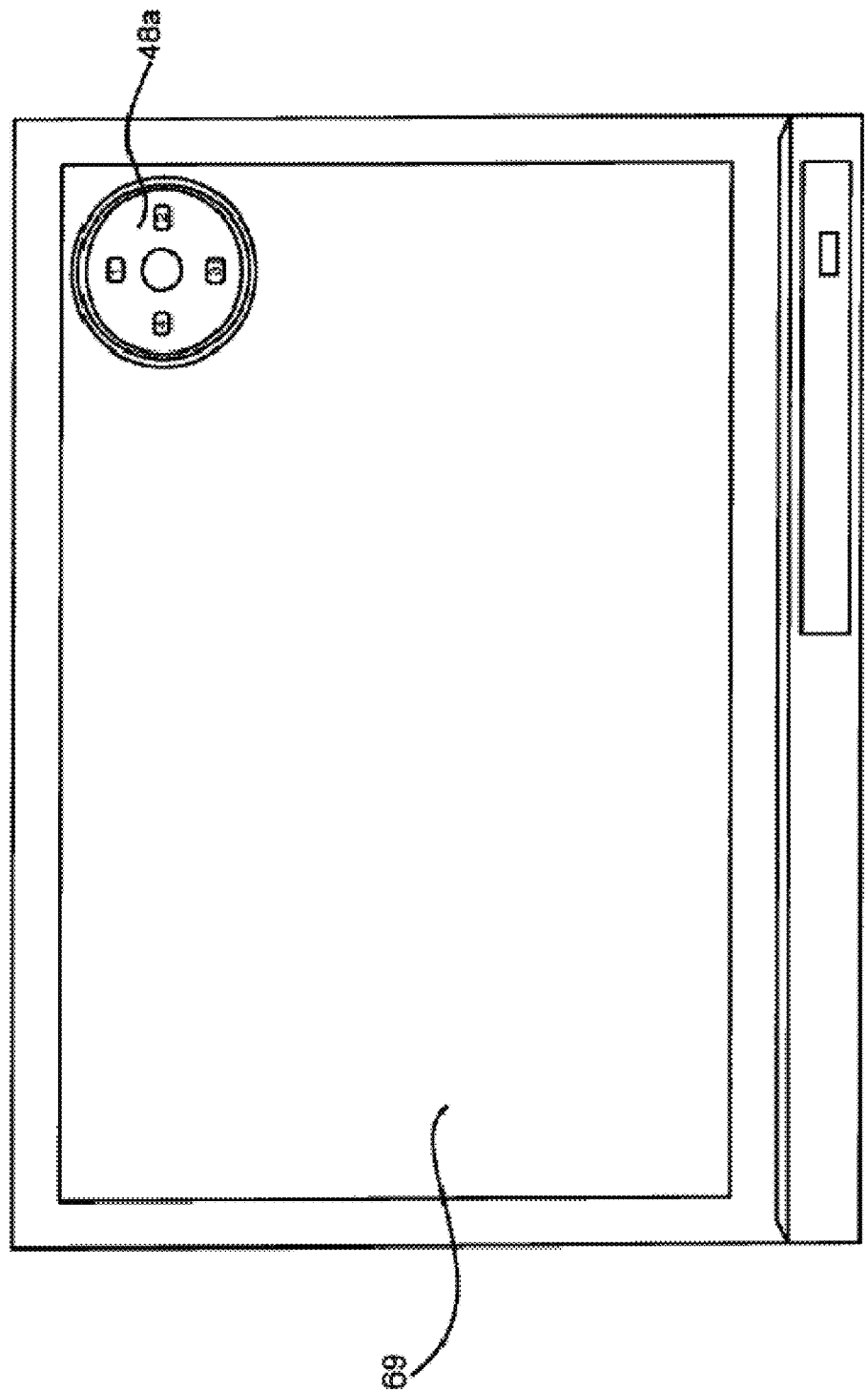
FIG. 16 shows a puck "widget" that may be presented via a laptop display screen.

Referring now to FIG. 15, in at least some embodiments it is contemplated that laptops 69 and other visual/audio sources may be able to wirelessly link up to a configuration 10*b* processor or server via a wireless access device 100 or the like. In this case the configuration 10*b* may not need a utility bay and will not require cable hookups or physical pucks. Here, where a source 69 is associated with the configuration for control purposes, referring also to FIG. 16, a software "widget" puck representation or control interface/screen selection icon or representation (hereafter a "widget") 48*a* may be provided on screen. In this case it is contemplated that, in at least some embodiments, the widget 48*a* will have an appearance similar to the appearance of interface 60 and button 58 where different widget areas corresponding to buttons 60*a*-60*d* and 58 will be selectable via a mouse controlled cursor or touch (in the case of a touch sensitive display) for selection. In this case it is contemplated that when a virtual button on the widget is selected, the functionality and illumination described above with respect to puck 48 would occur. When the widget ring 56 is illuminated, the laptop could beep or buzz (i.e., create an audible signal of some type) to indicate which laptop has taken control.

Figure 17:
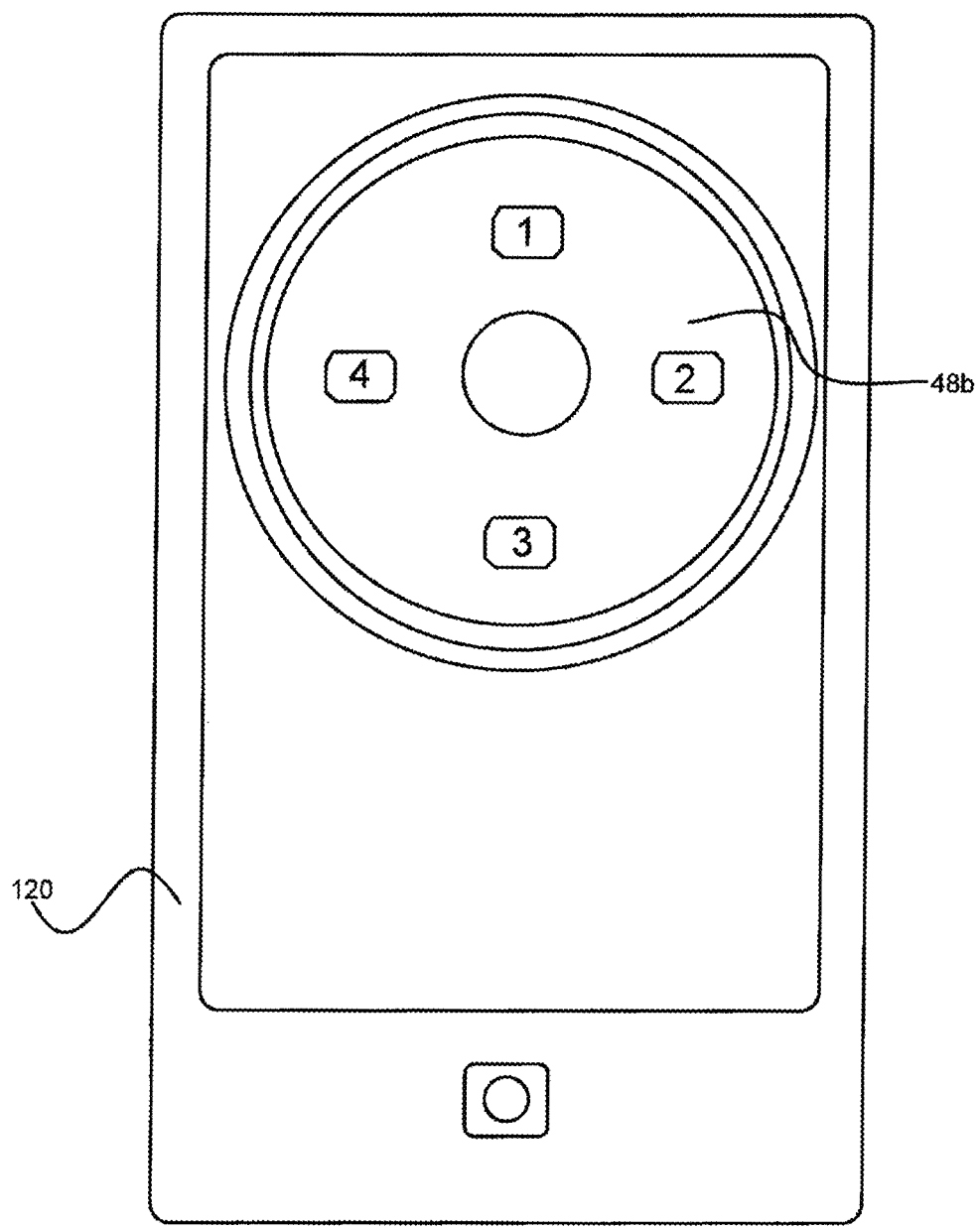
FIG. 17 shows a puck "widget" provided on a touch sensitive palm type computing device.

In yet another embodiment where a laptop source user has a touch screen phone or other palm type computing device in addition to the laptop/source, a widget may be provided via the palm type device where the widget size can be enlarged to include much of the display. To this end see FIG. 17 that shows a palm type device 120 that includes a large touch screen where a virtual puck palm device 120 and laptop 69 would have to be associated in some way so that palm device control would cause the correct/associated laptop information to drive appropriate displays 22*a*-22*d*.

Figure 20:
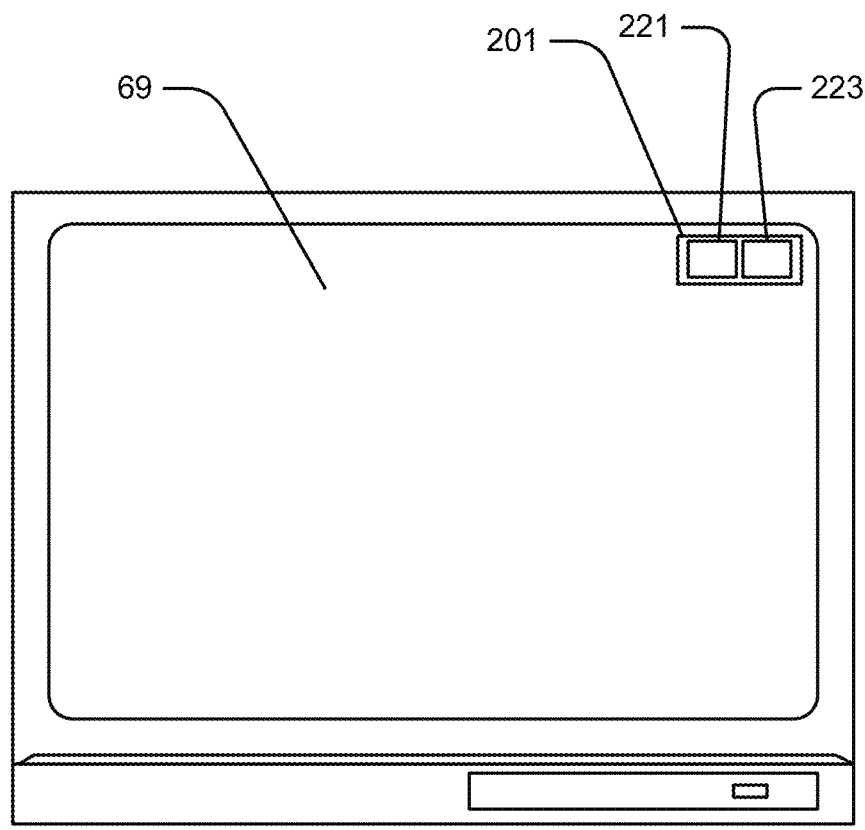
FIG. 20 is a view similar to the view shown in FIG. 18, albeit showing a different virtual screen selection tool.
Figure 21:
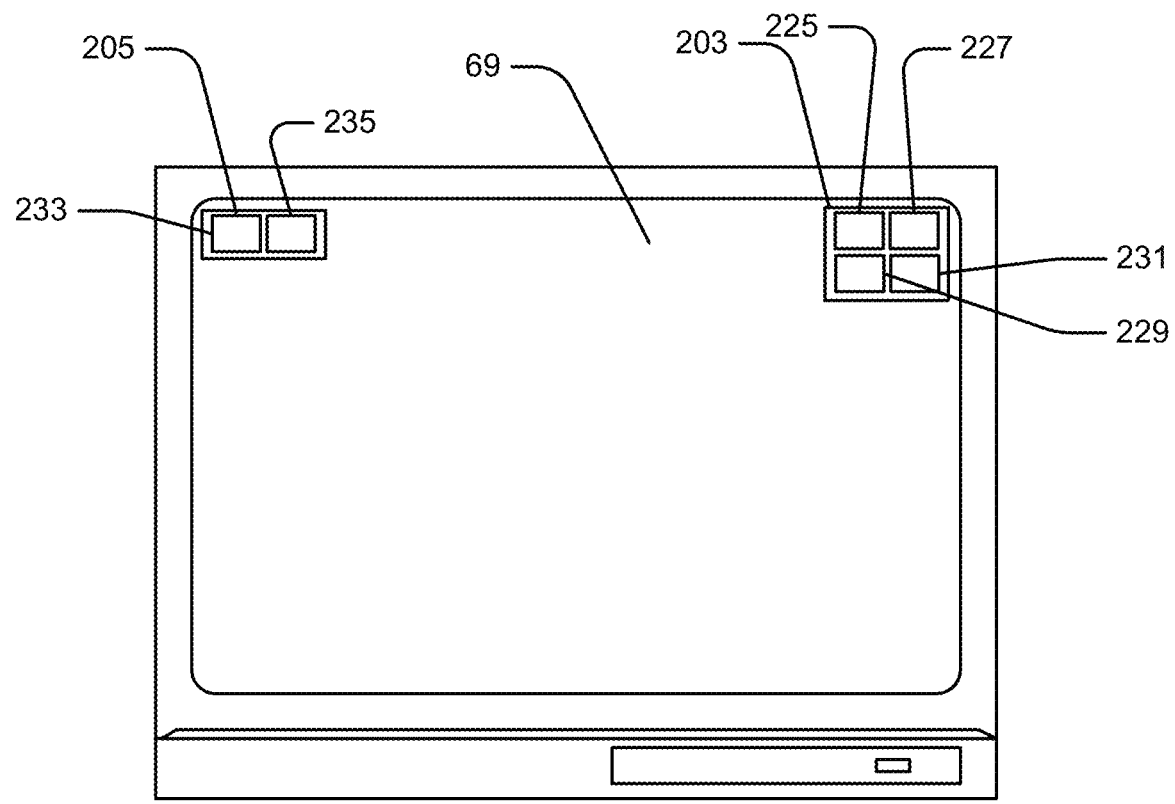
FIG. 21 is similar to FIG. 20, albeit showing yet another screen selection tool appearance.

In a wireless system where a widget or virtual control interface is presented via a display screen, the control interface may take any of several different forms. For instance, where a configuration includes four common displays (see FIG. 1), the control interface 130 may have an appearance as in FIG. 18 that shows screen selections or display icons 131, 133, 135 and 137 in a pattern that mimics or mirrors the pattern of the four display screens 22*a*-22*d*. Where a system includes only two displays (see FIG. 13), the virtual control interface may only include an image of two selectable displays, and so on. To this end, see the screen shot 69 in FIG. 20 that shows a control widget 201 that includes two selectable icons 221, 223, a separate icon for each of two screens associated with a presentation system. In still other embodiments there may be two or more on screen widgets for selecting common screens to drive from a laptop. For instance, see FIG. 21 where a screen shot 69 includes first and second widgets 203 and 205 where first widget 203 includes four selectable common screen icons 225, 227, 229 and 231 and second widget 205 includes two selectable common screen icons 233, 235. The FIG. 21 screenshot 69 may be presented to a device user located in a conference space including two presentation systems including a four screen system as in FIG. 1 and a two screen system as in FIG. 13 for use by a group of people sharing content.

Figure 19:
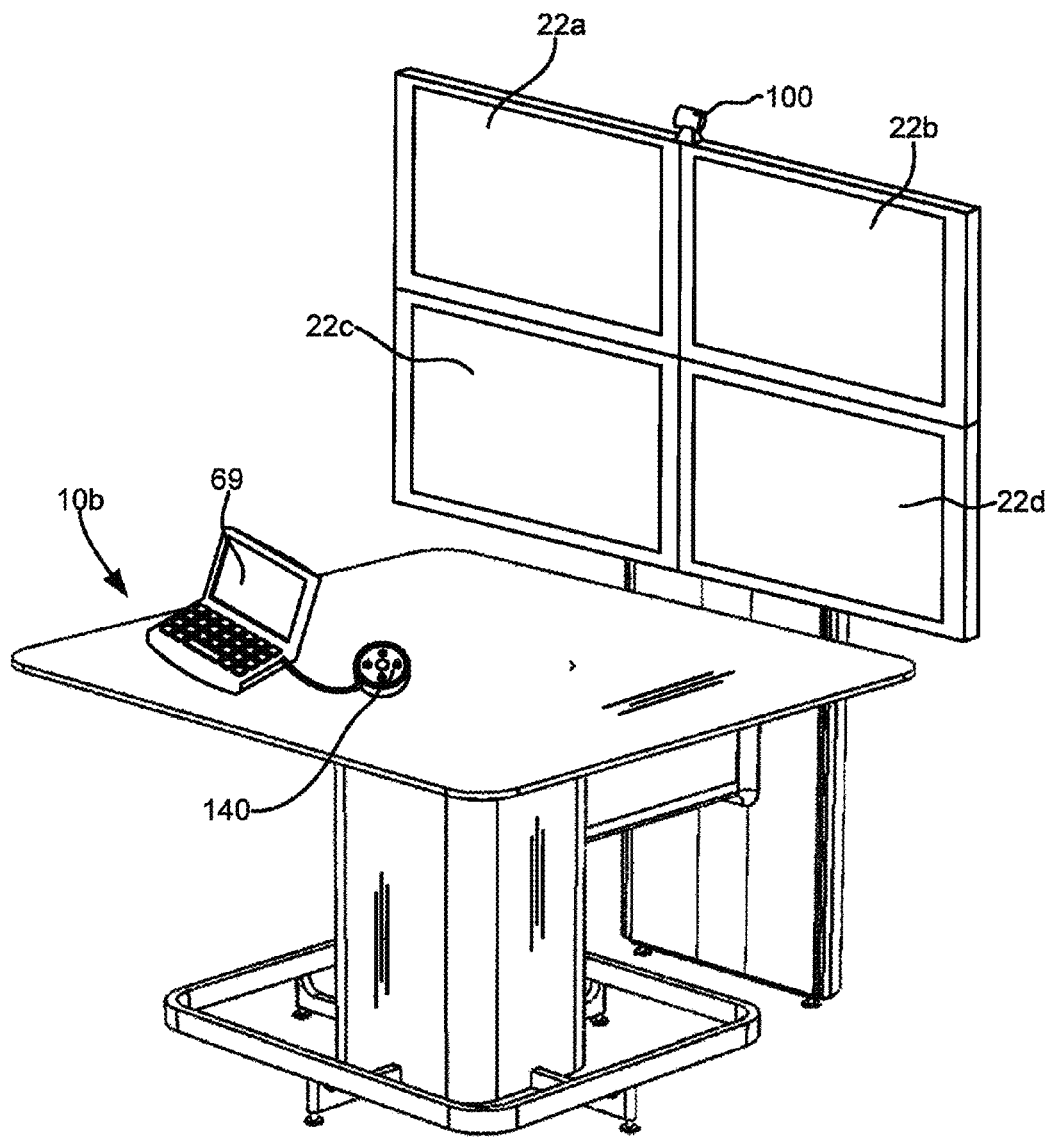
FIG. 19 is similar to FIG. 15, albeit where a mechanical interface is included for use with a source.

Referring to FIG. 19, in wireless embodiments, a mechanical control interface 140 akin to puck 48 described above may be provided where the interface 140 links to a USB port or the like on a laptop 69. Here, interface 140 operates in the same fashion as puck 48 described above except that control signals from interface 140 are provided to a switching device wirelessly through the laptop. In this case interface 140 still provides a visual queue to conference participants using configuration 10*b* indicating which laptop(s)/source(s) is being used to drive the displays.

In some embodiments one or more projectors (not illustrated) may replace the displays 22*a*-22*d*. Where a system includes a single projector, the projected image may be divided into two, four, etc., separate presentation spaces where each switching device output 44 drives a different one of the presentation spaces so that multiple sources can be used to display in different spaces simultaneously.

Several specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

For example, while the pucks 48 described above include illumination devices controllable to indicate different states, it should be appreciated that other indicators that can visually distinguish states are contemplated. For instance, each button 60a-60d in FIG. 4 may include a liquid crystal display type device where different cross hatching indicates different statuses. As another example, in at least some embodiments it is contemplated that each time a presentation state changes, a puck or other system component may generate an audible signal to indicate a state change (see audio generator 77 in FIG. 5). In addition, while the embodiments illustrated include two or four displays supported by a totem, it should be appreciated that the illustrated embodiments are only exemplary and that other numbers of displays may be supported by a totem or that displays may in some cases be mounted to a wall or other supporting structure proximate a conferencing table.

Additional Embodiments

Figure 22:
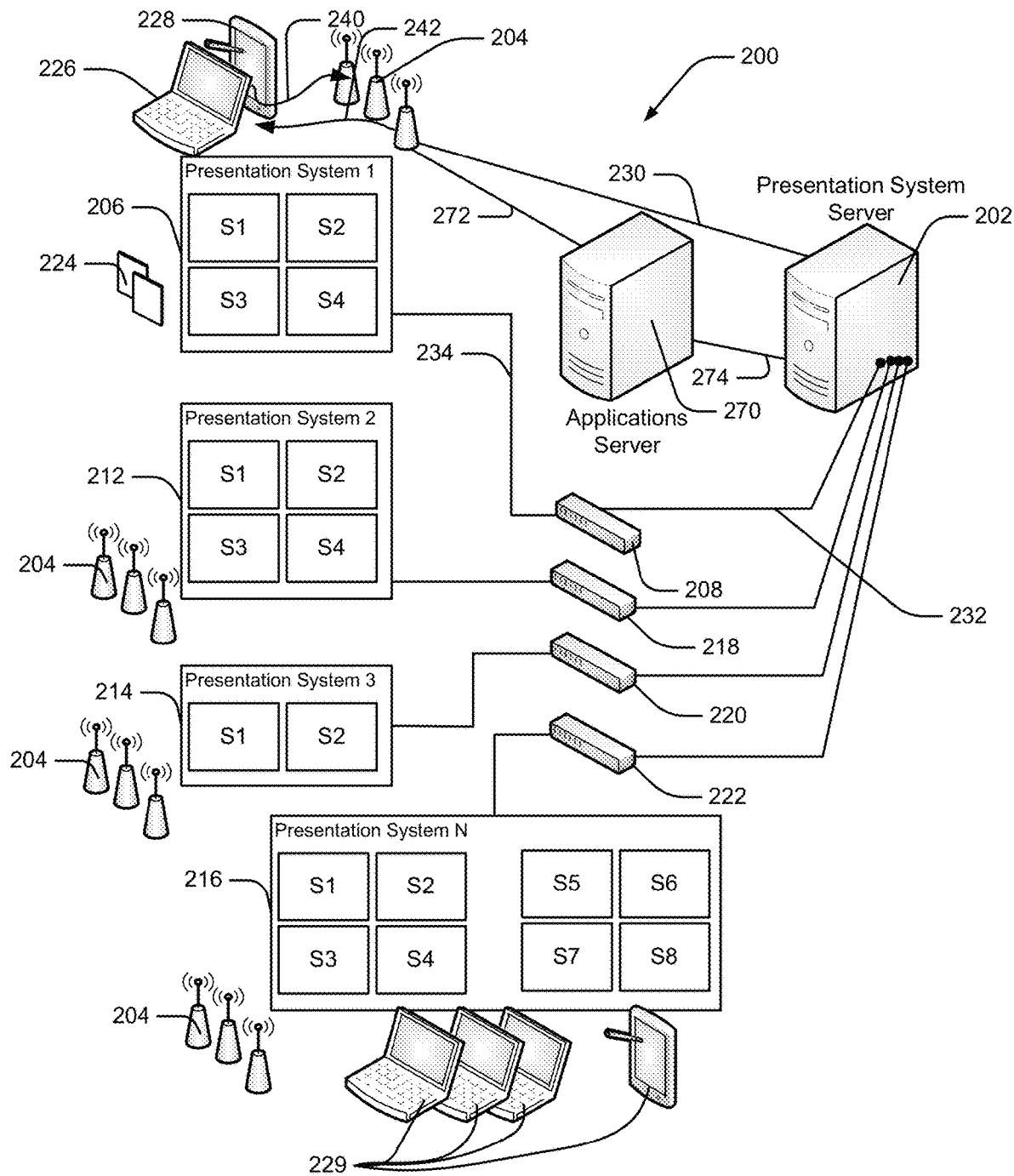
FIG. 22 is a schematic illustrating a presentation system architecture for supporting and controlling a plurality of presentation systems.

Referring now to FIG. 22, an exemplary wireless presentation system architecture 200 is illustrated. Exemplary architecture 200 includes a presentation system server 202, wireless access points collectively identified by numeral 204, first through N presentation systems 206, 212, 214 and 216, switching devices or switches 208, 218, 220 and 222 and a network of data linkages, some of which are identified by numerals 230, 232 and 234. The linkages 230, 232, 234 may be provided via system dedicated lines or via a network such as a local area network, a wide area network, the Internet, etc. In FIG. 22, exemplary wireless user devices include devices labeled 226, 228 and 229 where the devices may be any type of computing device that generates a graphical screen output image such as a laptop, a smart phone, a pad type device, a palm type device, a reader device, etc.

Figure 26:
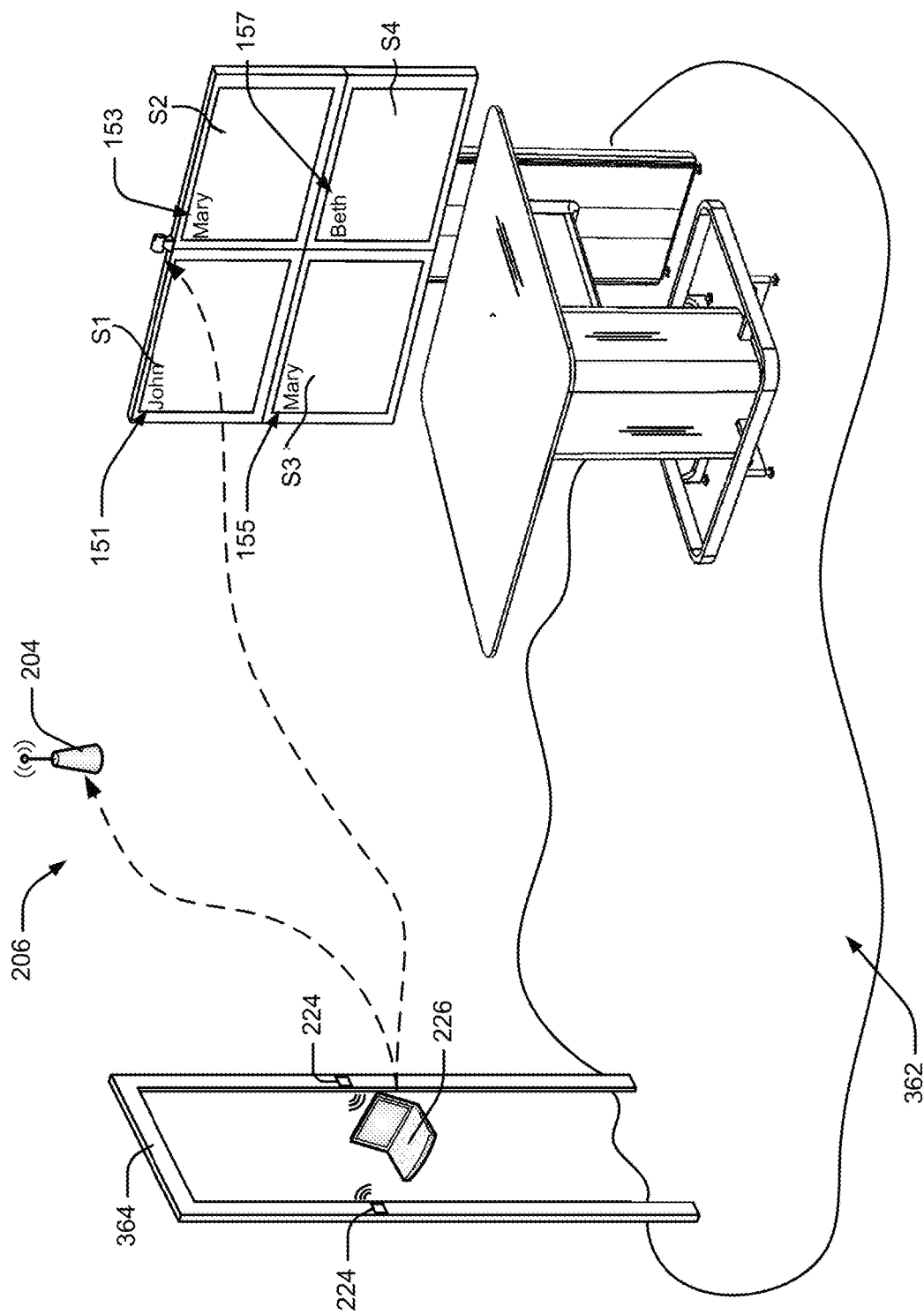
FIG. 26 is a schematic illustrating a presentation system including devices for identifying the system to a user device upon passage of the user device through an egress.

Presentation system 206 includes four separately selectable common display screens labeled S1 through S4. Similarly, presentation system 212 includes four separately selectable common display screens labeled S1 through S4. Presentation system 214 includes two selectable common display screens labeled S1 and S2 and system N includes eight separately selectable common display screens labeled S1 through S8. In at least some cases each of the systems 206, 212, 214 and 216 will be located in a space uniquely associated with the system such as, for instance, a conference room, a space that is clearly separate and spaced apart from the other presentation systems, etc. For instance, FIG. 26 shows system 206 located in a conference room that defines a space 362 where the conference room includes a single egress 364.

In at least some cases wireless access points 204 are located near each of systems 206, 212, 214 and 216 that can be used to wirelessly communicate with wireless user devices 226, 228, etc., within the vicinity of a presentation system. In addition, in at least some embodiments, access points 204 can generate data used to identify locations of specific wireless user devices and more specifically to identify when a user device is proximate one of the presentation systems. For instance, in at least some embodiments, signals received from user device 226 may be used to triangulate the location of device 226 in a manner well known in the wireless communication arts. In this regard, server 202 or some other processor or server linked to architecture 200 may run a device locating program to use information from access points 204 to identify user device locations and to associate each device location with a specific one of the presentation systems 206, 212, 214 or 216 based on relative proximity to the systems.

Presentation system server 202 stores and runs additional programs to manage operation of presentation systems 206, 212, 214 and 216. To this end, server 202 programs enable laptop or other user devices to download a desktop sharing application useable to select different subsets of presentation system display screens on which a user's desktop (i.e., the instantaneous image on the user's device) is to be displayed. Server 202 programs also manage which desktops (e.g., images of current screen shots from device displays) of several different user devices associated with a presentation system (e.g., system 206 in FIG. 22) at any given time are presented via the common system display screens S1, S2, S3 and S4. The server programs perform other processes as are explained in more detail below.

Referring still to FIG. 22, server 202 is linked to each of the presentation systems 206, 212, 214 and 216 by a separate video switching device or switcher 208, 218, 220 and 222, respectively. For instance, server 202 is linked to switching device 208 via line 232. Each switching device is controllable by server 202 to provide the desktop image from any user device associated with a specific one of the presentation systems to any one or a subset of the common displays that comprise the associated presentation system. For instance, in FIG. 22, if user devices 226 and 228 are currently associated with presentation system 206, server 202 may provide the desktop of either device 226 or 228 to any one of or a subset of screens S1 through S4 that comprise system 206. Similarly, where user devices 229 are currently associated with presentation system 216, server 202 may provide the desktop of any of devices 229 or a subset thereof to any one or a subset of screens S1 through S8 that comprise system 216. Control of switching device 208 is accomplished via signals from system server 202 on line 232. Desktop images are also transmitted from server 202 through line 232 to switching device 208 which then provides the images to selected subsets of screens S1 through S4 in system 206.

In at least some embodiments it is contemplated that a simple screen sharing application may be downloaded to each user device to be used with the system 200 shown in FIG. 22. Once downloaded, the screen sharing application may be used with any one of a plurality of presentation systems such as, for instance, 206, 212, 214 or 216 in FIG. 22, or other presentation systems at other locations to control common display screens associated therewith. Prior to sharing a device desktop via common displays of a presentation system, a user device must be associated with a specific one of the presentation systems in order to avoid inadvertent and potentially embarrassing sharing via a common display of a different one of the presentation systems. For instance, if a device user is located within a location associated with the first presentation system 206 in FIG. 22 and intends to share the user's device desktop via a subset of the first system 206 common screens, the user's device has to be uniquely associated with system 206 prior to sharing to avoid presenting via one of the other systems 212, 214 or 216 which may be proximate (e.g., in an adjacent conference room) to presentation system 206.

Figure 23:
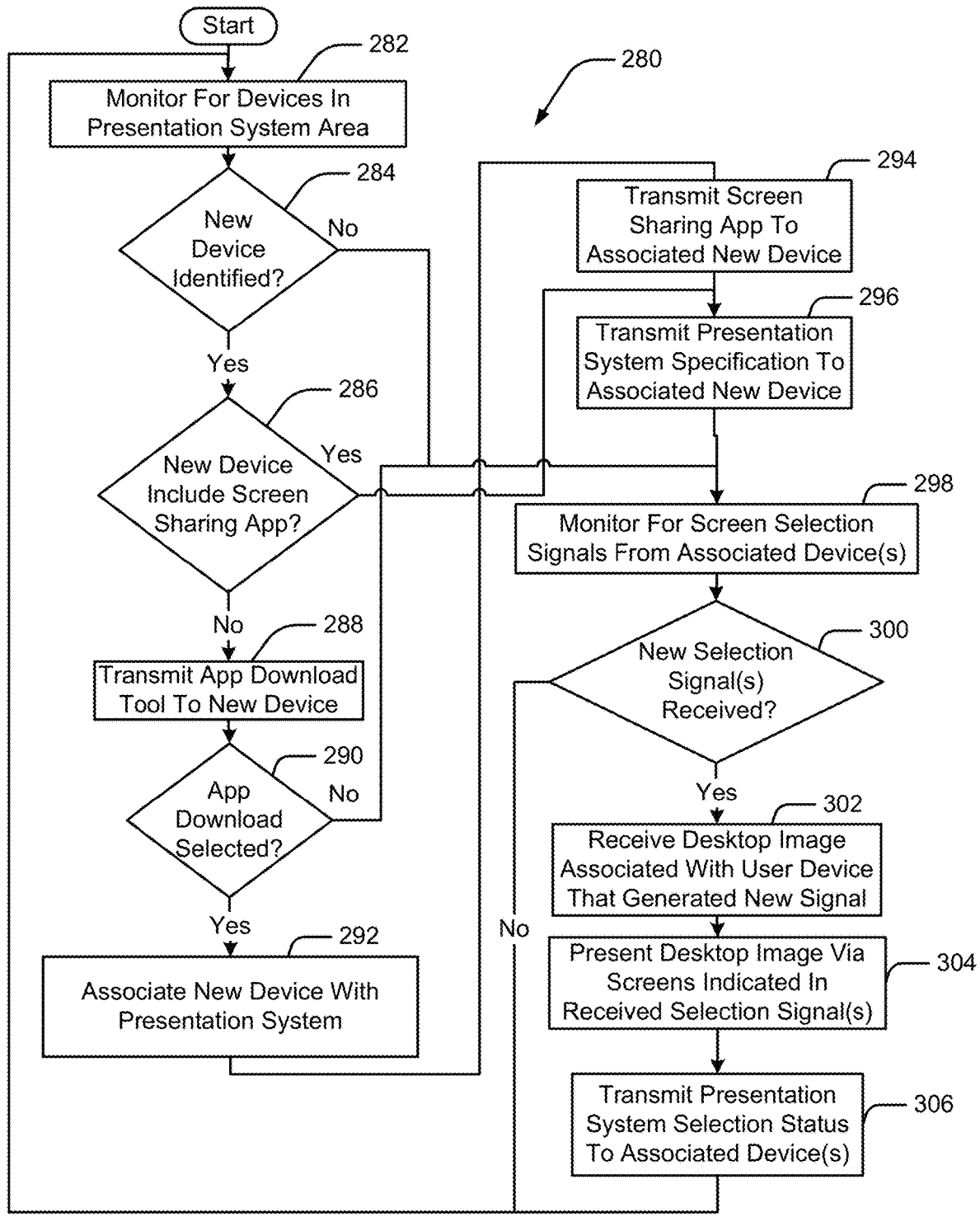
FIG. 23 is a flow chart illustrating a process that may be performed by the server shown in FIG. 22.
Figure 24:
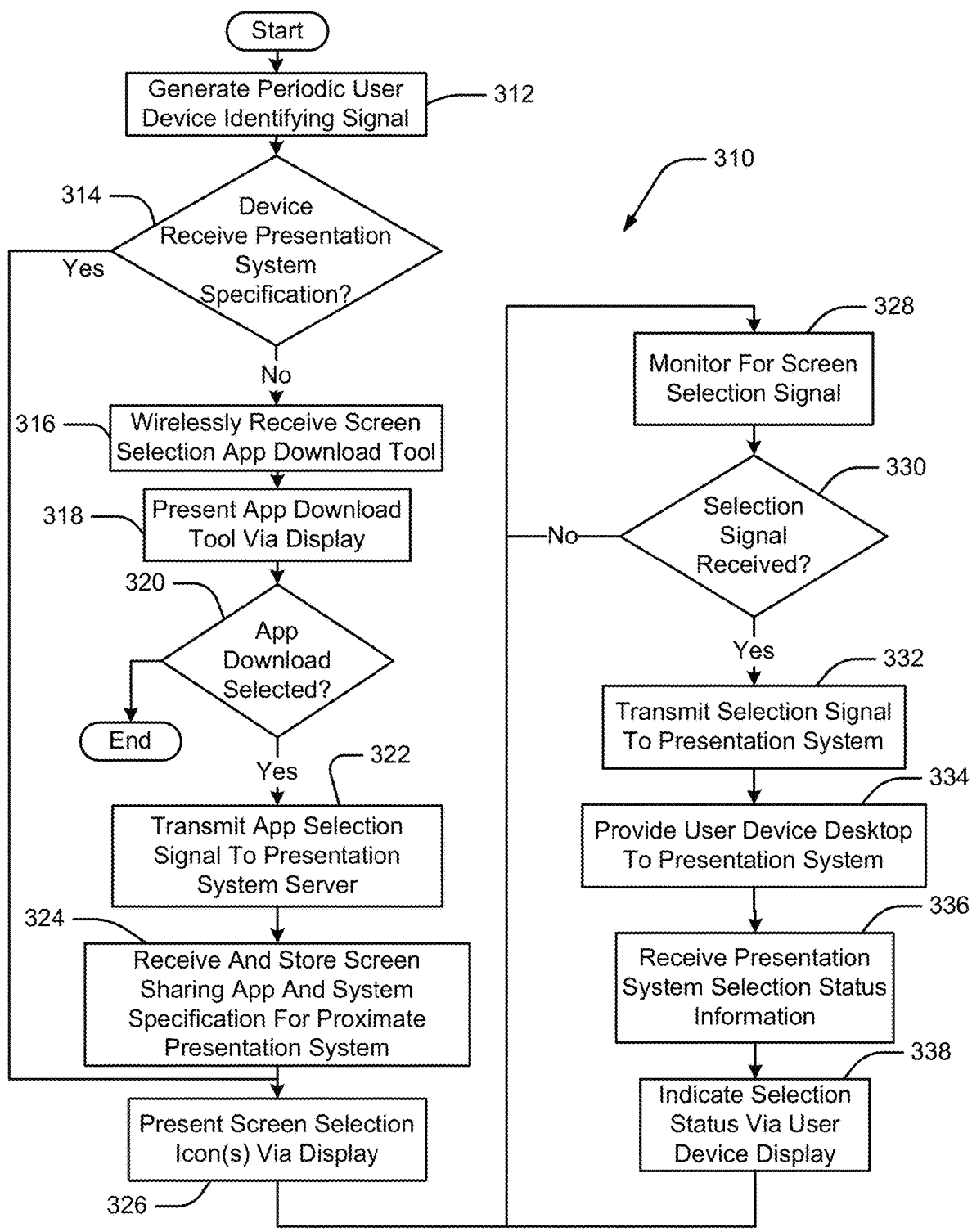
FIG. 24 is a flow chart illustrating a process that may be performed by one of the portable user devices shown in FIG. 22.

Referring now to FIG. 23, an exemplary process 208 that may be managed by server 202 for downloading the screen sharing application to a user device and for managing sharing via screens of one of the presentation systems is illustrated. Referring also to FIG. 24, a simultaneous process 310 performed by a user device for downloading the screen sharing application and for controlling selection of presentation system screens for sharing is shown. Hereafter, unless indicated otherwise operation of server 202 and a user device will be described in the context of the first presentation system 206 and user device 226 in FIGS. 22 and 27. It will also be assumed that device 228 is already associated with system 206 so that device 228 can already be used to share the device 228 desktop via display screens S1 through S4 of system 206.

In FIG. 23, at block 282, server 202 obtains information from access points 204 and uses that information to determine whether or not a new user device has entered a space associated with first presentation system 206. In this regard, user device 226 may be programmed to transmit a periodic wireless device identifying signal to access points 204. In FIG. 24, device 226 generates the device identifying signal at block 312. At decision block 284 in FIG. 23, server 202 determines whether or not a new device has been identified within space 362 associated with system 206 by using the signals received from access points 204 to triangulate the location of device 226 and locating the device 226 within space 362. The device locating process may be performed by a computing resource other than server 202. Where no new device has been identified, control passes to block 298 where server 202 monitors for screen selection signals from other user devices that are already associated with system 206. In the present example, device 228 is already associated with system 206 and therefore server 202 monitors for signals from associated device 228.

At block 284, when a new device is identified within the space associated with system 206, control passes to block 286 where server 202 determines whether or not the new device within the space associated with system 206 has previously downloaded the screen sharing application. In this regard, it is contemplated that server 202 may store information that tracks which user devices have previously downloaded the sharing application and, if a new device is not on the list of devices that has previously downloaded the application, server 202 may recognize the device as not having downloaded the application. In the alternative, the user device identifying signal may include information indicating if a user device has downloaded the sharing application.

Where new device 226 has previously downloaded the screen sharing application, control passes to block 296 where server 202 transmits a presentation system specification (i.e. system specifying information) to the new device. A presentation specification includes information useable by a user device to configure a screen selection tool for a specific presentation system. For instance, referring again to FIGS. 22 and 23, at block 296, server 202 transmits a system specification to device 226 indicating that system 206 includes four common display screens S1-S4. In FIG. 24, at block 314, the user device 226 determines whether or not the device receives a presentation system specification. Where device 226 receives a specification, control passes down to block 326 where the device uses the specification to instantiate a screen selection tool (see exemplary four screen selection tool 130 in FIG. 18) on the device display. Prior to the user's device receiving a presentation system specification at block 314, control passes down to block 316.

Figure 25:
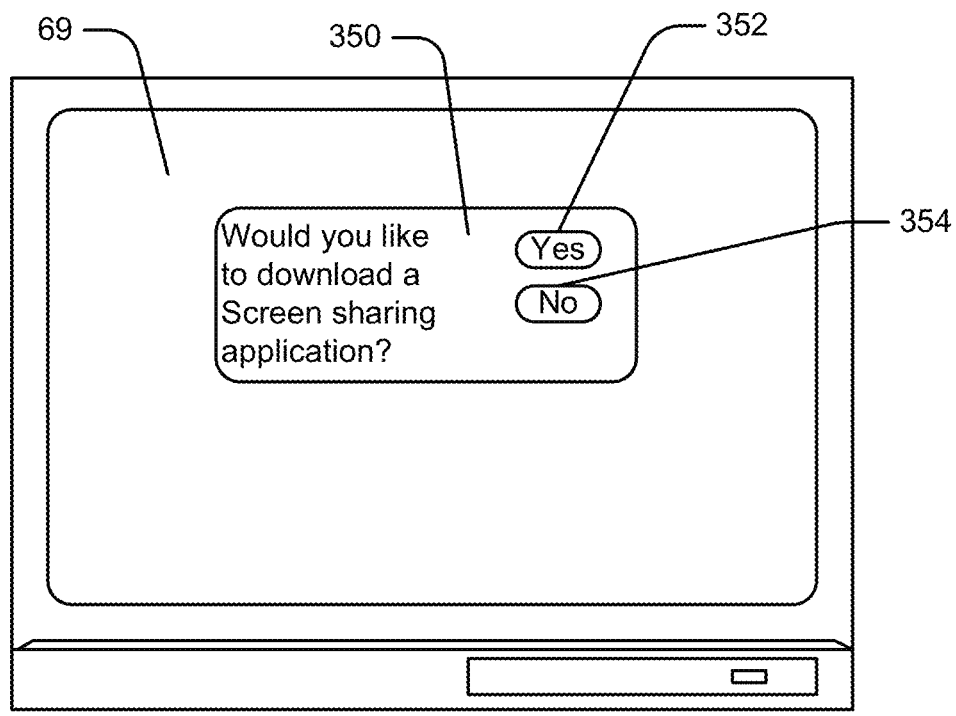
FIG. 25 is a view of a user device presenting an application sharing tool via a display screen.

Referring still to FIGS. 22-24 and also FIG. 26, at block 286, when a new device has not previously downloaded the screen sharing application, control passes to block 288 where server 202 transmits a screen sharing application download tool to the new device. In FIG. 24, when the new device receives the download tool at 316, control passes to block 318 where the device presents the application download tool via the device display. FIG. 25 shows an exemplary application download tool 350 that queries the device user whether or not the user would like to download the screen sharing application. The exemplary tool 350 includes "Yes" and "No" icons 352, 354, respectively, that can be selected via touch, a mouse controlled cursor or some other screen selection feature. In FIG. 24, at decision block 320, where the user decides not to download the screen sharing application, the portion of the process associated with the user's device ends. In FIG. 23, when the user opts to not download the screen sharing application, server control passes to block 298 where server 202 monitors for screen selection signals from other user devices (e.g., device 228 in the present example) already associated with system 206.

Referring still to FIGS. 22-24, when a user indicates that the screen sharing application should be downloaded at block 320, control passes to block 322 where the user's device transmits an application selection signal to server 202. In FIG. 23, server control passes to block 292 where the new device is associated with the first presentation system 206 and at block 294 the screen sharing application is transmitted to the associated new device 226. At block 296, the presentation system specification corresponding to first system 206 is transmitted to new device 226. Again, the system specification for system 206 specifies that the system includes four common display screens so that device 226 can configure a screen selection tool that mimics or mirrors the selectable common screens. In FIG. 24, at block 324, the screen sharing application is stored on the user's device and device 226 uses the presentation system specification to instantiate the screen selection tool (e.g., 130 in FIG. 18) on the display.

In FIG. 24, at block 328, user device 226 monitors for a screen selection signal via the selection tool. At block 330, when no selection signal is received, the sharing application continues to cycle through blocks 328 and 330 to monitor selection activity. Once a screen selection signal is received at block 330, at block 332, the signal is transmitted to server 202. Continuing, at block 334, device 226 provides a user's desktop image to the presentation system. In the present example, the desktop image is provided to the presentation system via data streaming from device 226 to server 202 via access points 204 and server 202 then transmits the streaming images via switching device 208 to the subset of common screens S1 through S4 selected by the device 226 user at step 298.

In FIG. 23, server 202 monitors for a screen selection signal from associated devices 226 and 228. Where no new screen selection signal is received, control passes from decision block 300 back up to block 282 where the process described above continues to cycle so that new user devices can be associated with system 206 and to monitor for screen selection signals from all associated devices. Once a new selection signal is receive at block 300, control passes to block 302 in FIG. 23 where server 202 receives the streaming desktop image associated with the user device used to make the most recent screen selection. At block 304, server 202 controls switch 208 (see again FIG. 22) to present the received desktop image via the selected screens.

Continuing, at block 306, server 202 transmits a feedback signal to each of the user devices currently associated with system 206 to indicate to those devices a presentation system selection status. For instance, in FIG. 22, where user device 228 was initially associated with system 206 and initially presented its desktop via each of screen S1-S4, the system selection status signal transmitted at 306 would indicate that device 228 controls all four screens. After device 226 is associated with system 206, if device 226 is used to select screens S1 and S3 for sharing the device 206 desktop image, after the selection, server 202 transmits a signal to each of associated devices 226 and 228 at 306 indicating at least which screens each specific device 226 desktop is being shared on. For instance, a first selection status signal transmitted to device 226 may indicate displays S1 and S3 while a second selection status signal transmitted to device 228 may indicate displays S2 and S4.

Figure 18:
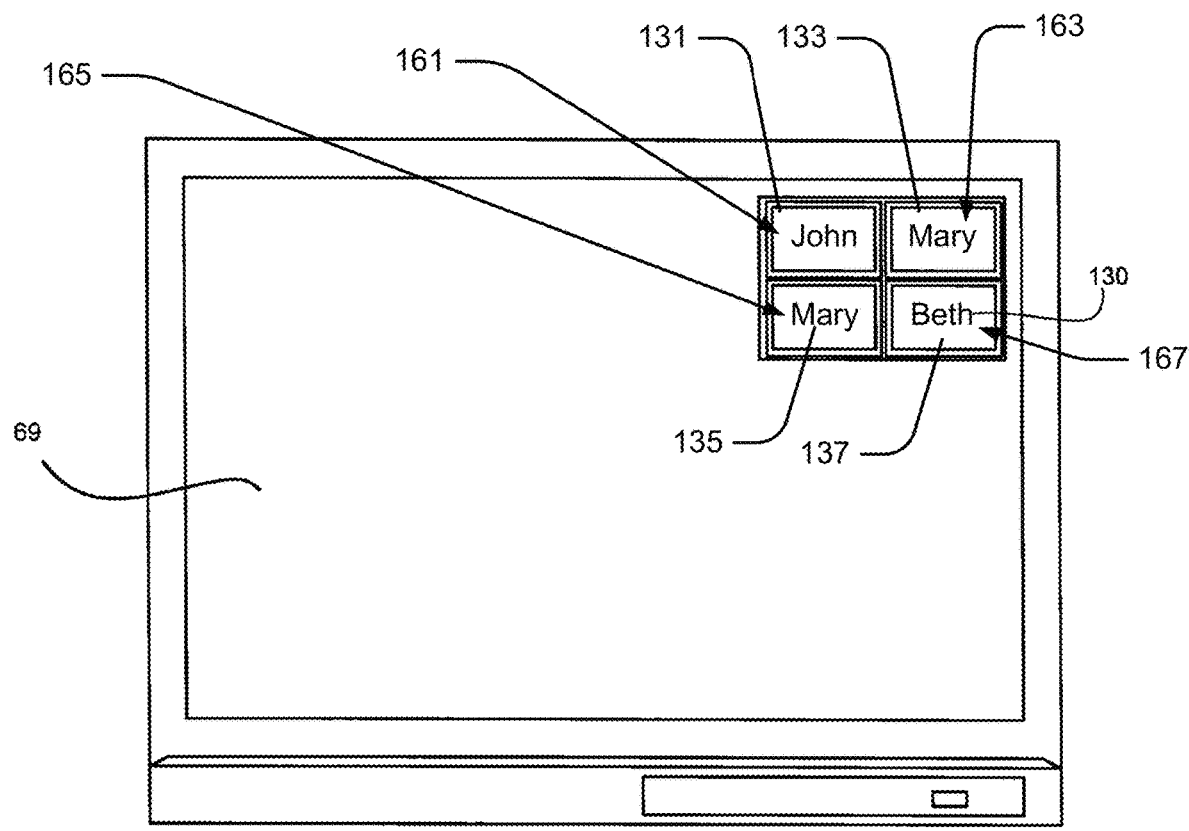
FIG. 18 is similar to FIG. 16, albeit showing a different appearing virtual control interface.

Referring again to the process in FIG. 24, at block 336, device 226 receives the presentation system selection status signal and at block 338 device 226 indicates the selection status via the user's devices display. Here, for instance, referring again to FIG. 18, selection status may be indicated by illuminating or otherwise visually distinguishing display icons on tool 130 that correspond to selected common screens S1 and S3 (i.e., the upper left and lower left display icons 131 and 135 on tool 130). Similarly, after device 226 is used to select screens for sharing, because the selection using device 226 changes which user devices are presenting on which common display screens, the selection has to be reflected on other user device selection tools. In the present example where device 228 initially drove all four common display screens and only drives screens S2 and S4 after device 226 is used to select screens S1 and S3, device 228 updates its selection tool by only highlighting or otherwise visually distinguishing display icons associated with common screens S2 and S4 that continue to be driven by device 228 after the selections using device 226 are complete. In FIG. 18, device 228 highlights the upper and lower display icons 133 and 137, respectively. In the alternative, when new screen sharing selections are made via one device (e.g., 226), that device may immediately highlight display icons on the selection tool that are selected and the selection status signals at 306 may only be transmitted to other devices (e.g., 228) having screen selection tools that have appearances that require updating.

As discussed above, because screen selection tools are presented on user device display screens which are not always visible to people other than a device user, in at least some cases, when a user makes a common screen selection for sharing the user device desktop with others, the user's device may generate an audible signal to announce to others proximate common system screens that the user is the one changing the screen presentation status and the one responsible for new content placed on one or more common system screens.

In other embodiments it is contemplated that some type of user identifier may be presented on each common system screen indicating the identity of the user that is sharing the desktop image that appears on the screen. To this end, server 202 may store user identities with device identifiers for every device that downloads the screen sharing application and, when a user device is used to share a desktop on a common system screen, server 202 may be programmed to provide identifying information for the user via selected common screens. For instance, the user identifying information may include the user's name, the user's initials, a nickname for the user or any other type of user identifier. Exemplary common screen user identifiers are shown at 151, 153, 155 and 157 in FIG. 26. The user identity may be persistently presented. For instance, the user's name may be placed in a small field in the upper left hand corner of a selected screen so that the identity information only minimally affects ability of users to view the shared desktop. In other embodiments the user's identity may only be presented for a short time (e.g., 2 seconds) when the user initially makes screen sharing selections.

In still other embodiments, which users are driving which common screens may be indicated on each user's screen selection tool presented on the user devices. In this regard, the presentation system selection status signals generated at block 306 in FIG. 23 and used to affect the appearance of the screen selection tools at block 338 in FIG. 24 may indicate identities of the device users currently driving the common screens. The user devices may add user identifying information to their own screen selection tools to reflect current screen control status. Exemplary selection tool user identifiers are shown at 161, 163, 165 and 167 in FIG. 18.

Thus, at a high level, after user device 226 is associated with specific presentation system 206, communication between device 226 and server 202 is wireless and device display images are streamed from device 226 to server 202 for presentation on common system screens selected via the screen selection tool presented via device 226. Updates to selection status are wirelessly provided by server 202 to device 226 and other user devices.

While location accuracy achievable using wireless access point data is suitable for at least some system architectures, it has been recognized that in other architectures the achievable accuracy using access point triangulation methods or other device locating methods may be insufficient due to relatively close proximity between different presentation systems. For example, in FIG. 22, where systems 206 and 212 are in adjacent conference rooms, it is possible that a device user located in the room associated with system 206 may inadvertently present the user's desktop via the system 212 in the adjacent room upon a screen selection action. This is particularly true in cases where presentation systems have similar configurations (e.g., each system has four shared display screen) as shown in FIG. 22 where a user in a first space and viewing one screen selection tool for a presentation system in a second adjacent space may be fooled by the selection tool mirroring the presentation system in the first space (e.g., the selection tool for the system in the second space would have four display icons just like a selection tool would have for the first space system).

To avoid inadvertent and potentially embarrassing desktop sharing, other systems are contemplated by the present disclosure. For example, at least some embodiments that are consistent with at least some aspects of the present invention may include some type of presentation system identifier device which can be used by a device user and the system server to either automatically associate user devices with a particular presentation system or to facilitate a simple manual process for uniquely associating a user's devices with a particular presentation system.

Referring now to FIG. 26, presentation system 206 is shown in space 362 that includes single egress or entry point 364. Access points 204 are shown proximate space 362 which can be use to wirelessly communicate with user devices in the general vicinity of space 362. Although not shown, access points 204 are linked to a system server 202 as in FIG. 22. Two system identifying devices 224 are shown on opposite sides of egress 364. In at least some embodiments, devices 224 include high frequency acoustic sound generating devices where each device 224 and the frequency of the sound generated thereby is associated with a specific presentation system (e.g., 206 in FIG. 22). In this regard, humans have a hearing range that is generally between 20 Hz and 20 KHz. Many user devices have the capability to record sounds within the human hearing range up to 20 KHz.

While frequencies within a band just below 20 KHZ (e.g., a high frequency audible band) are within the range of normal human hearing, human perception of sounds in that band often minimal. This is especially true where the volume of a generated sound is low. In FIG. 26, in at least some cases, the volume of the sound generated by devices 224 is low so that the sound only exists at a barely perceptible volume within a small space adjacent or generally within egress 364.

In some embodiments, a separate frequency within the band just below 20 KHz is assigned to each space (e.g., 362 in FIG. 26) that contains one of the presentation systems and hence to the presentation system itself. In other embodiments two or more frequencies within a band just below 20 kHz may be used to generate presentation system unique identifier codes for each presentation system. Hereinafter, unless indicated otherwise, a system unique frequency or a system specific code will generally be referred to as a system identifying signal. A sharing application on user device 226 is programmed to monitor for system identifying signals within the high frequency band and when an identifying signal in that band is obtained, may either use the signal to identify a specific presentation space or may cooperate with the system server (see again 202 in FIG. 22) to identify the presentation space associated with the frequency.

In some cases the sharing applications on each user device may include presentation system identifying codes or frequencies for each presentation system available. In these cases, each user device may be able to independently and uniquely identify a specific presentation system and provide that information to server 202 for associating and communication purposes. In other embodiments user devices receiving identifying signals may simply transmit the signals along with device identifying information to server 202 and server 202 may use a presentation system/identifying signal database to identify a specific presentation system.

After recognizing that a user device is in a space associated with a specific presentation system, server 202 may associate the device with the system and cause the device to provide a screen selection tool that mirrors the associated presentation system as described above.

Figure 27:
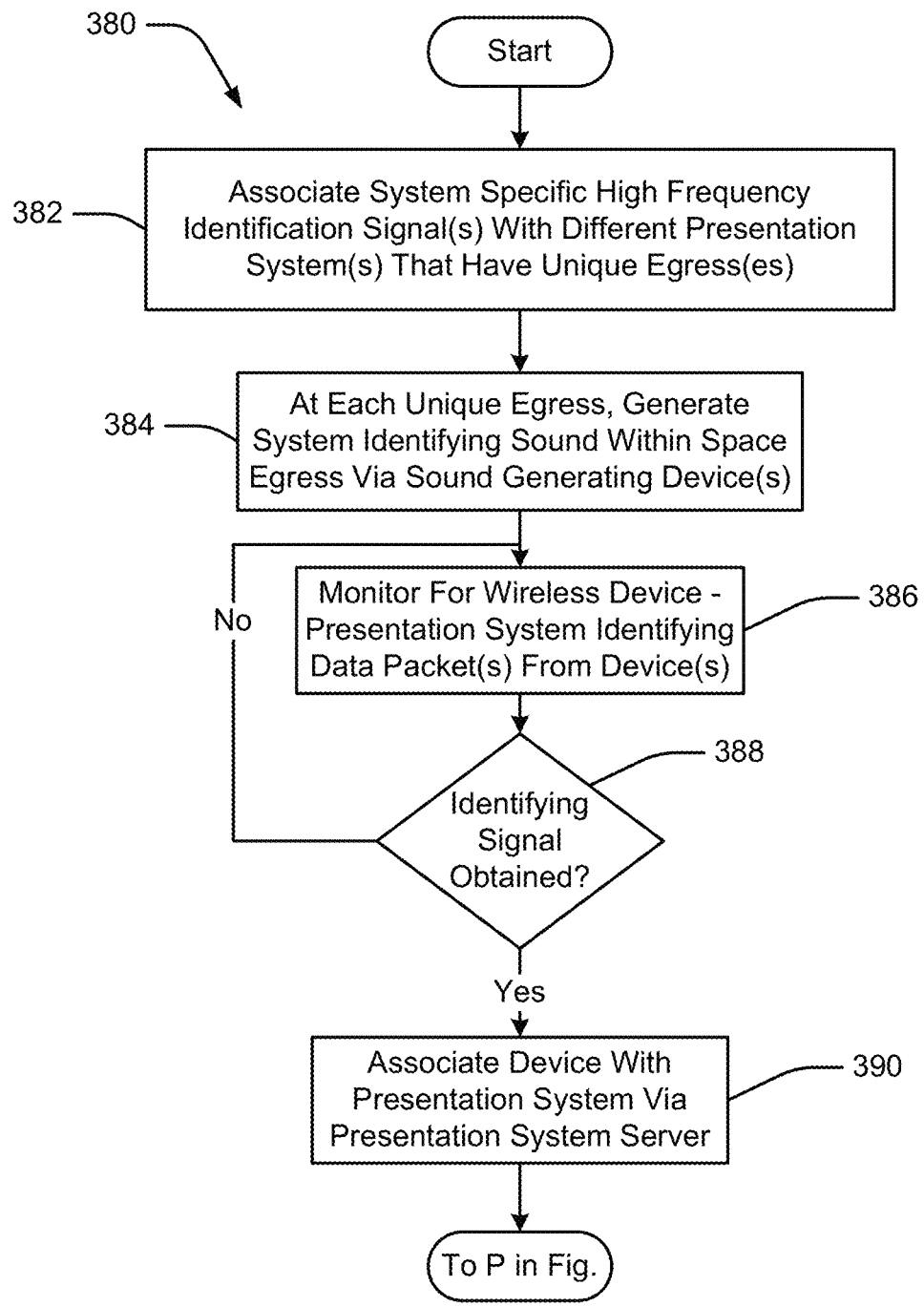
FIG. 27 is sub-process that may be substituted for a portion of the process shown in FIG. 23 for a system equipped like the system shown in FIG. 26.
Figure 28:
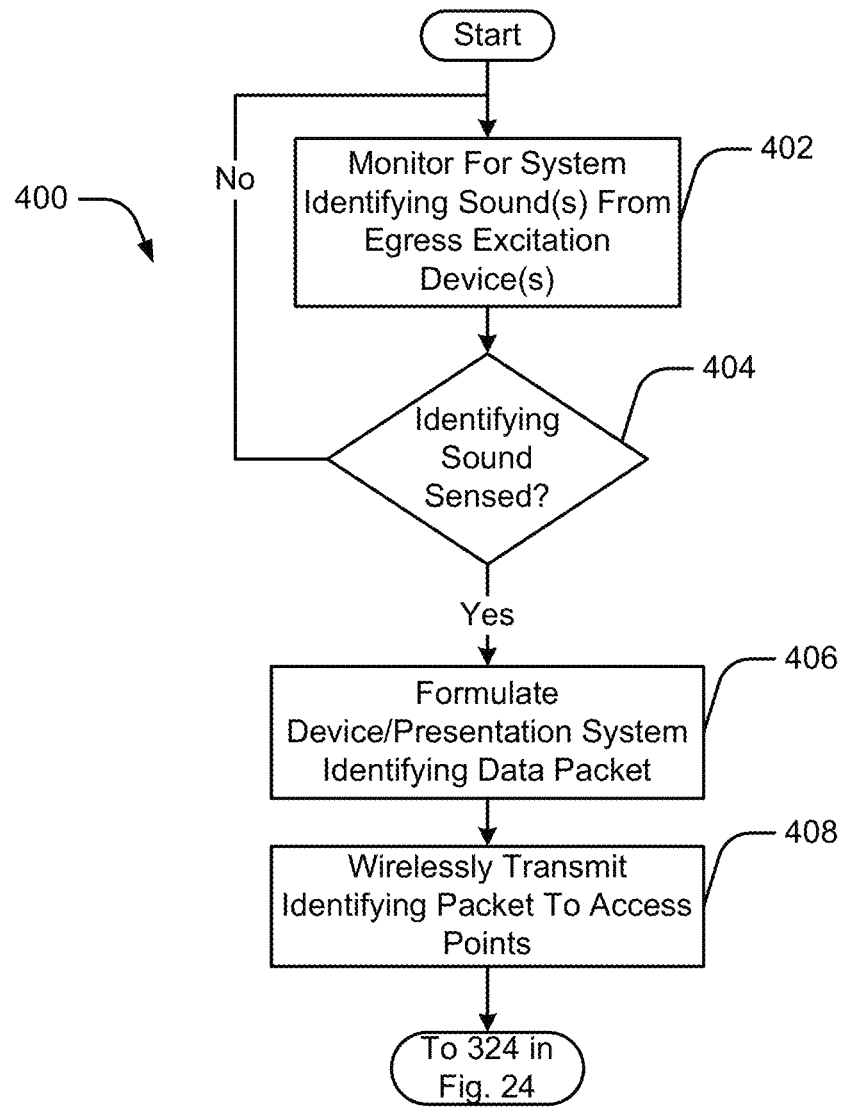
FIG. 28 is sub-process that may be substituted for a portion of the process shown in FIG. 24 to be carried out by a user device in the system equipped like the system shown in FIG. 26.

Consistent with the above, FIGS. 27 and 28 illustrate sub-processes 380 and 400, respectively, that may be substituted for portions of the processes in FIGS. 23 and 24 for using sound generating devices 224 to automatically associate user devices with particular presentation systems. Sub-process 380 is performed by server 202 while process 400 is simultaneously performed by a user device. Again, it will be assumed that device 226 is being moved into space 362 in FIG. 26 where first presentation system 206 (see also FIG. 22) is located in space 362. In addition it will be assumed that the screen sharing application has already been downloaded to device 226 and therefore need not be downloaded again.

In FIG. 27, at block 382, prior to operation of the system, presentation system specific identification signals or codes are associated with unique presentation systems. Thus a unique identifying code is associated with system 206 in FIG. 26. At block 384, sound generating devices 224 are supported adjacent egress 364 into the space 362 that contains system 206. Devices 224 are used to generate the high frequency system identifying signal associated with space 362 and system 206.

In FIG. 28, at block 402, user device 226 is carried by a user and device 226 monitors for any high frequency system identifying signal from any of the sound generating devices associated with any of the presentation systems (e.g., see 206, 212, 214 and 216 in FIG. 22). In some cases device 226 may monitor for specific high frequency codes essentially all the time while in other cases a user may have to activate the screen sharing application for device 226 to commence monitoring. In still other cases device 226 may be programmed to monitor for system codes automatically when the device 226 is in a space associated with the presentation systems. For instance, access points 204 and server 202 may cooperate to triangulate the location of device 226 and when device 226 is at a location proximate systems 206, 212, 214, etc. (e.g., on a floor of a building where the systems are located), a signal may be automatically provided to device 226 causing the device to monitor for the presentation system specific codes.

Until an identifying high frequency signal is obtained, device 226 control cycles through steps 402 and 404 in FIG. 28. Once a device identifying signal is obtained, control passes to step 406 where device 226 formulates a device/presentation system identifying data packet. The packet will include an identifier for device 226. The packet will also include at least some information that can be used to uniquely identify system 206. For instance, the system identifying information may include a unique identification number, the signal received from devices 224, etc. At block 408 the packet is transmitted to server 202 via access points 204. After block 204, device 226 control passes to block 324 in FIG. 24.

Referring again to FIG. 27, at block 386 server 202 monitors for device/presentation system identifying packets. If no packet is identified, control passes back up to block 386 where the process continues to loop until a packet is received. Once a packet is received at block 388, control passes to block 390. At block 390, server 202 associates the device identified in the received packet with the presentation system identified in the received packet. After block 390 control passes to block 296 in FIG. 23 where the presentation system specification for system 206 is transmitted to device 226 and the process described above with respect to FIG. 23 continues. At block 324 in FIG. 24, device 226 receives the system specification and the process in FIG. 24 continues as described above.

Other types of identifying devices 224 and ways of obtaining presentation system identifying information from devices 224 are contemplated. For instance, devices 224 may be RF devices that can be excited to transmit identifying information when a user moves through an egress (e.g., 364). In this case user device 226 (and other user devices) may be programmed to obtain RF identification information and send that information to server 202 to facilitate device to system association. In other cases devices 224 may be bar or matrix codes and identifying information may be manually obtained from the devices 224 by using a camera function on device 226. Other device 224 types and methods for obtaining presentation system identifying information are contemplated.

Even in cases where server 202 and user devices cooperate flawlessly to associate user devices with intended presentation systems, it has been recognized that some people may be uncomfortable with a system that automatically associates devices and common display screens without requiring some affirming process where the user can clearly confirm desired device to system association. For this reason, in at least some embodiments a password or pass code opt in process is contemplated whereby a user performs at least one manual step to associate her device with a specific presentation system. In this regard, see FIG. 29 where presentation system 206 is shown. Here it is assumed that user device 226 is not initially associated with system 206. A system password field 440 is presented on one of the common display screens S2 and a presentation system specific password "34QW90" is presented within field 440 for all persons within viewing distance of screen S2 to see.

A password entry tool 446 is provided on the display screen of device 226. Tool 446 includes a password entry field 448 where a user of device 226 can enter a presentation system password. For instance, the user may observe the system password in field 440 and enter that password in field 448. The password in field 448 is transmitted to server 202 which then commences the association and control processes described above.

Figure 29:
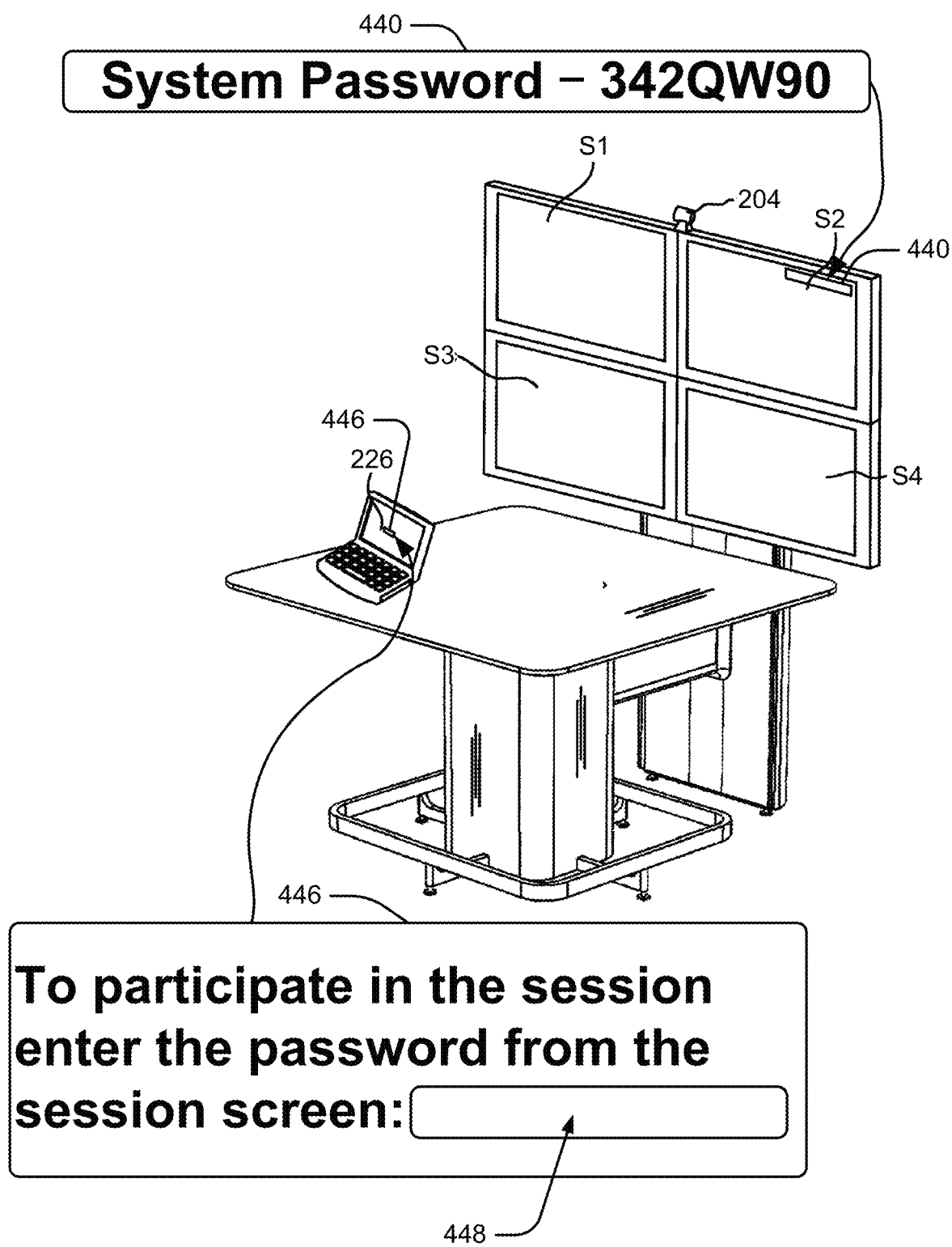
FIG. 29 is schematic diagram showing a presentation system that supports a password opt in process.
Figure 30:
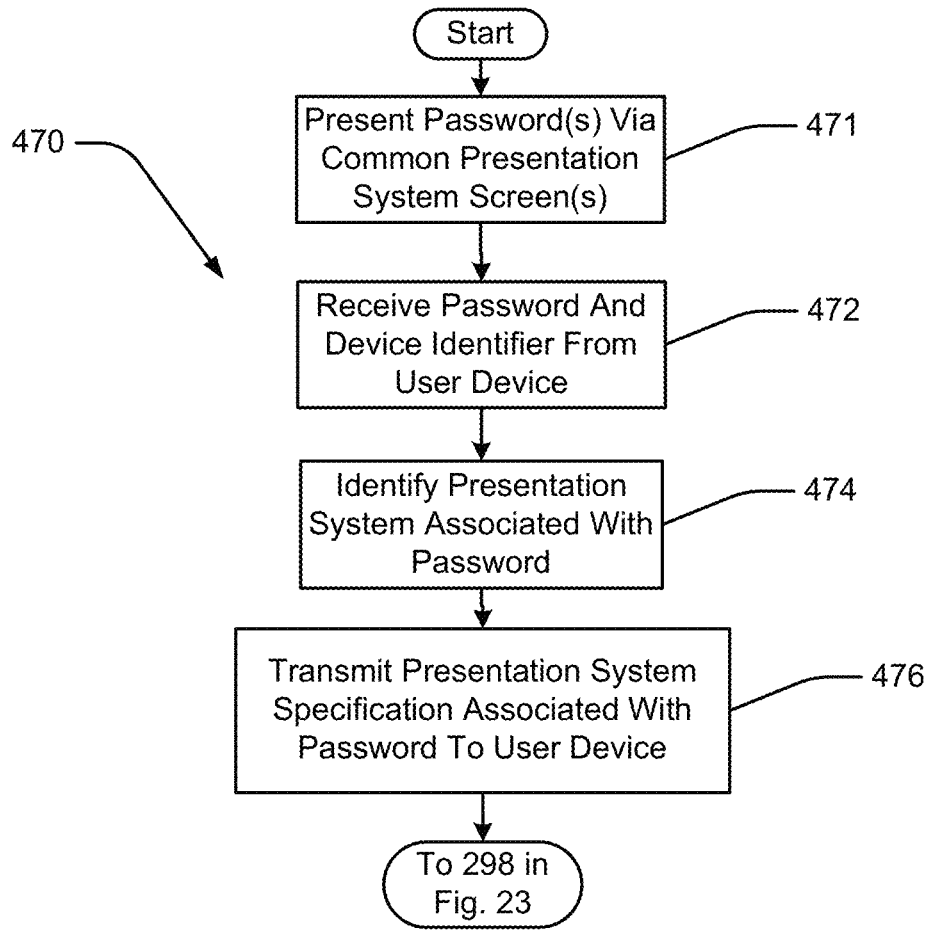
FIG. 30 a is sub-process that may be substituted for a portion of the process shown in FIG. 23 for implementing a password opt in process and that is performed by a server.
Figure 31:
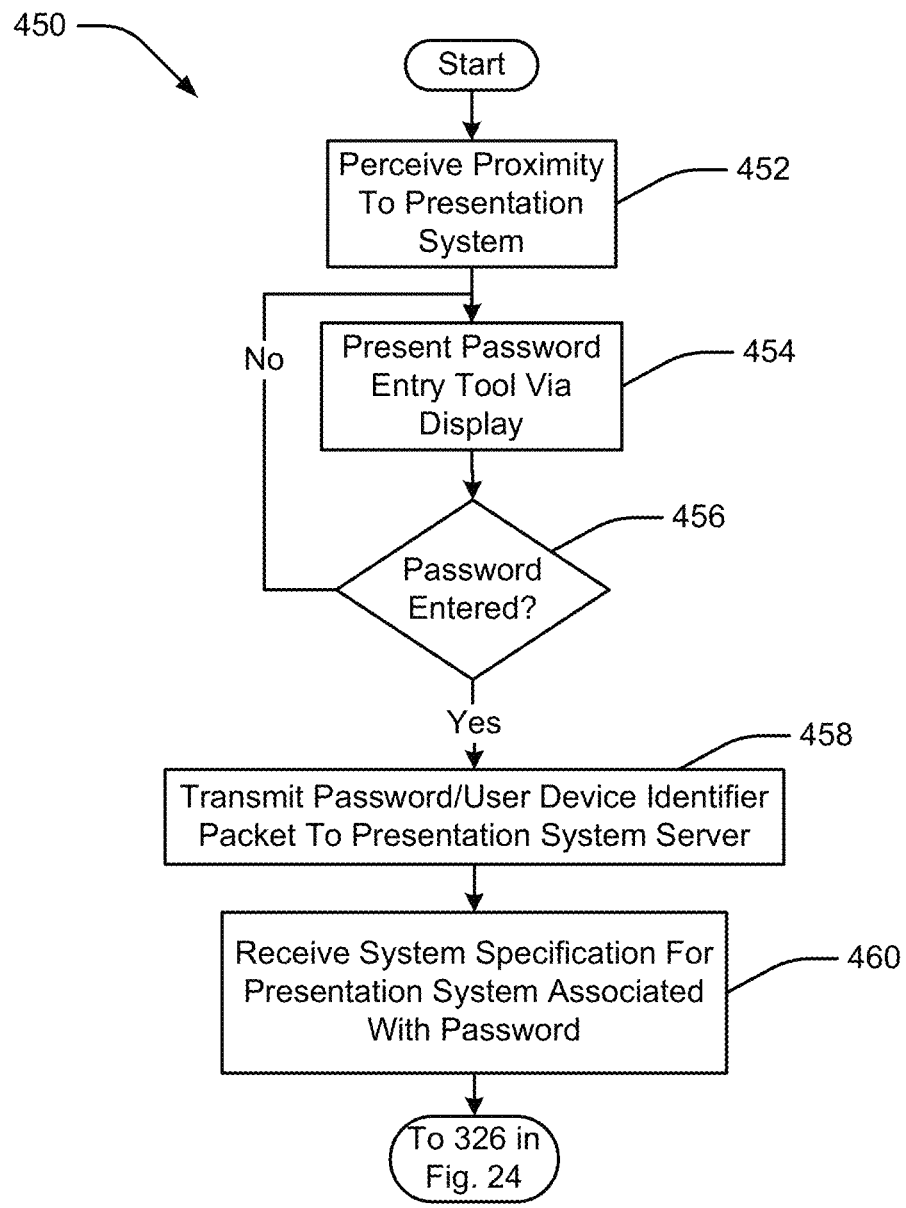
FIG. 31 is sub-process that may be substituted for a portion of the process shown in FIG. 24 to be performed by a user device to facilitate an opt in process like the one illustrated in FIG. 29.

Referring to FIGS. 30 and 31, sub-processes 470 and 450 that may be substituted for portions of the processes shown in FIGS. 23 and 24, respectively, and that may be performed by server 202 and a user device to facilitate a password opt in process are illustrated. At block 471 in FIG. 30, server 202 (see also FIG. 22) presents passwords via common presentation system screens. For instance, server 202 may present the "34QW90" password via screen S2 as shown in FIG. 29. At block 452 in FIG. 31, proximity of user device 226 to one or more presentation systems 206, 212, etc., is determined. Device to system proximity may be identified in any of several different ways (e.g., triangulation, obtaining location information from a local device, etc.). Upon a determination that device 226 is proximate at least one of the presentation systems, the sharing application causes device 226 to present the password entry tool 446 at block 454 and monitors for password entry at block 456. Similarly, in at least some cases the password may not be presented via the common screen until a new device is located within a space proximate the system or until there is some indication from a portable device user that the user would like to associate with the system for sharing purposes. Once a password is entered, control passes to block 458 where device 226 transmits a password/device identifier packet to server 202.

In FIG. 30, server 202 receives the password/device identifier packet at block 472. At block 474 server 202 uses the password to identify the presentation system 206 associated therewith and at block 476 server 202 transmits the presentation system specification for presentation system 206 back to device 226. After transmitting the system specification to device 226, control passes from block 476 to block 298 in FIG. 23 where server 202 monitors for screen selection signals from associated devices and the process described above continues to cycle. At block 460 in FIG. 31, device 226 receives the system specification after which control passes to block 326 in FIG. 24 to generate a screen sharing tool that mirrors the common screens that comprise system 206. Device 226 control cycles as describe above in FIG. 24.

Figure 32:
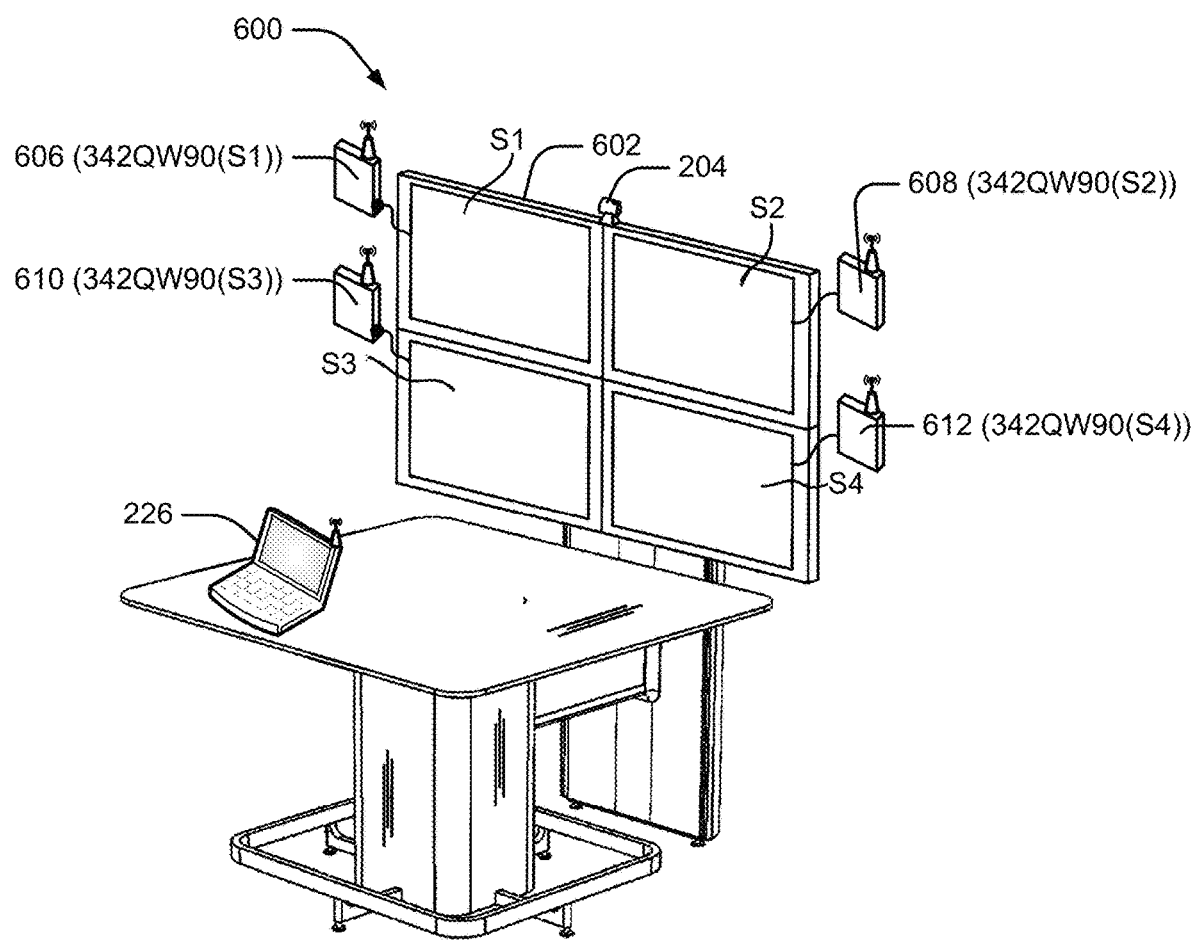
FIG. 32 is a schematic illustrating yet another system architecture wherein separate wireless controllers are provided for each display screen that form part of a presentation system.

While the present invention is described above as one where a system server 202 and a separate switching device (e.g., 208 in FIG. 22) for each of the presentation systems (e.g., 206, 212, 214, etc.) supported by server 202 are required, in at least some embodiments it is contemplated that small wirelessly addressable controllers may be uniquely associated with each of the screens that make up a presentation system. For instance, see FIG. 32 where a presentation system 600 includes a four pack of presentation display screens S1 through S4 and where a separate wireless control device 606, 608, 610 and 612 is associated with each of the screens S1, S2, S3 and S4, respectively. Each control device includes its own processor, a wireless receiver or possibly wireless transceiver, a memory and a video output connector for connecting to an associated common display screen (e.g., S1) to drive the screen with images, video, etc. Each device 606, 608, 610 and 612 has a separately addressable address and receives all information directed to the address. In the interest of simplifying this explanation, the addresses for devices 606, 608, 610 and 612 are 342QW90 followed by the labels (S1), (S2), (S3) and (S4), respectively.

The screen sharing application on each user device is, in at least some embodiments, programmed to perform at least some of the server functions described above. In this regard, for instance, the sharing application on device 226 may be programmed to stream the device 226 desktop directly to one or a subset of controllers 606, 608, 610 and 612 when associated screens are selected via device 226. Thus, for instance, when device 226 is used to select screens S1 and S4 for sharing, the device 226 desktop image is streamed directly to addresses 342QW90(S1) and 342QW90(S4). Devices 606 through 612, upon receiving streamed images, simply present the most recently received image on the associated display screens.

In addition, device 226 may be programmed to monitor for other signals to devices 606 through 612 and to use those signals to update streaming activity as well as the appearance of the screen selection tools presented by device 226. For instance, where device 226 initially presents the device 226 desktop on screens S1 and S4 and therefore illuminates the display icons associated therewith on the selection tool presented by device 226, if a second user device is used to select screen S4 for presenting a different desktop, when the desktop from the second device is transmitted to the address (i.e., 342QW90(S4)) associated with device 612, user device 226 may receive the address signal, recognize that the second device is taking over driving the image on screen S4, stop transmitting the device 226 desktop to device 612, and update the appearance of the selection tool presented by device 226 to only highlight the display icon associated with common screen S1 (i.e., the previously highlighted display icon associated with screen S4 would no longer be highlighted. In this manner, potentially expensive server 202 and switching devices 208, 218, 220 and 222 may be replaced by simple controllers 606 through 612 and some additional features programmed into the screen sharing applications run by user devices like device 226.

Figure 33:
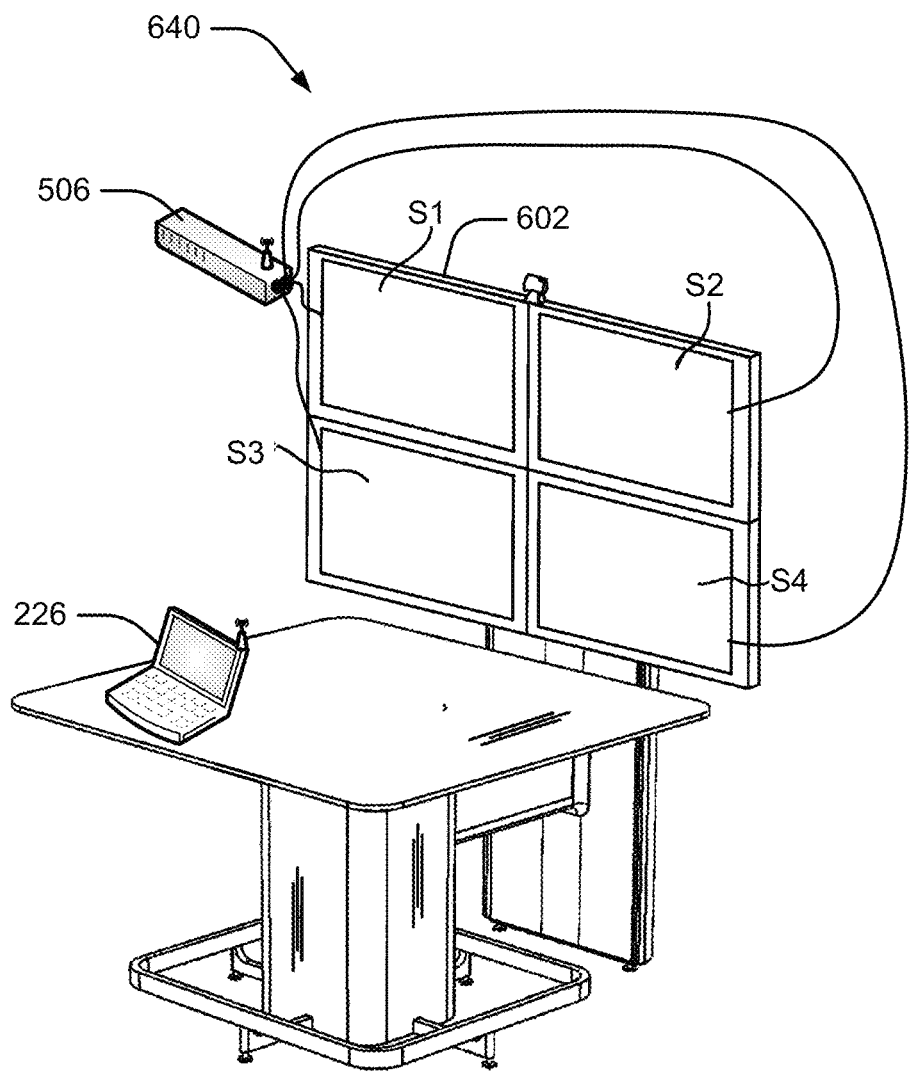
FIG. 33 is similar to FIG. 32, albeit where a single control is provided for driving system display screens.

In other embodiments it is contemplated that a single controller may be used to drive two or more of the common displays. For instance, see FIG. 33 where a system 640 includes one controller 506 to drive a four pack of displays S1 through S4. Here, controller 506 would receive all signals/images transmitted to any of the addresses associated with screens S1 through S4 and present received images accordingly. Operation of user devices 226 would be similar to operation described above with respect to FIG. 32.

In still other embodiments a hybrid system is contemplated that includes a server akin to server 202 in FIG. 22 but where images are delivered wirelessly from switching devices (e.g., 208 in FIG. 22) to selected display screens. In still another hybrid system a server 202 may wirelessly communicate with each switching device and the switching devices may be hardwired to the common display screens.

Figure 34:
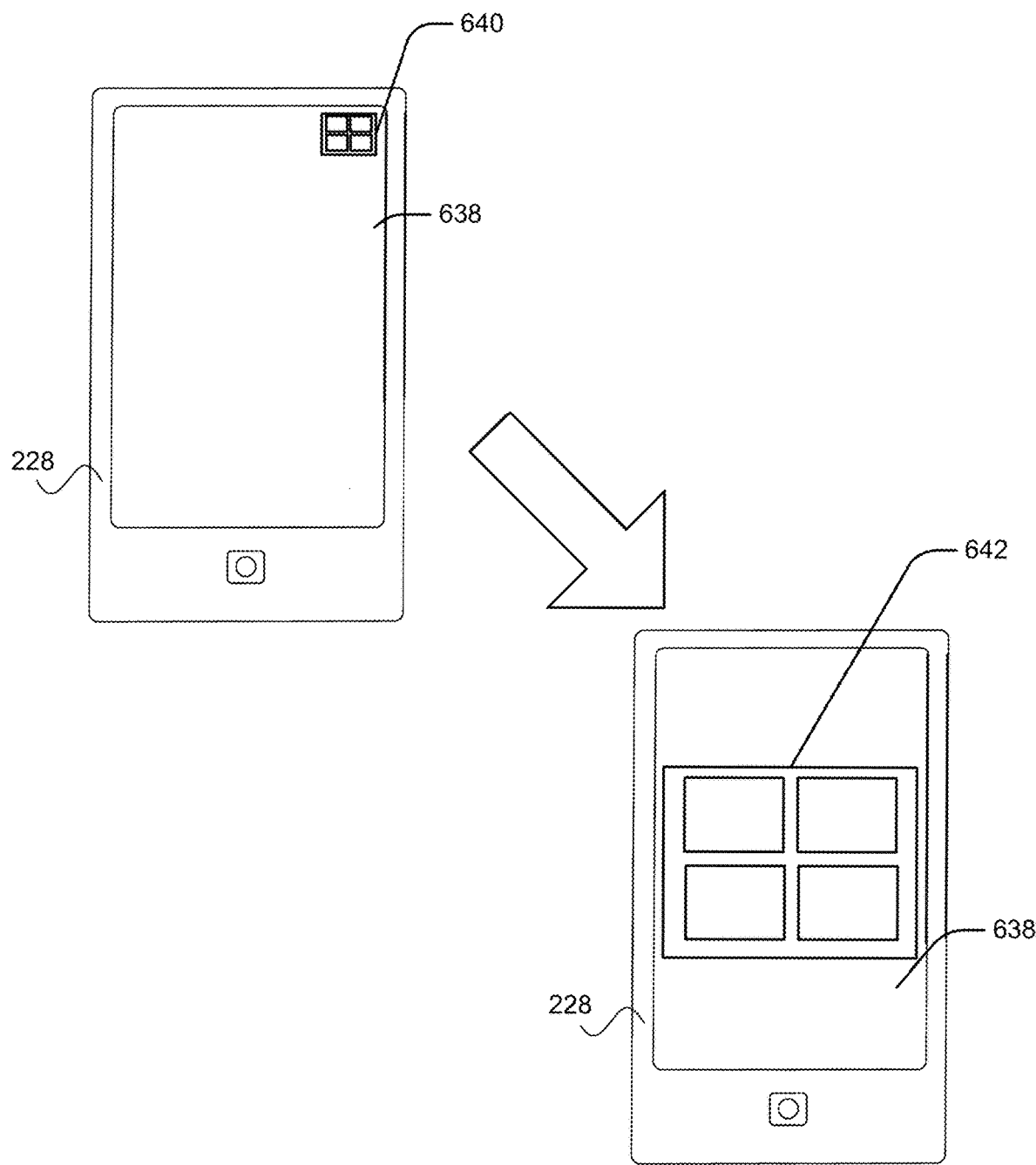
FIG. 34 is a schematic diagram illustrating a user device where a screen selection tool size may be modified to facilitate easy viewing of a desktop image as well as easy selection of common display screens for sharing.

In cases where a user device has a relatively small display screen, it has been recognized that presenting a screen selection tool of a useable size while still allowing viewing of a desktop on the user device may be difficult. For this reason, in at least some embodiments, a screen selection tool may change size and/or appearance at different times depending on user activities. To this end, see FIG. 34 where a smart phone type user device is shown at 228 that includes a display screen 638 and that provides a selection tool icon of a relatively small size at 640 so that information on screen 638 is viewable and relatively unobstructed by icon 640. While icon 640 has an appearance that mirrors or mimics a four screen pack, icon 630 is not intended for screen selection and instead may be selectable to access a larger screen selection tool 642 as shown in the lower right-hand representation of device 228 in FIG. 34. For instance, a device user 228 may tap once or twice on icon 640 to access tool 642 where separate display icons 644, 646, 648 and 650 are selectable to share the desktop image of device 228 via a sub-set of common presentation system screens. After screen selection, a user may select the background behind tool 642 to remove tool 642 from screen 638 and again shown icon 640. In other cases, tool 642 may be semitransparent when not being used for selection and opaque upon an affirmative action to select the tool.

In still other embodiments it is contemplated a user may drag a desktop to one or more display selection icons (see 131, 133, 135, 137 in FIG. 18) to present the desktop on related common displays.

One important aspect of the screen selection tool in at least some embodiments of the invention is that the tool remains on a device display while a user manipulates desktop content on the display in a normal fashion. For instance, referring again to FIG. 18, selection tool 130 may be presented irrespective of device user actions on display 69 to access different applications, manipulate files and data in applications, etc. Similarly, in FIG. 34, icon 640 may be persistently present on screen 228 irrespective of user activity on screen 228 while device 228 remains associated with a presentation system.

In at least some embodiments when a device user moves away from a space associated with a specific presentation system, the screen sharing tool may be automatically removed from the user's device display and any desktop streaming from the device would automatically cease. For instance, access point triangulation may be used to determine when device to system association should be discontinued. As another instance, referring again to FIG. 26, when a device 226 associated with a system 206 is moved into the space defined by egress 364, device 226 may sense the system identification signal for system 206 generated by devices 224 and be programmed to assume device 226 is being removed from space 362 and may therefore discontinue desktop streaming and remove the selection tool from the device display.

Referring again to FIG. 22, it should be appreciated that, in at least some embodiments, as a device user moves among different presentation systems 206, 212, 216, etc., the system architecture may automatically present presentation system specific screen selection tools without requiring any activity on the part of the device user. Thus, when the user is proximate system 206, the selection tool may indicate a four pack of common screens to share on and when the user moves to a location proximate system 216 the selection tool may indicate two four packs of common screens to share on.

Figure 35:
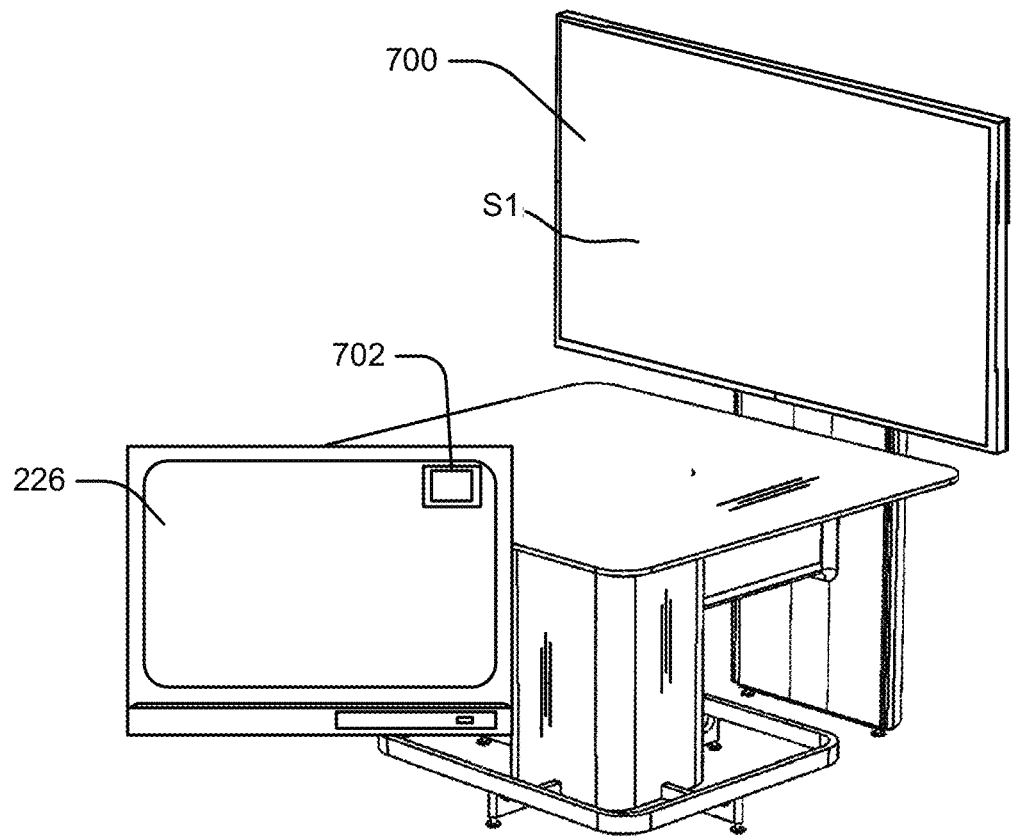
FIG. 35 is a schematic diagram illustrating yet another embodiment consistent with at least some aspects of the present invention wherein a presentation system includes a large display screen that may be divided in several different ways to provide shared images of desktops of different sizes.

While the common presentation system screen are described above as being independent display screens, in other embodiments a single large common screen 700 as in FIG. 35 may be provided instead of separate screens. In this case, in at least some embodiments a screen selection tool 702 would include a single display icon corresponding to the entire space of screen 700 at least initially. Here, when an initial desktop image is shared on screen 700, the image would take up the entire space S1.

Figure 36:
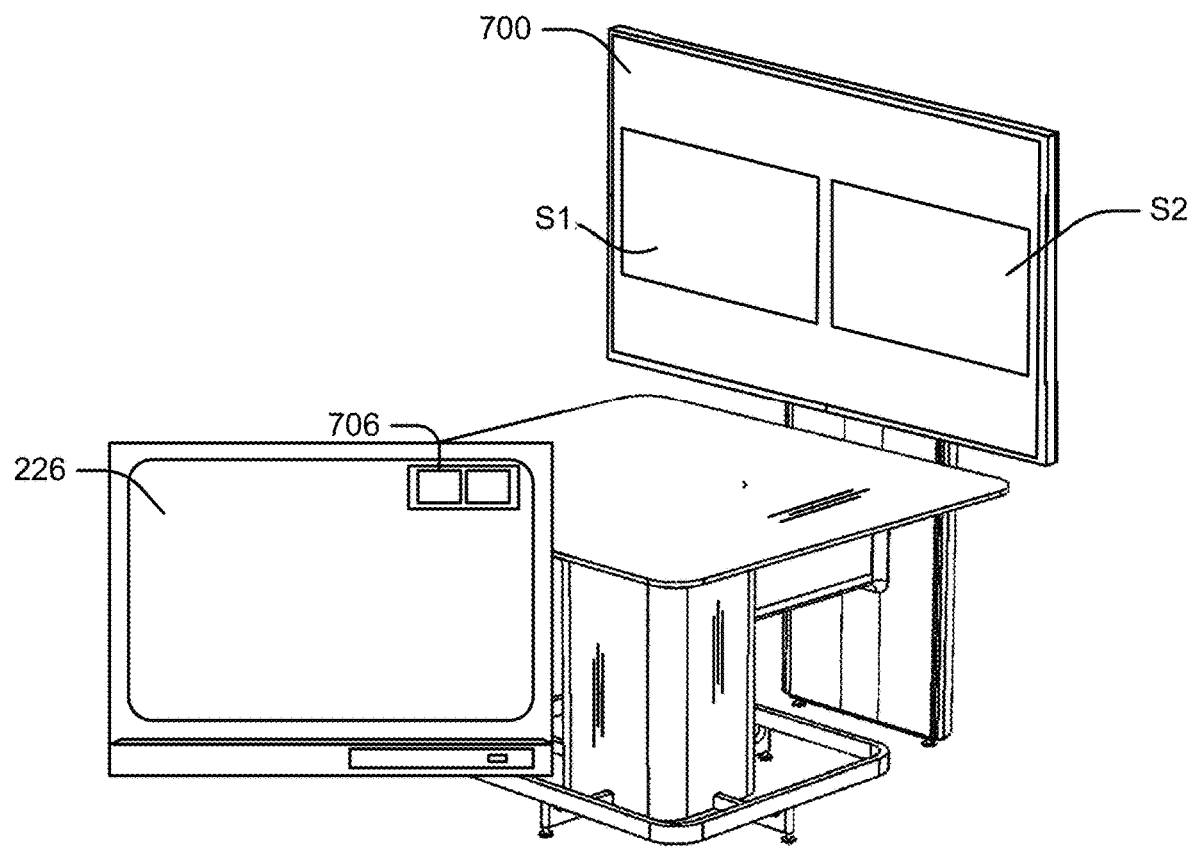
FIG. 36 is similar to FIG. 35, albeit where two desktop images are shared at the same time.
Figure 37:
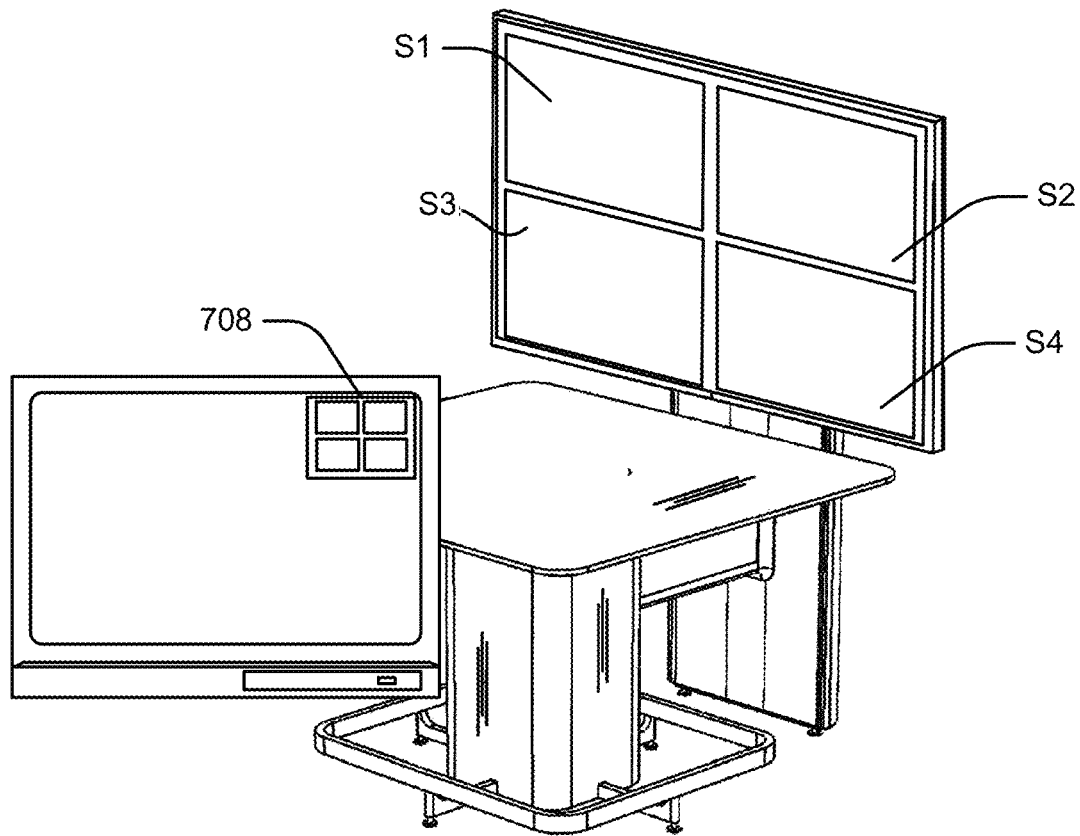
FIG. 37 is similar to FIG. 35, albeit where four desktop images are shared at the same time on the single large display screen.

If a second user device were used to share a second desktop, upon the sharing selection, the space of screen 700 may automatically be divided into two separate presentation spaces S1 and S2 as shown in FIG. 36. The screen selection tool 706 is modified as in FIG. 35 to mimic the two spaces on screen 700. If a third desktop image is shared, screen space 700 may be divided as in FIG. 36 to have four separate spaces S1 through S4 and the selection icon would be modified in a similar fashion as shown at 708.

After four spaces S1 through S4 are defined, the selection icon 708 may operate as described in the embodiments above to replace desktop images in spaces S1 through S4 with subsequently shared desktops. Here, when a desktop is removed from screen 700 by a user so that the number of shared desktops would be consistent with a smaller number of larger sharing spaces, the spaces may be reduced in number and increased in size accordingly.

The various aspects of the subject invention are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

The word "exemplary" is used herein to mean serving as an example, instance, or illustration. Any aspect or design described herein as "exemplary" is not necessarily to be construed as preferred or advantageous over other aspects or designs.

Referring to the figures and specifically to FIG. 39, aspects of the invention will be described in the context of the exemplary conferencing system 810 that includes, among other components, first, second and third display screens 812, 14 and 16 and a conference table 820. Table 820 includes a table top member 22 that forms a worksurface 824. Display screens 812, 814 and 816 are supported by some type of support structure to reside at a location spaced apart from a rear edge of top member 822 and at a height generally above the height of worksurface 824 so that the displays can be observed by persons gathers around side edges and the front edge of top member 822. Displays 812, 814 and 816 are arranged so that the central display 814 is perpendicular to a central axis of the table top member 820 and so that front surfaces of side displays 812 and 816 form obtuse angles with the front surface of central display 814. The angles between front surfaces of adjacent displays are approximately 150 degrees although other angles are contemplated.

Cameras 826, 828 and 830 are mounted above display screens 812, 814 and 816, respectively, and are generally aligned therewith so that a center of the field of view of each of the cameras is generally perpendicular to a front surface of the display screen when viewed from above. Each camera is angled somewhat downward to obtain images of the space that includes table 820 and conferees gathered there around.

In a videoconferencing mode of operation, remote conferees may be presented via display screens 812, 814 and 816 and may receive live video of the conference space. Each remote conferee receives video from a camera that is associated with the display 812, 814 or 816 on which the conferee appears. Thus, for instance, where a conferee appears on screen 812, the conferee remotely receives the video generated by camera 826. In this was, remote conferees and obtain visual cues from local conferees regarding whether or not the conferees are being addressed as local conferees would naturally turn to the display on which a remote conferee appears to communicate with the remote conferee.

In addition to including the components described above, assembly 810 may also include one or more control interface devices for controlling content presented via displays 812, 814 and 816. An exemplary particularly useful interface device 840 includes a pad type device including a touch display screen and that runs an application to present various screen shots to a device user for controlling screen content.

Figure 39:
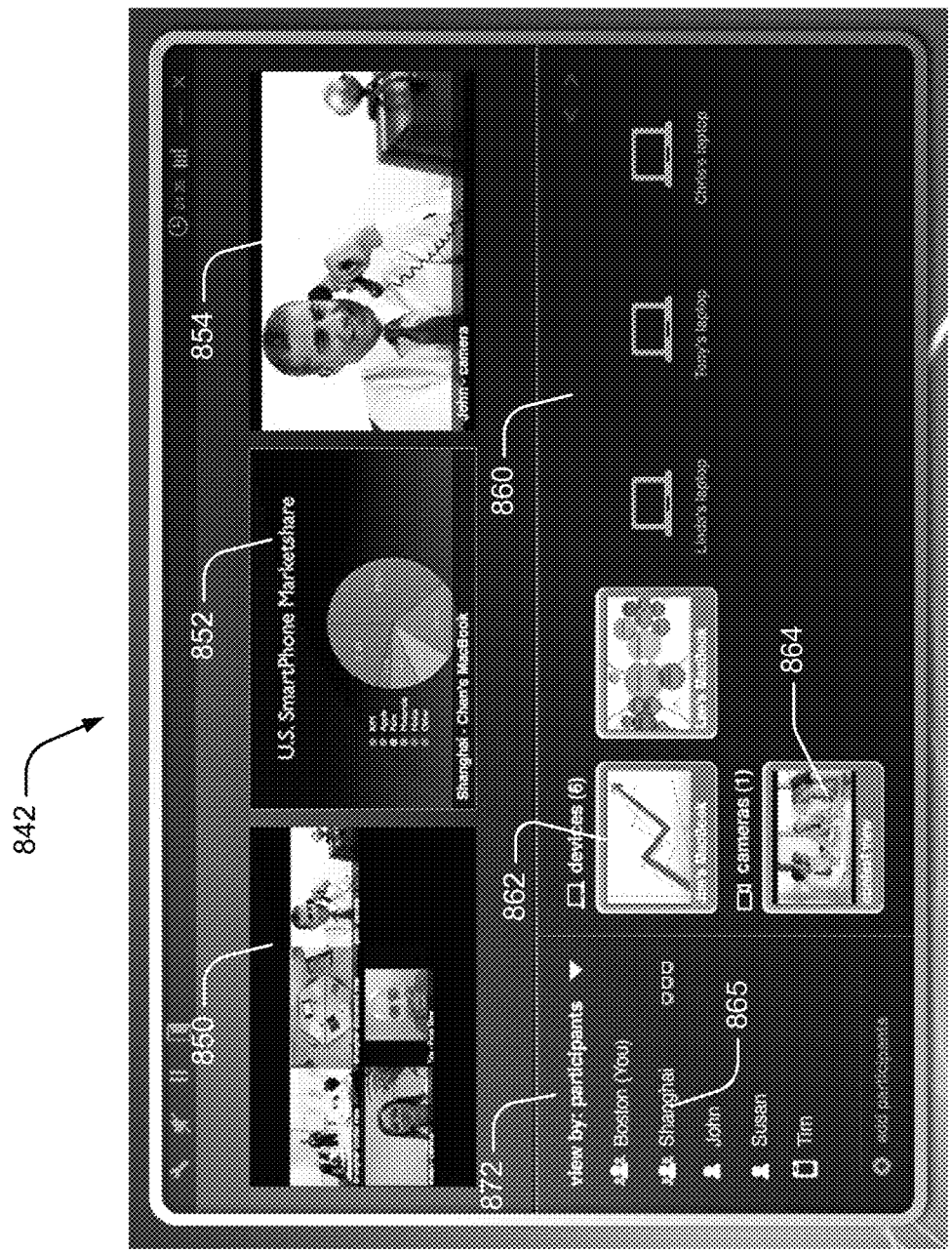
FIG. 39 is a schematic diagram illustrating an exemplary interface that is consistent with at least some aspects of the present invention.

An exemplary interface screen shot 842 is shown in FIG. 39. Screen shot 842 includes three separate display control windows 850, 852 and 854 arranged in a pattern that is similar to the pattern of displays 812, 814 and 816 in front of table 820. Windows 850, 852 and 854 correspond to similarly situated display screens 812, 814 and 986, respectively. In general, interface 840 allows an interface user to move content into any one of windows 850, 852 and 854 to place the content on a corresponding one of displays 812, 814 and 816. For instance, an interface user may move content into window 850 to place the content on display 812. A user may decide to place duplicative content on two or more of displays 812, 814 and 816, by simply moving the content to the subset of associated windows.

Referring still to FIG. 39, a participant's queue 872 lists all linked conferees and allows conferees to be added or deleted at will. In queue 872, each listed element corresponds to a different linked conferee. Some of the linked conferees may be remotely located while others may be locally present within the space including configuration 870. Element 65 titled "Shanghai", indicates a conference configuration similar to configuration 810 including three large panel display screens in a different conference room or at a different location.

Referring again to FIG. 39, a content queue 860 is provided in a lower portion of screen shot 842 in which icons 862, 864, etc., represent various sources of content that may be selected for sharing via the larger display screens. Exemplary content icons include a desktop icon 862 and a videoconferencing icon 864. A content icon may be generated by any one of the conferees listed in queue 872 by that conferee offering the conferee's content for viewing by the group. When a conferee offers content, an icon appears in queue 860 corresponding to that content. The icons in queue 860 may be dynamic and therefore may represent the actual content that is being offered.

Desktop icon 862 corresponds to a computer desktop associated with a computer used by one of the local or remote conferees and would include a mirror image of the user's desktop. Once shared, the desktop would be dynamic so that the desktop user could drive the content presented. For instance, if a remote user's desktop is presented via display 812, the remote user could call up a drawing program and commence drawing via display 812 for others adjacent screen 812 to view. Icon 862 and the associated desktop is selected for viewing on screen 812 by selecting icon 862 via a finger touch or the like and dragging icon 862 into window 852 associated with screen 812. To remove content from a screen, a user can simply select the content in one of the windows 850, 852 or 854 to be removed and drag the content out of the window and either into another window or into the queue space near the bottom of screen shot 842. In the alternative content may be removable by performing some other gesture such as swiping a finger across a window (e.g., 850) or dragging the content in a window into a margin area between windows, either of which would result in moving the content back not the queue 860.

Videoconference icon 864 includes video from a remote conferee. Here, it is assumed that the remote conferee associated with icon 864 has offered up her video for a conference. If icon 864 is moved into one of windows 850, 852 or 854, the video associated with the icon is presented via the corresponding display 812, 814 or 816.

In at least some embodiments it is contemplated that if content already exists on a display screen 812, 814 or 816 when other content is moved into a corresponding window 850, 852 or 854, the initially displayed content will be replaced with the content newly moved into the corresponding window. In other embodiments, when a content icon is moved into a window corresponding to a display that is already presenting content, the display space will be divided into smaller sections and each of the original and the new content will be presented in a different one of the smaller sections or windows. This process of dividing space into smaller windows may continue as long as it makes sense given the dimensions of displays 812, 814 and 816. Thus, for instance, a display space may be divided into four spaces and if a fifth content icon is moved into a window associated with the display, the display may be further divided to provide yet another content space.

Referring again to FIG. 38, in at least some embodiments the configuration 810 may include other area type cameras 870 that are positioned to obtain images of the generally space that includes the configuration 810. For instance, the area camera 870 may be mounted to a ceiling or to a wall forming part of a conference space where the camera's field of view will cover a large portion of the configuration space. Here, it is contemplated that remote conferees could select one of the area type cameras to change their view of the conference space for various reasons. For instance, a remote conferee may want to see who is locally present in a space or may want a top plan view of how a conference space is laid out. As another instance, a remote conferee may want to determine relative positions between display screens 812, 814 and 816 and persons located within the conference space and may want to select one display and associated camera instead of others to obtain a preferred point of reference.

Figure 40:
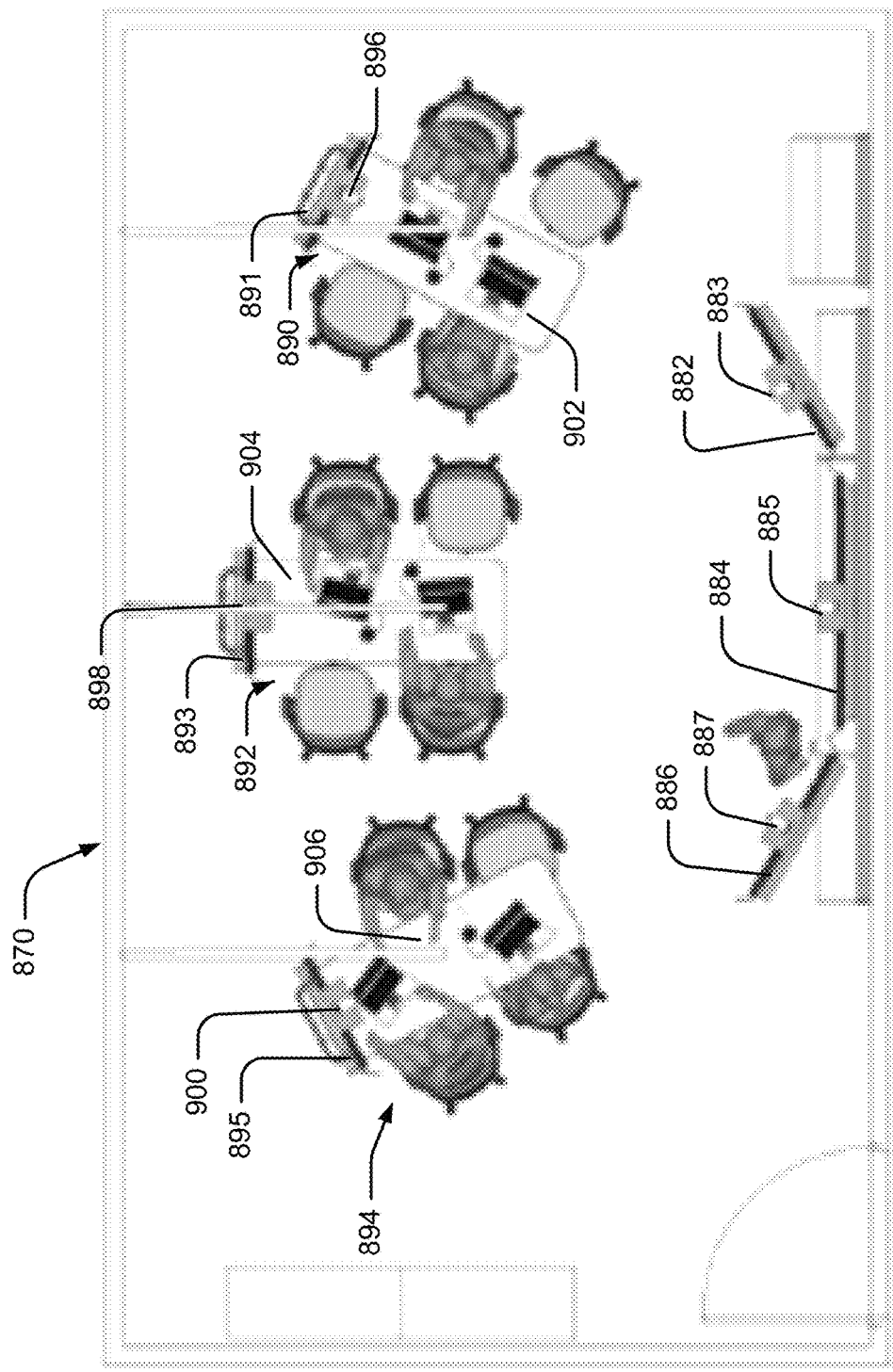
FIG. 40 is a top plan view showing a conferencing configuration that is consistent with at least some aspects of the present invention.
Figure 41:
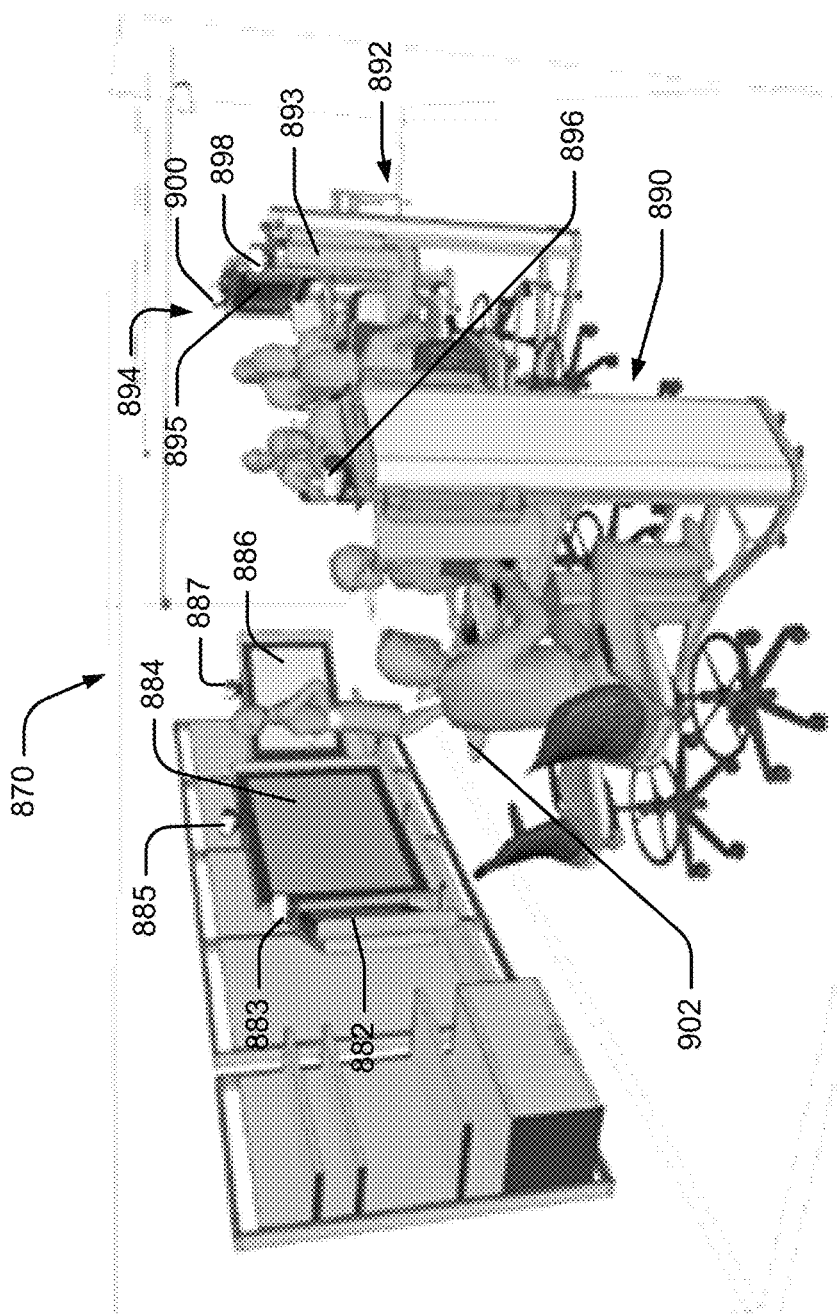
FIG. 41 is a perspective view of a conferencing space including components that are consistent with at least some aspects of the present invention.
Figure 42:
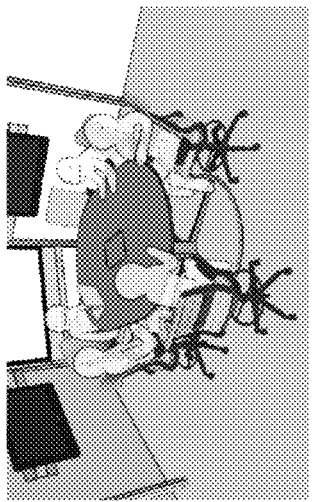
FIG. 42 is a perspective view of a conferencing space including components that are consistent with at least some aspects of the present invention.
Figure 47:
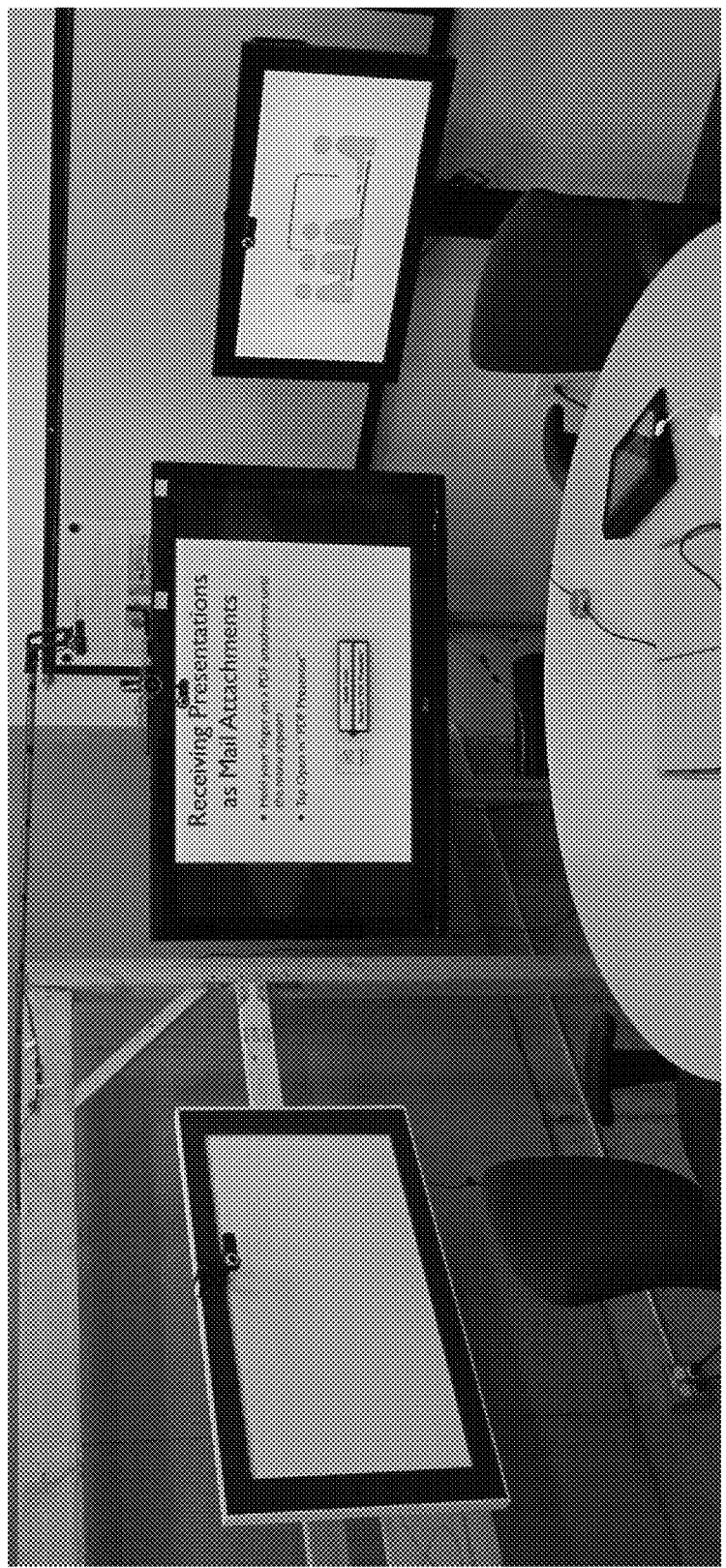
FIG. 47 is a perspective view of a conferencing space including components that are consistent with at least some aspects of the present invention.
Figure 48:
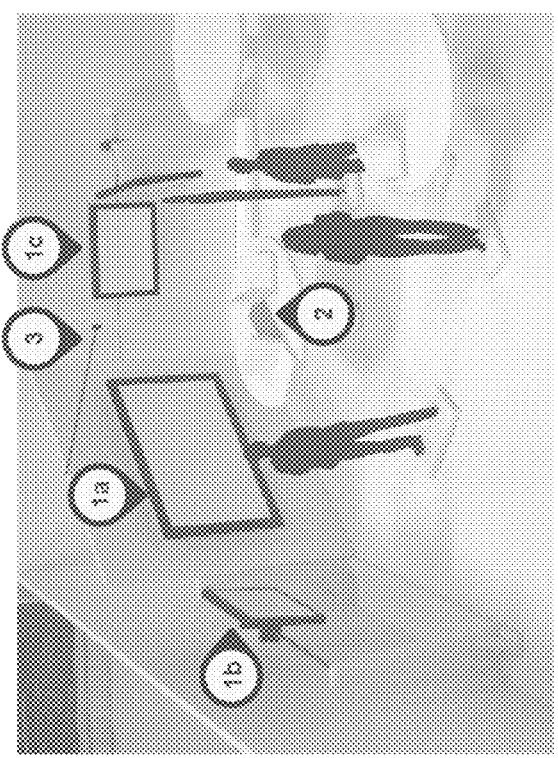
FIG. 48 is a perspective view of a conferencing space including components that are consistent with at least some aspects of the present invention.
Figure 49:
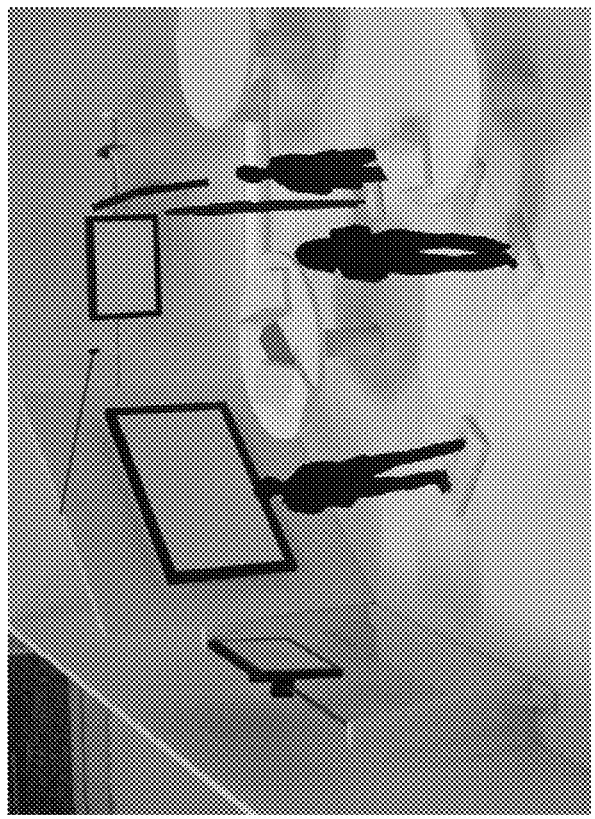
FIG. 49 is a perspective view of a conferencing space including components that are consistent with at least some aspects of the present invention.
Figure 52:
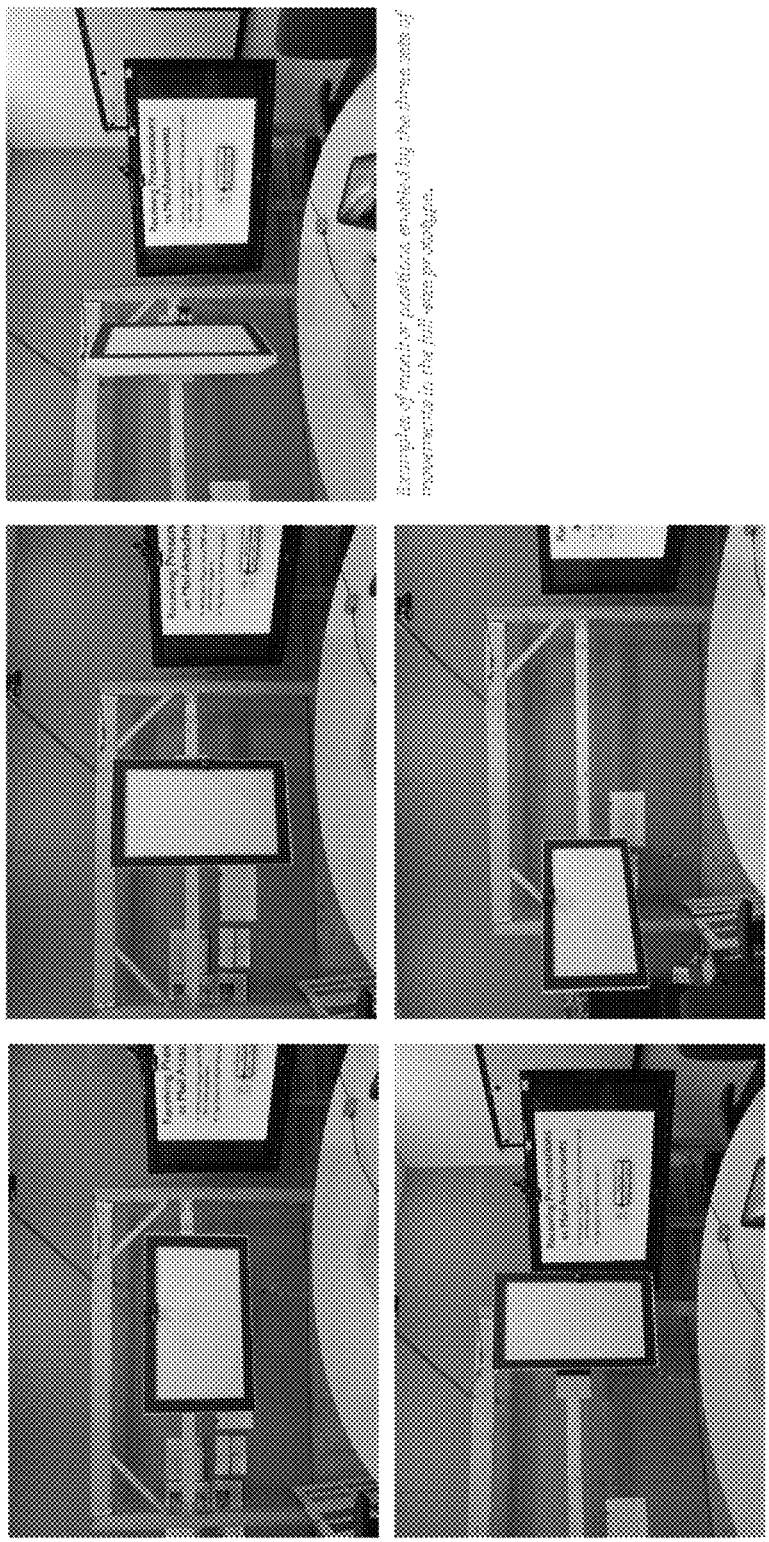
FIG. 52 includes several images showing content on common displays during a sharing operation.
Figure 55:
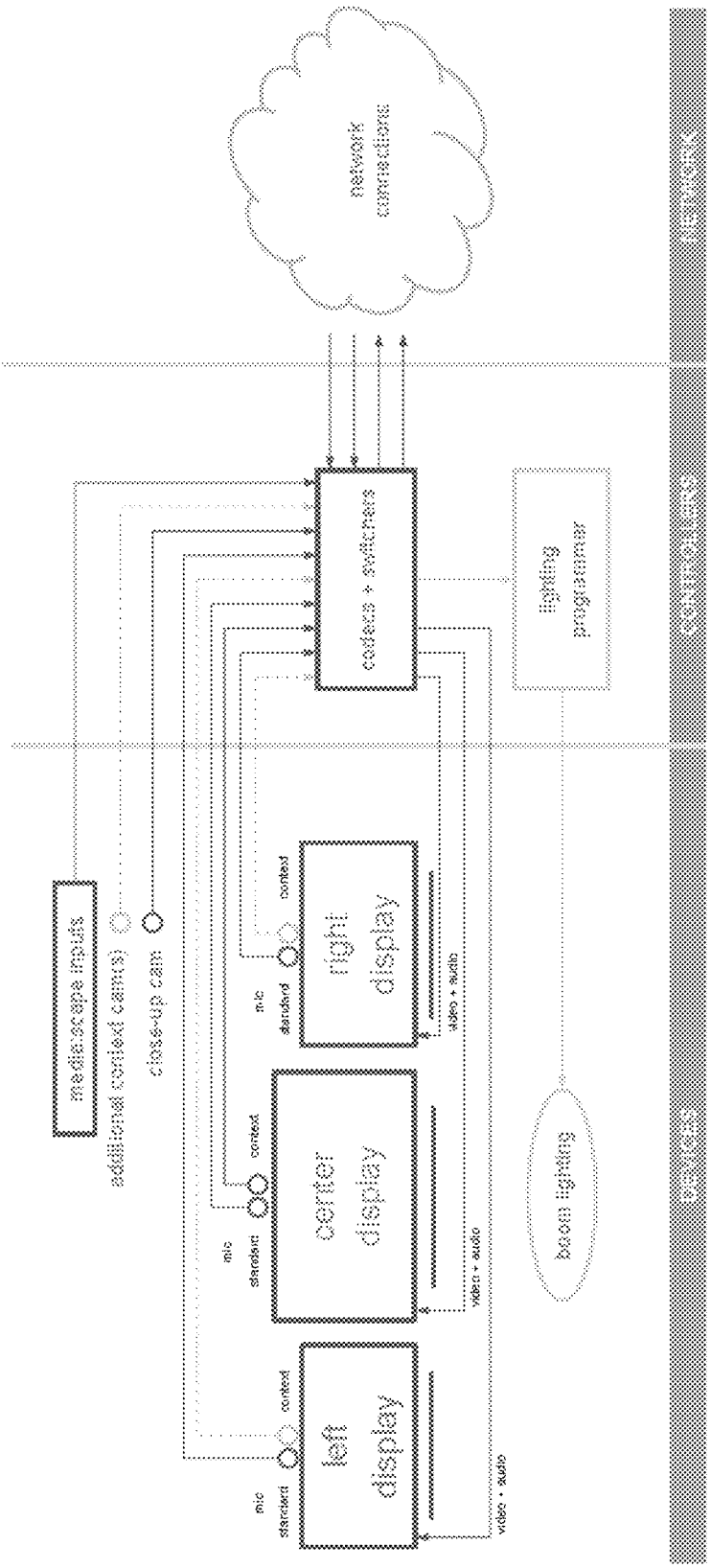
FIG. 55 is a schematic diagram showing a technology configuration that is consistent with at least some aspects of the present invention.
Figure 61:
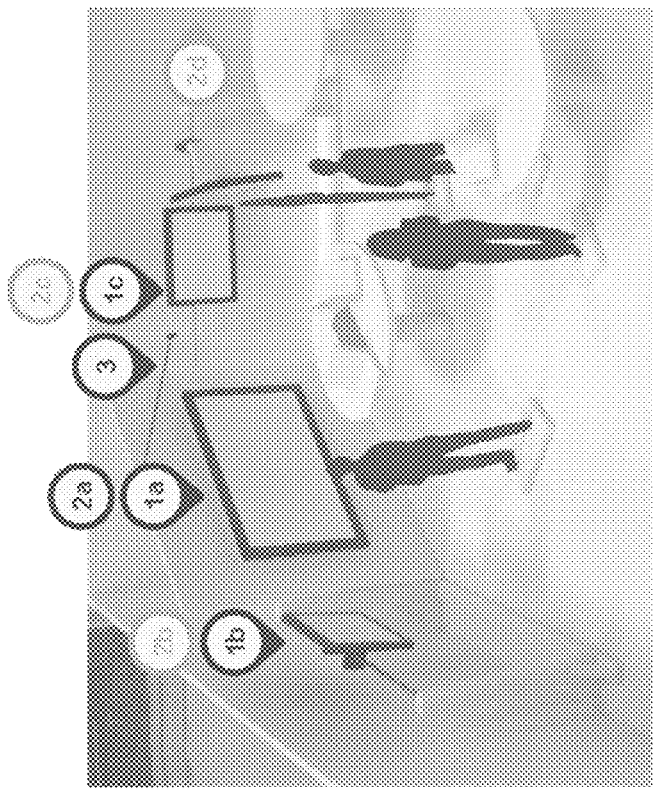
FIG. 61 is a perspective view of a conferencing space including components that are consistent with at least some aspects of the present invention.
Figure 65:
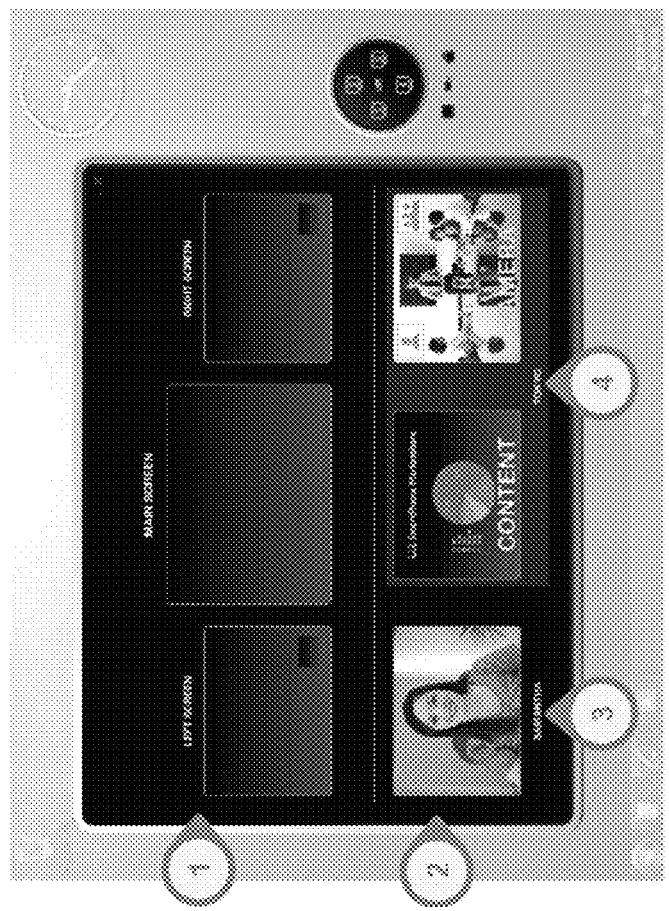
FIG. 65 is a schematic diagram illustrating an exemplary interface that is consistent with at least some aspects of the present invention.
Figure 67:
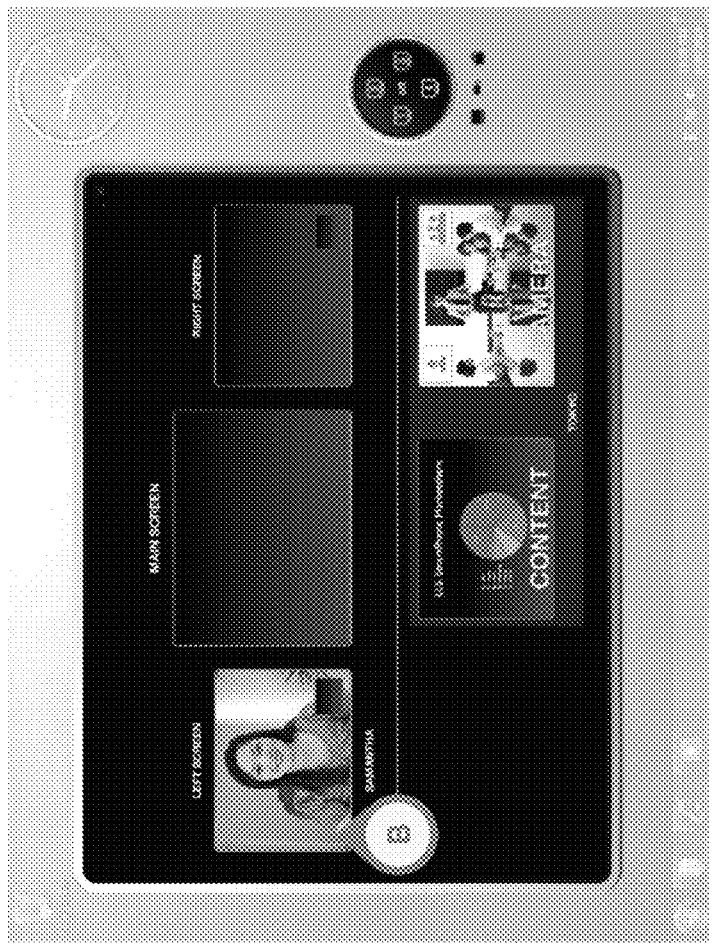
FIG. 67 is a schematic diagram illustrating an exemplary interface that is consistent with at least some aspects of the present invention.
Figure 68:
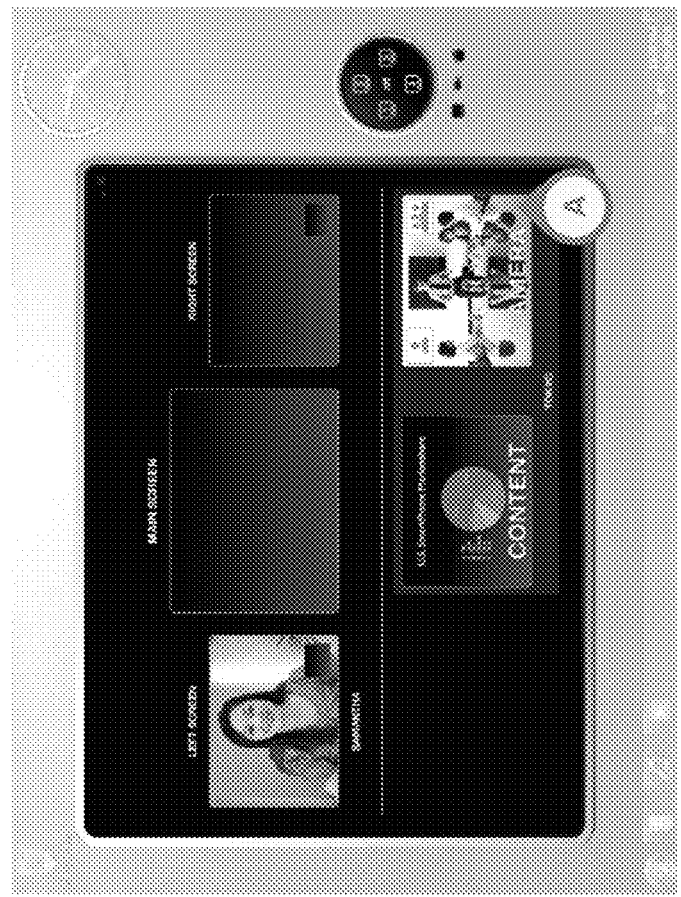
FIG. 68 is a schematic diagram illustrating an exemplary interface that is consistent with at least some aspects of the present invention.
Figure 69:
FIG. 69 is a schematic diagram illustrating an exemplary interface that is consistent with at least some aspects of the present invention.
Figure 70:
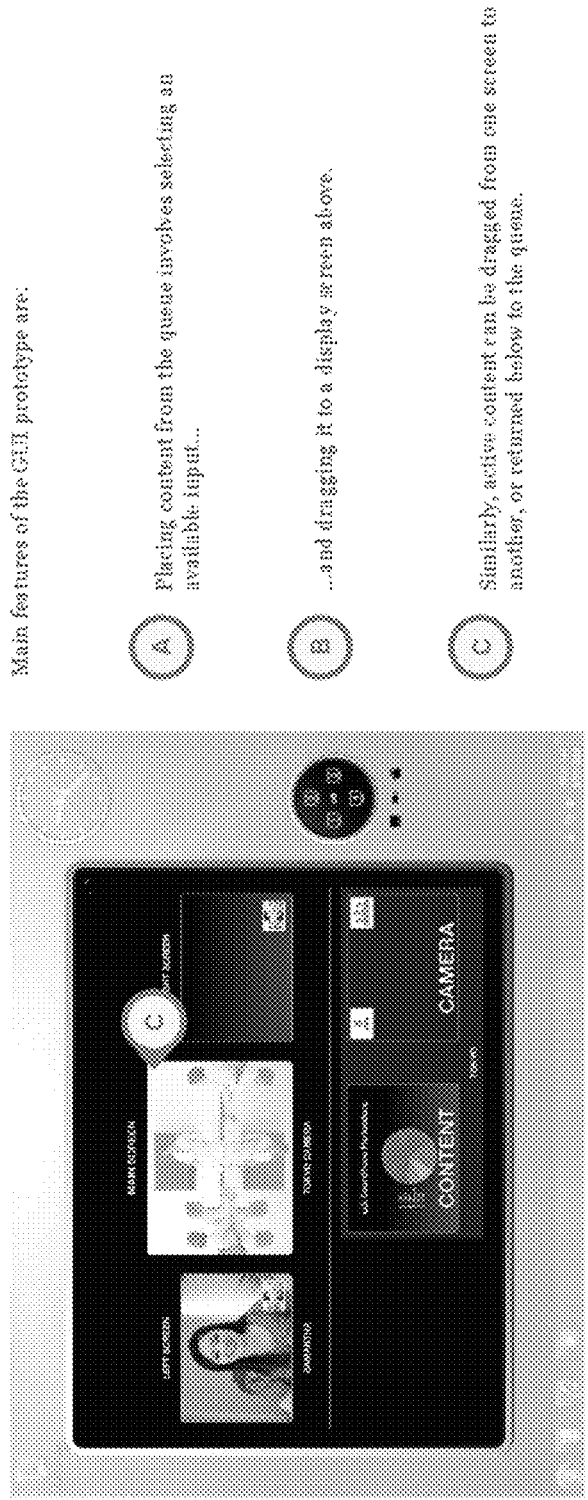
FIG. 70 is a schematic diagram illustrating an exemplary interface that is consistent with at least some aspects of the present invention.
Figure 71:
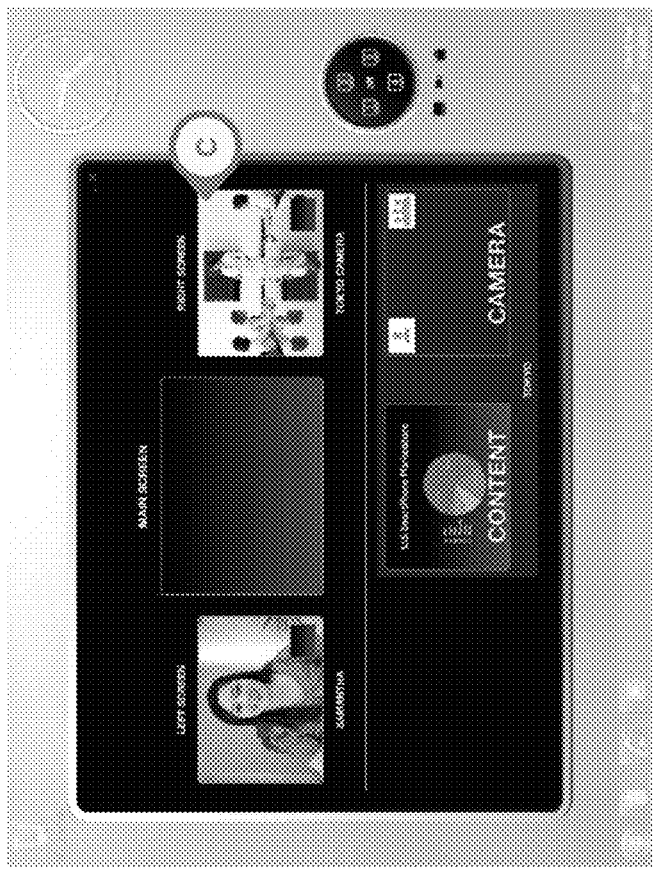
FIG. 71 is a schematic diagram illustrating an exemplary interface that is consistent with at least some aspects of the present invention.
Figure 72:
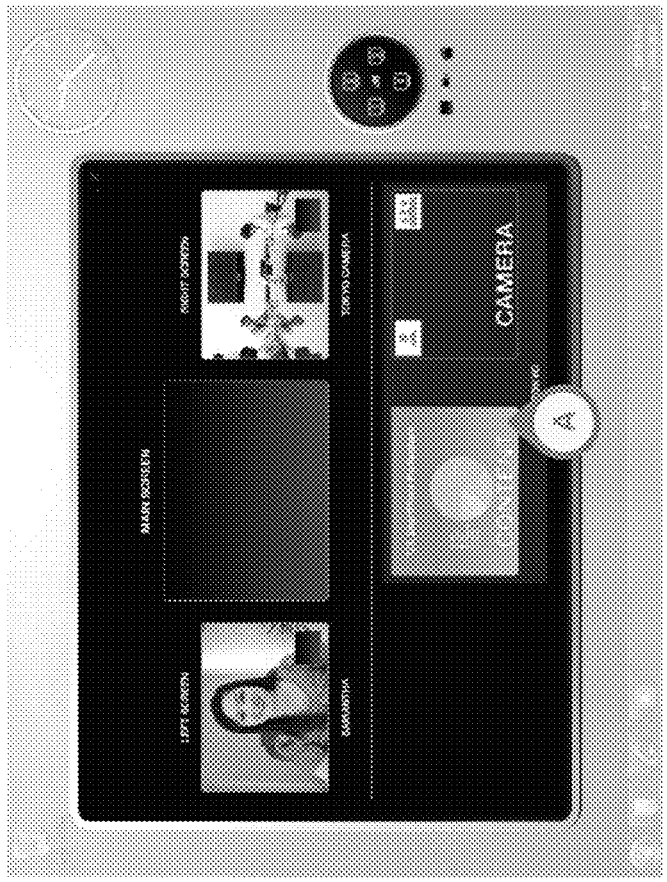
FIG. 72 is a schematic diagram illustrating an exemplary interface that is consistent with at least some aspects of the present invention.
Figure 73:
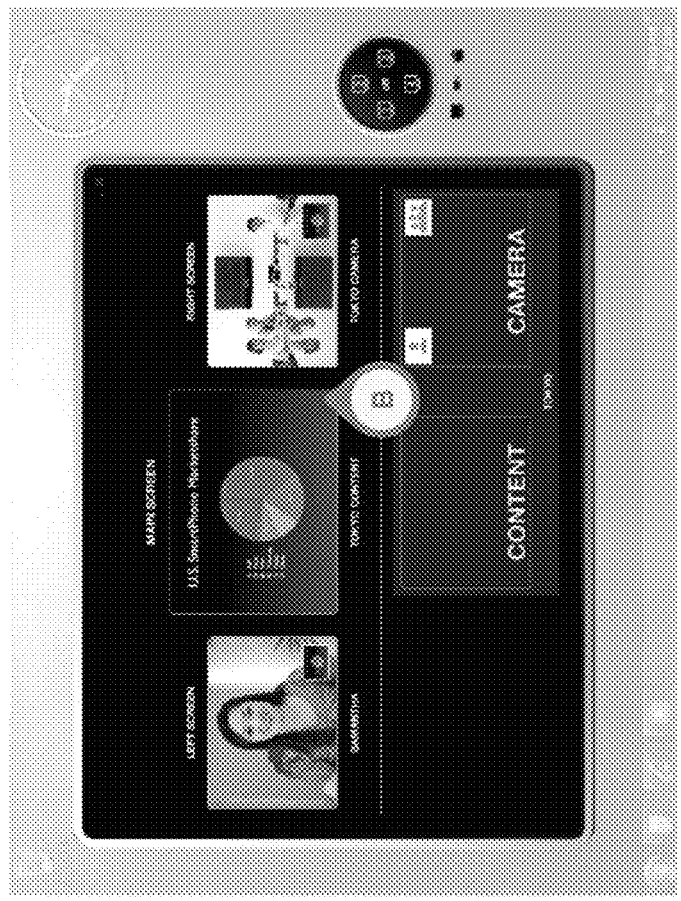
FIG. 73 is a schematic diagram illustrating an exemplary interface that is consistent with at least some aspects of the present invention.
Figure 74:
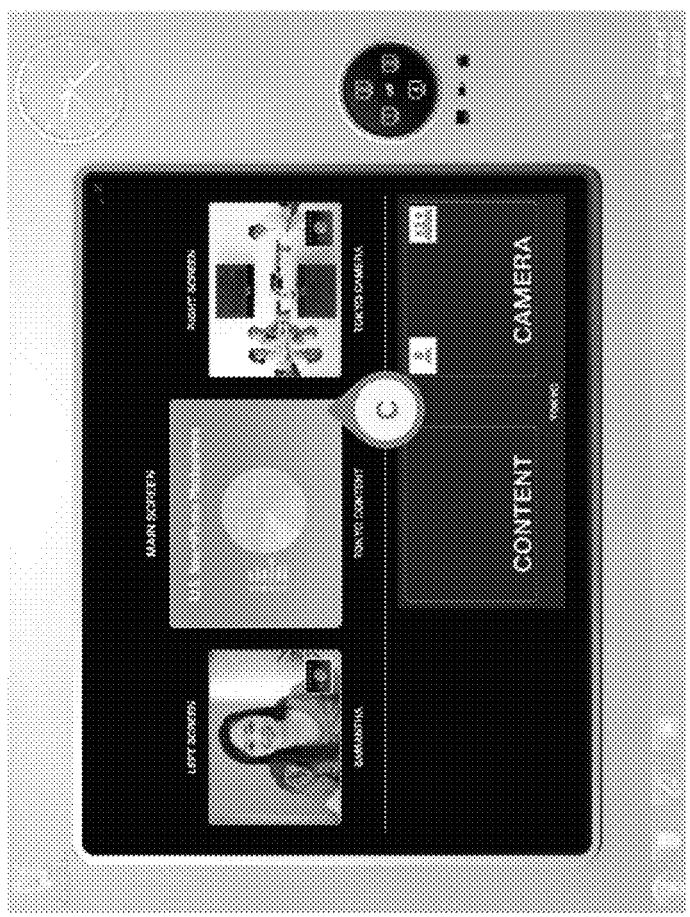
FIG. 74 is a schematic diagram illustrating an exemplary interface that is consistent with at least some aspects of the present invention.
Figure 75:
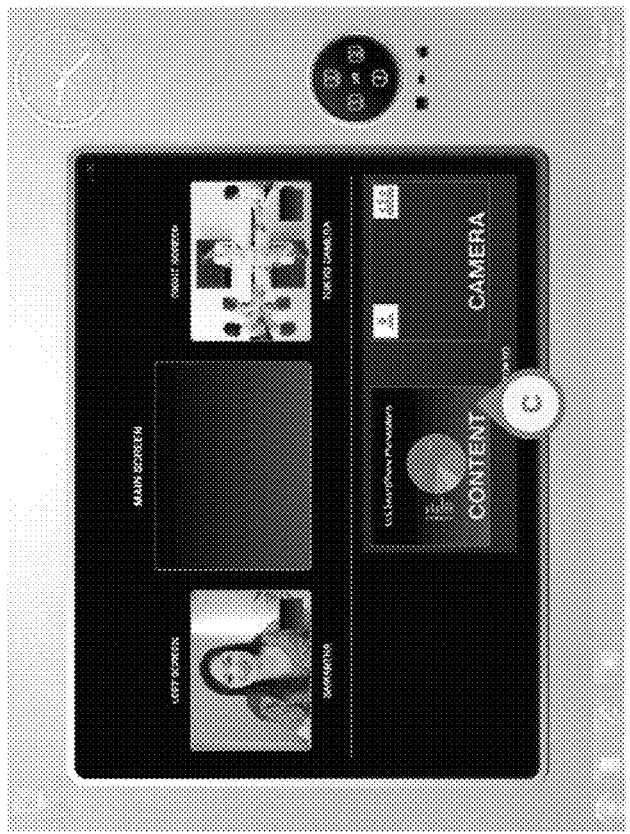
FIG. 75 is a schematic diagram illustrating an exemplary interface that is consistent with at least some aspects of the present invention.

Selection of point of reference is particularly important in configurations that include many different display and camera subassemblies and where the relative positions of the display and camera subassemblies are more disparate. For instance, see FIGS. 40 and 41 that show another conference configuration 880 that includes three displays 882, 884 and 886 arranged at the front of a conferencing space and three smaller table assemblies 890, 892 and 894 where each of the table assemblies includes a table top member 902, 904 and 906, a display 891, 893 and 895 and a camera 896, 898 and 900. The table members 902, 904 and 906 are each relatively thin elongated top members and are aligned in a fan shape emanating out away from the front area of the space that includes displays 882, 884 and 886. Displays 891, 893 and 895 are supported adjacent edges of table top member 902, 904 and 906, respectively, on sides opposite displays 882, 884 and 886 and cameras 896, 898 and 900 are aligned with displays 891, 893 and 895 so that video generated thereby is aligned with the points of view of associated displays. Thus, here, when a remote conferee is presented via display 891, for instance, the video presented to the remote conferee of the conference space will be from a side view as opposed to from a view at the front of the conference space which, in general, will place the remote conferee in a participating but not presenting location within the space. Here, the participants view will give visual queues to the participant that the participant is not presenting as persons within the conference space will all, at most times, be facing the space near large display screens 882, 884 and 886. When a remote participant is presented via central display 884 or one of the side displays 882 or 886, the participant will have visual queues from local conferees looking directly at the remote conferee that the remote conferee is in a presenting position in the conference space.

Figure 38:
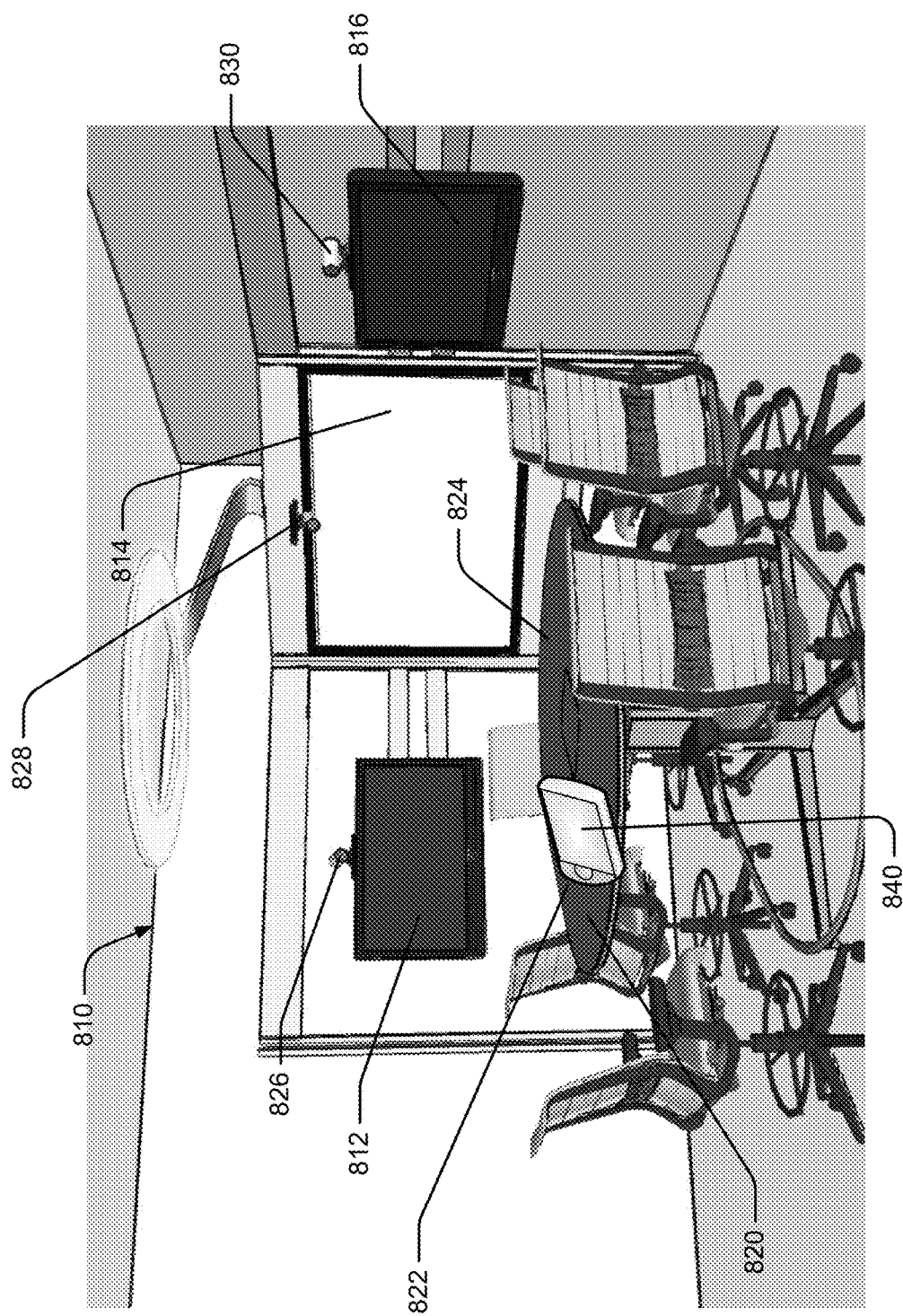
FIG. 38 is a perspective view of a conferencing space including components that are consistent with at least some aspects of the present invention.

In at least some embodiments where may be two conference spaces, one local and one remote, that each have the configuration shown in FIG. 38 above. In this case, when the conferees in one of the spaces links to a conference hosted by the second conference space, the second conference system may be used to drive the displays located at the first conference space so that both sets of conferees see the exact same information at the same time.

Figure 76:
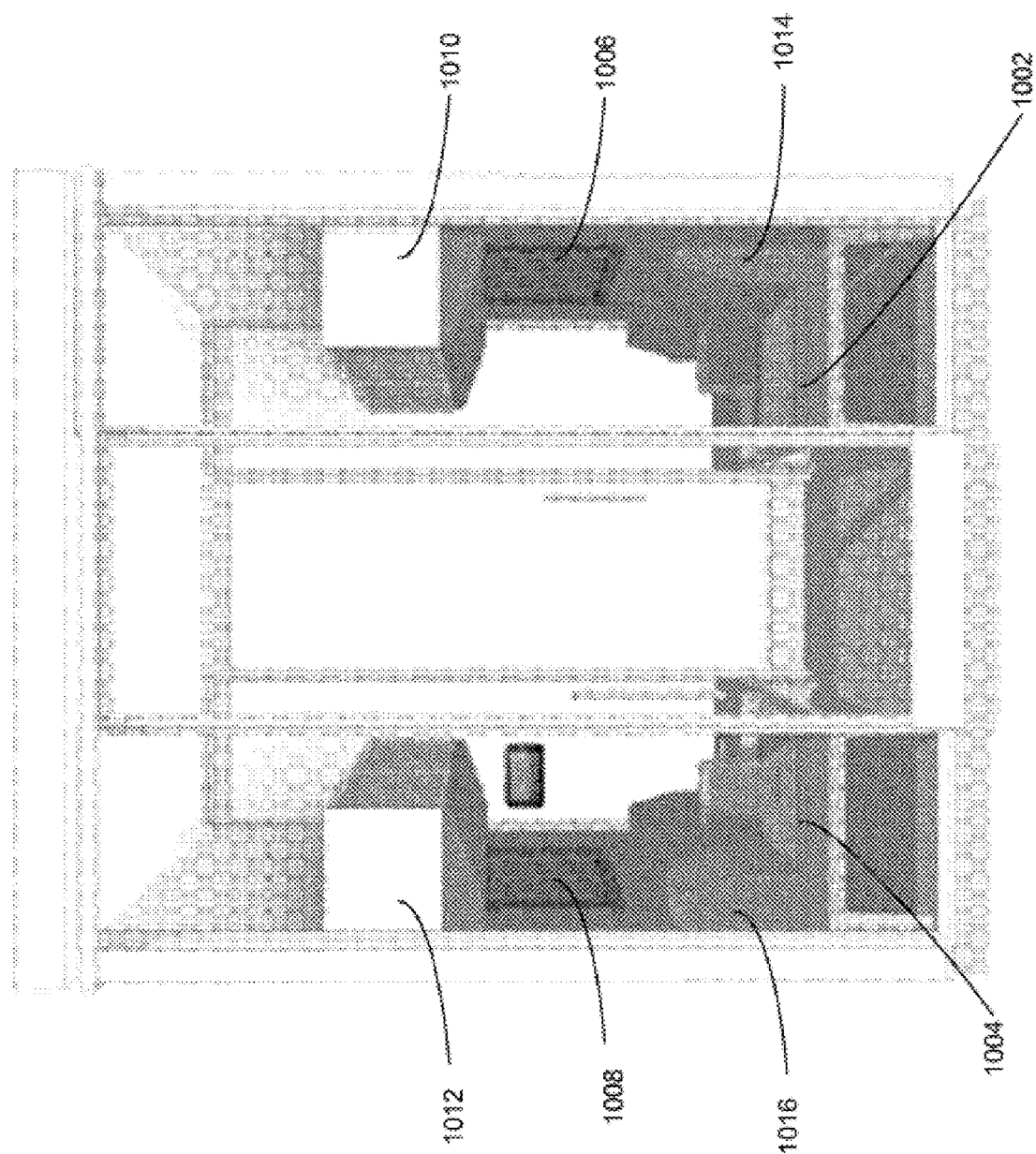
FIG. 76 shows a perspective view of a conference space including display screens and other features that are consistent with at least some aspects of the present invention.

Referring to FIG. 76, another furniture artifact configuration 1000 is shown that can be used by a small (e.g., 4 or less) group of people to share information in ways that are consistent with at least some aspects of the present invention. Configuration 1000 includes a plurality of walls or other barriers that form an enclosed workspace. Within the workspace, two lounges 1002 and 1004 are provided that face each other where each lounge includes a central arm rest portion to divide each lounge into two halves. Above the backrest of each lounge, a large flat panel display 1006 and 1008 is mounted generally at a central location aligned with the lounge arm rests to face the other lounge. When space users occupy the lounge spaces on opposite sides of the arm rests, each user has a generally clear view of the facing display 1006 or 1008 above the opposite arm rest.

Although not illustrated, it is contemplated that a server and wireless access points are provided that are associated with configuration 1000 for performing any of the processes or methods described above. Once portable user devices in configuration 1000 are associated with displays 1006 and 1008, device users can drive one or both of the displays 1006 or 1008 for personal use or to share information with others. In particular, one advantage here is that while two user's of the configuration space face each other, they can share information on facing displays and therefore they do not have to turn much away from each other in order to see the shared content. For instance, a first user on a first lounge may share portable device content on the display supported by the wall behind the user so that the first user can see her content on her portable device display screen and a second facing user can see the first user's content presented behind the first user. Similarly, in this case, the second user on a second lounge may share portable device content on the display supported by the wall behind the user so that the second user can see her content on her portable device display screen and the facing first user can see the second user's content presented behind the second user.

Referring still to FIG. 76, other artifacts within configuration 1000 include storage bins 1010 and 1012 above the displays 1006 and 1008 as well as cushion members 1014 and 1016 below the storage bins 1010 and 1012 to cushion any inadvertent contact between a space user's head and the storage units 1010 and 1012.

Although not shown in FIG. 76, additional display screens may be presented on the facing walls or on other space defining wall surfaces and any of the other display screens may be controllable via user portable devices associated with the space.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims. For example, while the control interface is described above as being used in conjunction with three display screens and in a configuration including one or more tables, in other embodiments the control aspects may be used with more than three display screens and or in configurations that do not include a table. For instance, the control algorithms and interface may be used with three display screens arranged in front of a lounge, a set of seats for conferees, etc.

Thus, the invention is to cover all modifications, equivalents, and alternatives falling within the spirit and scope of the invention as defined by the following appended claims.

What is claimed is:

1. A method of selecting information from video sources to be displayed on at least a subset of a plurality of display screen presentation spaces in a collaborative workspace having a switching device, the method comprising the steps of:
    providing at least first and second independent selectable control interfaces, each interface including a plurality of separately selectable controls, each of the plurality of separately selectable controls uniquely associated with one of the plurality of display screen presentation spaces;
    uniquely associating first and second video sources with the first and second control interfaces, respectively;
    for each control interface, receiving an indication each time one of the plurality of separately selectable controls is selected; and
    upon receiving an indication that one of the plurality of separately selectable controls has been selected via one of the control interfaces, providing the video source associated with the control interface used to make the selection to the display screen presentation space associated with the selected selectable control so that the video source generates images on the display screen presentation space.

2. The method of claim 1 wherein step of providing control interfaces includes providing the first and second control interfaces on display screens of first and second computing devices, respectively, and wherein the first and second video sources generate images on the display screens of the first and second control interfaces, respectively.

3. The method of claim 2 wherein, upon receiving an indication that one of the plurality of separately selectable controls has been selected via one of the control interfaces, the images generated on the selected display screen presentation space mirror the images generated by the video source on the display screen of the control interface used to make the selection.

4. The method of claim 2 wherein the first and second control interfaces are provided along edges of the display screens of the first and second computing devices, respectively, so that the images generated by the video sources are substantially unobstructed by the control interfaces.

5. The method of claim 3 wherein the plurality of display screen presentation spaces are arranged relative to each other and, wherein, the plurality of separately selectable controls are arranged relative to each other in a fashion which mimics the arrangement of the plurality of display screen presentation spaces.

6. The method of claim 5 wherein the plurality of display screen presentation spaces include four separate presentation spaces and wherein each of the control interfaces includes four selectable controls, a separate selectable control for each of the four separate display screen presentation spaces.

7. The method of claim 1 wherein each of the display screen presentation spaces is provided by a separate display screen.

8. The method of claim 7 wherein the separate display screens are arranged relative to each other, each of the separate control interfaces is provided on a display screen of a separate computing device and, wherein, the plurality of separately selectable controls are arranged relative to each other on each of the computing device display screens in a pattern that mirrors the arrangement of the plurality of display screens.

9. The method of claim 1 further including the steps of, while the first video source is provided to one of the display screen presentation spaces, receiving an indication that the control on the first control interface associated with the one of the display screen presentation spaces has been selected and, upon receiving the indication that the control on the first control interface associated with the one of the display screen presentation spaces has been selected while the first video source is provided to the one of the display screen presentation spaces, disconnecting the first video source from the one of the display screen presentation spaces.

10. The method of claim 1 wherein a separate indicator is associated with each of the plurality of separately selectable controls, the method further including the step of modifying the appearance of an indicator upon selection of a selectable control associated with the indicator.

11. The method of claim 10 wherein each of the indicators is capable of indicating each of three different states, the method further including the steps of causing an indicator to indicate a first state when no video source is associated with a corresponding control interface, a second state while a video source is associated with a corresponding control interface and while the associated selectable control remains unselected and a third state while a video source is associated with a corresponding control interface and while the video source is provided to the display screen presentation space associated with the selectable control that is associated with the indicator.

12. The method of claim 1 wherein the first and second control interfaces are provided on display screens of first and second portable computing devices, respectively, the step of providing first and second control interfaces including, for each of the first and second portable computing devices, moving the computing device into the workspace, associating the computing device with the workspace, identifying the number of display screen presentation spaces associated with the workspace and generating a control interface with a separate selectable control for each of the identified number of display screen presentation spaces.

13. The method of claim 1 wherein, each time an additional portable computing device is moved into the workspace, the method includes the step of providing a control interface for the display screen presentation spaces associated with the workspace on a display screen of the additional portable computing device.

14. A method of selecting information from video sources to be displayed on at least a subset of a plurality of display screen presentation spaces in a collaborative workspace, the method for use with a plurality of portable computing devices, each computing device having a computing device display screen, each computing device providing a separate video source that presents images on the display screen of the computing device, the method comprising the steps of:
  on each display screen of the plurality of portable computing devices, providing a control interface in addition to images from the video source provided by the computing device, each control interface including a plurality of separately selectable controls, each of the plurality of separately selectable controls uniquely associated with one of the display screen presentation spaces;
  for each control interface, receiving an indication each time one of the plurality of separately selectable controls is selected; and
  upon receiving an indication that one of the plurality of separately selectable controls has been selected, providing the video source provided by the portable computing device used to make the selection to the display screen presentation space associated with the selected selectable control so that the video source generates images on the display screen presentation space.

15. The method of claim 14 wherein the control interfaces are provided along edges of the computing device display screens so that the images generated by the video sources on the computing device display screens are substantially unobstructed by the control interfaces.

16. The method of claim 14 wherein the plurality of display screen presentation spaces are arranged relative to each other and, wherein, the plurality of separately selectable controls on each control interface are arranged relative to each other in a fashion which mimics the arrangement of the plurality of display screen presentation spaces.

17. The method of claim 14 wherein each of the portable computing devices is associated with a different device user and wherein each of the controls indicates the identity of a user associated with the portable computing device currently driving a display screen presentation space associated with the control.

18. The method of claim 14 wherein each of the portable computing devices is associated with a different device user and wherein each of the display presentation spaces, in addition to presenting images from an associated video source, indicates the identity of a user associated with the portable computing device currently driving the display screen presentation space.

19. The method of claim 14 wherein the plurality of display screen presentation spaces includes at least first and second presentation space subsets that are spaced apart within the workspace, each control interface including first and second sets of separately selectable controls spaced apart on the display screen of an associated portable computing device to mimic the arrangement of the display screen presentation spaces within the workspace.

20. A system for selecting information from video sources to be displayed on at least a subset of a plurality of display screen presentation spaces in a collaborative workspace, the system for use with a plurality of portable computing devices, each computing device having a computing device display screen, each computing device providing a separate video source that presents images on the display screen of the computing device, the system comprising:
- a processor in communication with the plurality of display screen presentation spaces and the plurality of portable computing devices, the processor programmed to perform the steps of:
- on each display screen of the plurality of portable computing devices, providing a control interface in addition to images from the video source provided by the computing device, each control interface including a separately selectable control uniquely associated with each of the display screen presentation spaces;
- for each control interface, receiving an indication each time one of the separately selectable controls is selected; and
- upon receiving an indication that one of the separately selectable controls has been selected, providing the video source provided by the portable computing device used to make the selection to the display screen presentation space associated with the selected selectable control so that the video source generates images on the display screen presentation space.

* * * * *